(12) United States Patent
Wang

(10) Patent No.: US 12,292,513 B2
(45) Date of Patent: May 6, 2025

(54) CROSS-FREQUENCY CORRECTION FOR PRECISE POSITIONING

(71) Applicant: QUALCOMM Incorporated, San Diego, CA (US)

(72) Inventor: Min Wang, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 17/931,399

(22) Filed: Sep. 12, 2022

(65) Prior Publication Data

US 2024/0094403 A1    Mar. 21, 2024

(51) Int. Cl.
*G01S 19/07*    (2010.01)
*G01S 19/33*    (2010.01)

(52) U.S. Cl.
CPC .............. *G01S 19/07* (2013.01); *G01S 19/33* (2013.01)

(58) Field of Classification Search
CPC .................... G01S 19/07–074; G01S 19/32–33
See application file for complete search history.

(56) References Cited

U.S. PATENT DOCUMENTS

| | | |
|---|---|---|
| 2014/0152496 A1 | 6/2014 | Cho |
| 2021/0141098 A1 | 5/2021 | Kishimoto et al. |
| 2021/0286090 A1 | 9/2021 | Kozlov et al. |
| 2022/0011443 A1* | 1/2022 | De Wilde ............... G01S 19/21 |
| 2024/0077620 A1* | 3/2024 | Smolyakov ........... G01S 19/071 |

FOREIGN PATENT DOCUMENTS

| | | |
|---|---|---|
| CN | 111913201 | 11/2020 |
| CN | 113126128 | 7/2021 |
| EP | 1864152 A2 | 12/2007 |
| WO | WO 2020104594 | 5/2020 |

OTHER PUBLICATIONS

Kaplan, Elliott D. et al., "Understanding GPS Principles and Applications", Artech House, 2nd ed., 2006 (Year: 2006) (Year: 2006).*

(Continued)

*Primary Examiner* — Cassi J Galt
(74) *Attorney, Agent, or Firm* — QUALCOMM Incorporated

(57) ABSTRACT

An example method performed at a mobile device for determining a position may comprise receiving correction data associated with (1) a first pseudorange measurement of a first GNSS signal sent from a satellite vehicle on a first GNSS carrier frequency and (2) a second pseudorange measurement of a second GNSS signal sent from the satellite vehicle on a second GNSS carrier frequency. The method also may comprise measuring a third GNSS signal sent from the satellite vehicle and received at the mobile device on a third GNSS carrier frequency, to generate a third pseudorange measurement. The method also may comprise determining the position of the mobile device using (a) the third pseudorange measurement of the third GNSS signal on the third GNSS carrier frequency and (b) the correction data associated with the first pseudorange measurement and the second pseudorange measurement.

29 Claims, 20 Drawing Sheets

(56) References Cited

OTHER PUBLICATIONS

International Search Report and Written Opinion—PCT/US2023/072089—ISA/EPO—Jan. 29, 2024.
Vollath U., et al., "Analysis of Three-carrier Ambiguity Resolution Technique for Precise Relative Positioning in GNSS-2", Journal of the Institute of Navigation, Institute of Navigation, Fairfax, VA, US, vol. 46, No. 1, Jun. 1, 1999, pp. 13-24, XP056013260, ISSN: 0028-1522 p. 15 original TCAR resolution steps, p. 16 Multipath, p. 18 Integrated TCAR approach.

* cited by examiner

CROSS-FREQUENCY CORRECTION FOR PRECISE POSITIONING

BACKGROUND

1. Field of Disclosure

The present disclosure relates generally to the field of satellite-based positioning, and more specifically to precise positioning techniques such as Differential Global Navigation Satellite System (DGNSS) and Real-Time Kinematic (RTK) for determining a position of a mobile device using measurements performed at the mobile device in combination with measurements performed at a reference station.

2. Description of Related Art

Global Navigational Satellite System (GNSS) positioning involves estimating a position of a mobile receiver based on pseudorange measurements obtained using radio frequency signals from satellites, for example, satellites of the Global Positioning System (GPS). Conventional GNSS positioning, by itself, typically achieves a moderate degree of accuracy (e.g., several meters). Precise positioning techniques capable of estimating position with a high degree of accuracy (e.g., several centimeters), such as DGNSS and RTK, have been developed that combine measurements of GNSS signals made at the mobile device with correction data sent from a reference station. The correction information pertains to measurements made of GNSS signals received at the reference station, which has a known position. The correction data is used to reduce errors in the measurements of GNSS signals made at the mobile device, thus facilitating a more accurate position estimate. To ensure proper correction, the GNSS signals received at the reference station and the GNSS signals received at the mobile station typically have the same carrier frequency.

BRIEF SUMMARY

An example method performed at a mobile device for determining a position based on Global Navigational Satellite System (GNSS) signals, according to this disclosure, may comprise receiving, using a communication interface, correction data associated with two or more pseudorange measurements, including (1) a first pseudorange measurement of a first GNSS signal sent from a satellite vehicle and received at a reference station on a first GNSS carrier frequency and (2) a second pseudorange measurement of a second GNSS signal sent from the satellite vehicle and received at the reference station on a second GNSS carrier frequency, the first GNSS carrier frequency being different from the second GNSS carrier frequency. The method also may comprise measuring a third GNSS signal sent from the satellite vehicle and received at the mobile device on a third GNSS carrier frequency different from the first GNSS carrier frequency and different from the second GNSS carrier frequency, to generate a third pseudorange measurement. The method also may comprise determining the position of the mobile device using (a) the third pseudorange measurement of the third GNSS signal on the third GNSS carrier frequency and (b) the correction data associated with the two or more pseudorange measurements, including the first pseudorange measurement of the first GNSS signal on the first GNSS carrier frequency and the second pseudorange measurement of the second GNSS signal on the second GNSS carrier frequency.

An example method performed at a reference station or a server for providing correction data for Global Navigational Satellite System (GNSS) signals, according to this disclosure, may comprise measuring to obtain at the reference station, or receiving at the server, two or more pseudorange measurements, including (1) a first pseudorange measurement of a first GNSS signal sent from a satellite vehicle and received at the reference station on a first GNSS carrier frequency and (2) a second pseudorange measurement of a second GNSS signal sent from the satellite vehicle and received at the reference station on a second GNSS carrier frequency, the first GNSS carrier frequency being different from the second GNSS carrier frequency. The method also may comprise generating, at the reference station or the server, the correction data associated with the two or more pseudorange measurements, including the first pseudorange measurement of the first GNSS signal on the first GNSS carrier frequency and the second pseudorange measurement of the second GNSS signal on the second GNSS carrier frequency. The method also may comprise sending, from the reference station or the server, the correction data to a mobile device configured to obtain a third pseudorange measurement of a third GNSS signal sent from the satellite vehicle and received at the mobile device on a third GNSS carrier frequency different from the first GNSS carrier frequency and different from the second GNSS carrier frequency.

An example mobile device for determining a position based on Global Navigational Satellite System (GNSS) signals, according to this disclosure, may comprise a communication interface configured to receive correction data associated with two or more pseudorange measurements, including (1) a first pseudorange measurement of a first GNSS signal sent from a satellite vehicle and received at a reference station on a first GNSS carrier frequency and (2) a second pseudorange measurement of a second GNSS signal sent from the satellite vehicle and received at the reference station on a second GNSS carrier frequency, the first GNSS carrier frequency being different from the second GNSS carrier frequency, a GNSS receiver configured to measure a third GNSS signal sent from the satellite vehicle and received at the GNSS receiver on a third GNSS carrier frequency different from the first GNSS carrier frequency and different from the second GNSS carrier frequency, to generate a third pseudorange measurement, a memory, one or more processing units communicatively coupled with the communication interface, the GNSS receiver, and the memory, the one or more processing units configured to determine the position of the mobile device using (a) the third pseudorange measurement of the third GNSS signal on the third GNSS carrier frequency and (b) the correction data associated with the two or more pseudorange measurements, including the first pseudorange measurement of the first GNSS signal on the first GNSS carrier frequency and the second pseudorange measurement of the second GNSS signal on the second GNSS carrier frequency.

An example apparatus for determining a position of a mobile device based on Global Navigational Satellite System (GNSS) signals, according to this disclosure, may comprise means for receiving correction data associated with two or more pseudorange measurements, including (1) a first pseudorange measurement of a first GNSS signal sent from a satellite vehicle and received at a reference station on a first GNSS carrier frequency and (2) a second pseudorange measurement of a second GNSS signal sent from the satellite vehicle and received at the reference station on a second GNSS carrier frequency, the first GNSS carrier frequency being different from the second GNSS carrier frequency. The apparatus further may comprise means for measuring a third GNSS signal sent from the satellite vehicle and received at the mobile device on a third GNSS carrier frequency different from the first GNSS carrier frequency and different from the second GNSS carrier frequency, to generate a third pseudorange measurement. The apparatus further may comprise means for determining the position of the mobile device using (a) the third pseudorange measurement of the third GNSS signal on the third GNSS carrier frequency and (b) the correction data associated with the two or more pseudorange measurements, including the first pseudorange measurement of the first GNSS signal on the first GNSS carrier frequency and the second pseudorange measurement of the second GNSS signal on the second GNSS carrier frequency.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
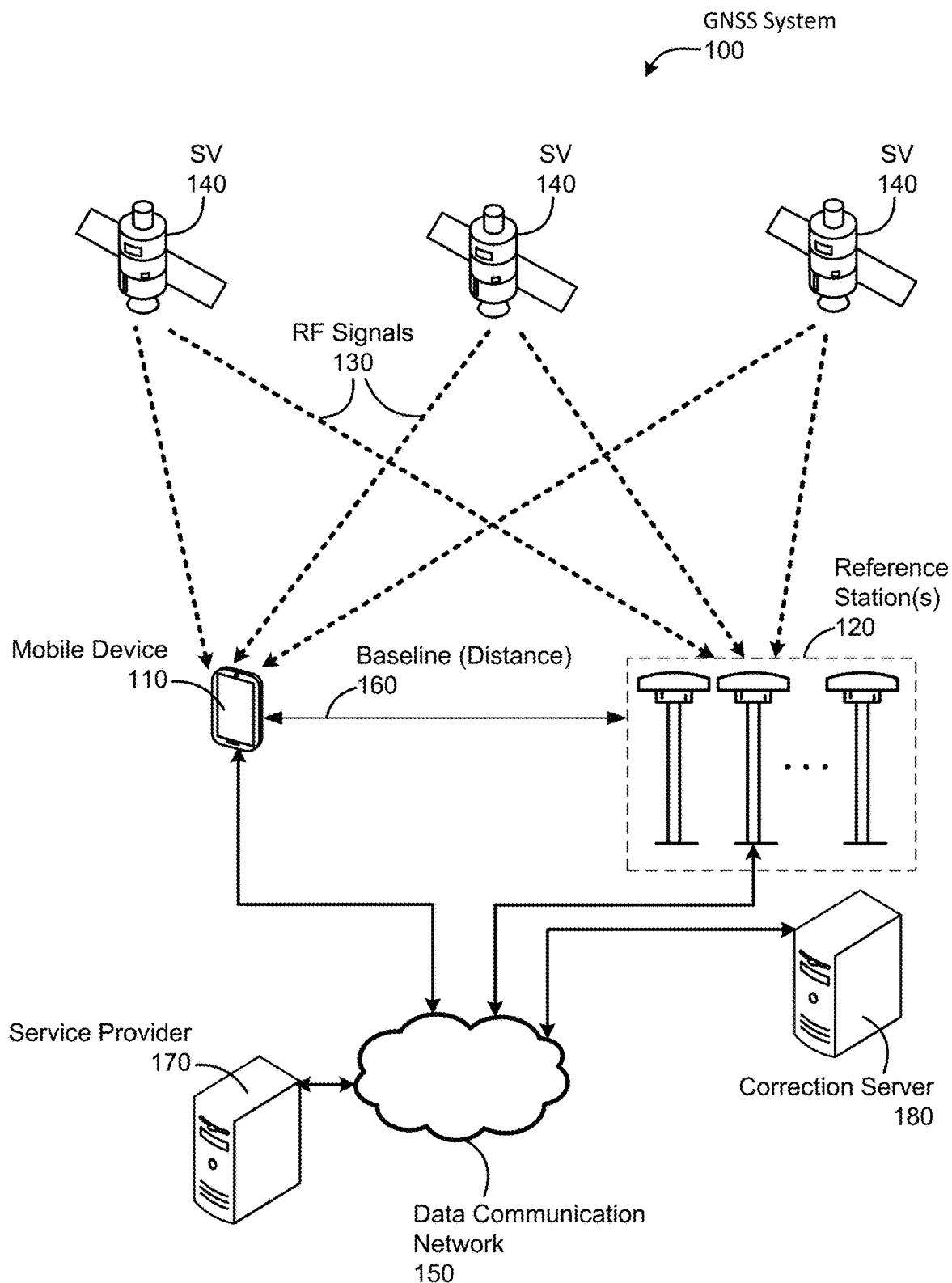
FIG. 1 is a simplified diagram of a GNSS system capable of precise positioning, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While some embodiments in which one or more aspects of the disclosure may be implemented are described below, other embodiments may be used, and various modifications may be made without departing from the scope of the disclosure.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. RF signals transmitted by a GNSS satellite are referred to as "GNSS signals." In some instances, an RF signal may be referred to herein simply as a "signal." Also, as used herein, the term "carrier frequency" of a GNSS signal refers to a frequency value characterizing the location of the GNSS signal within the RF spectrum. The GNSS signal may occupy a frequency band and is typically modulated by a carrier signal. The carrier frequency of the GNSS signal may refer to a frequency, e.g., the center frequency, associated with the frequency band of the GNSS signal.

Additionally, as used herein, the term "correction data" may refer to corrective information provided by a precise positioning system, e.g., a Differential Global Navigation Satellite (DGNSS) system or Real-Time Kinematic (RTK) system, to enable a high-accuracy position determination of a device having a GNSS receiver. Correction data can include measurement data taken by a reference station (e.g., carrier phase and/or pseudorange measurements, which may be raw measurements or processed measurements) and/or corrective information derived from the measurement data, such as a difference between a true range determination, based on a known location of a reference station, and a measurement taken at the reference station. Correction data can be used as described herein, along with measurements taken at the device having the GNSS receiver, to determine the position of the device with a high level of accuracy.

One of the problems associated with existing precise positioning techniques is that, in order to ensure proper correction, the GNSS signals received at the reference station and the GNSS signals received at the mobile station typically are required to correspond to the same GNSS frequency band (i.e., the GNSS signals are required to occupy the same band, centered around the same carrier frequency). However, the GNSS receiver at the mobile device and the GNSS receiver at the reference station may have different capabilities—e.g., they might be made by different manufacturers, be of different models, have different firmware versions, etc. The GNSS receiver at the mobile device may be capable of receiving a first set of GNSS carrier frequencies. The GNSS receiver at the reference station may be capable of receiving a second set of GNSS carrier frequencies that might overlap with, but not be identical to, the first set of GNSS carrier frequencies. Certain errors within GNSS signal measurements are frequency dependent. Thus, correction data generated based on measurements of a GNSS signal received by a reference station on one GNSS carrier frequency may not be capable of correcting errors in the measurements of a GNSS signal received by a mobile device on another GNSS carrier frequency. To ensure proper correction of errors, existing precise positioning systems generally require the correction data to be generated from GNSS signals received at the reference signal on the same GNSS carrier frequency as the GNSS signals received at the mobile device. In other words, precise positioning systems using correction data is generally only available for the overlapping set of GNSS carrier frequencies that both the mobile device and the reference station are capable of receiving. However, such a restriction can significantly limit the flexibility of the precise positioning system. Aspects of the present disclosure provide techniques for relaxing such a restriction, to allow precise positioning based on a signal received by the mobile device on a GNSS carrier frequency that the reference station is not receiving. Additional details will follow after an initial description of relevant systems and technologies.

FIG. 1 is a simplified diagram of a GNSS system 100 capable of precise positioning, according to an embodiment. The GNSS system 100 enables a highly accurate (e.g., sub-meter) GNSS position fix of a mobile device 110 (also known as a "rover station" or "rover") by using GNSS receivers at both the mobile device 110 and one or more reference stations 120 (also known as "base stations") that receive RF signals 130 from satellite vehicles (SVs) 140 (GNSS satellites) from one or more GNSS constellations (e.g., Global Position System (GPS), Galileo (GAL), global navigation Satellite System (GLONASS), Beidou, etc.). Types of mobile devices 110 used may vary, depending on application, and may include any of a variety of types of devices having access to GNSS positioning data, such as mobile devices equipped with GNSS receivers. Such mobile devices may include, for example consumer electronics or other mobile consumer devices, such as a mobile phone, tablet, laptop, wearable device, vehicle, or the like. In some embodiments, the mobile device 110 may comprise industrial equipment, such as survey equipment.

In GNSS-based positioning, the mobile device 110 can use code-based positioning to estimate a distance of each of the SVs 140 based on a determined delay in a generated pseudorandom binary sequence received in the RF signals 130. The mobile device 110 can further accurately calculate the location of each SV 140 at a specific moment in time using ephemeris (or navigation) data regarding the SVs 140. With the distance and location information of the SVs 140, the mobile device 110 can then determine a position fix for its location using traditional GNSS techniques. This position fix may be determined, for example, by a Standalone Positioning Engine (SPE) executed by one or more processors of the mobile device 110. However, the resulting accuracy of the position fix for mobile device 110 is subject to errors caused by SV 140 orbit and clock, ionosphere and troposphere delays, and other phenomena. Although this can provide accuracy on the order of meters, this accuracy may be insufficient for many applications.

Precise positioning techniques, such as DGNSS, present enhancements to traditional GNSS positioning by providing correction data from a reference station 120 with a known, fixed location. More specifically, a reference station 120 uses a highly-accurate GNSS receiver to take GNSS measurements of RF signals 130. The measurements or information derived therefrom are provided to the mobile device 110 (e.g., via radio broadcast and/or a data communication network 150, such as the Internet) along with the known location of the reference station 120. The mobile device can then use the correction data (which can include measurement data such as raw measurement information, information derived from such measurements, and location information of the reference station 120) to enhance GNSS-based positioning by making corrections to the measured distances (e.g., pseudoranges) to each of the SVs 140. Such corrected distances (range estimates) can be used to generate a more accurate position estimate (position fix) for the mobile device. The more accurate position fix may be determined, for example, by a positioning engine executed by one or more processors of the mobile device 110.

The correction data can be communicated to the mobile device in various ways, including through a radio broadcast from a reference station 120 or through messages communicated by wireline or wireless networks (e.g., data communication network 150) that couple a service provider 170 to the mobile device 110. Such networks may include any of a variety of public and/or private networks, such as the Internet, one or more mobile carrier networks, and/or other such Wide Area Networks (WANs). In network-based DGNSS, correction data from a plurality of reference stations 120 is sent to a service provider (e.g., service provider 170). The mobile device 110 can then receive the correction data by sending a request to the service provider 170. The request may include an approximate location of the mobile device 110, e.g., based on a previously-known position, non-GNSS-based positioning (such as a tracking area in a wireless communications network or dead reckoning-based positioning of a vehicle), etc. In response to the request, the service provider 170, which may include one or more computer servers, can send the correction data and/or GNSS service data for the approximate location of the mobile device 110.

In some implementations of precise positioning, the GNSS system 100 is alternatively or additionally configured to support RTK positioning, which can provide a more accurate solution (e.g., on the order of centimeters or decimeters) than GNSS-based positioning alone or GNSS-based positioning augmented using traditional DGNSS techniques. Similar to DGNSS, RTK positioning can use a reference station 120 to make measurements of RF signals 130 with a highly-accurate GNSS receiver at a known location. However, RTK positioning can achieve much higher positioning accuracy than DGNSS by adding carrier phase measurement, whose measurement generating is performed at both the reference station 120 and at the mobile device 110.

In some aspects, the correction data can be generated at an optional correction server 180, based on measurements made at the reference station(s) 120. The correction server 180 may be communicatively coupled to the reference station(s) 120 and the mobile device 110 through the data communication network 150. Measurements (e.g., pseudorange and carrier phase measurements) made at the reference station(s) 120 and related data may be sent from the reference station(s) 120 to the correction server 180. In such implementations, the correction data may be sent from the correction server 180 to the mobile device 110.

The mobile device 110 can use the correction data that it receives to correct errors in measurements of the RF signals 130 from its own GNSS receiver. Error correction can include correction of satellite clock and orbit, ionospheric and tropospheric delays, phase wind-up, site displacement including solid earth tide, ocean loading, and/or pole tide. This more accurate position fix (i.e., position) may be determined, for example, by a positioning engine executed by one or more processors of the mobile device 110. In some implementations, the mobile device 110 may include a Standalone Positioning Engine (SPE) configured to determine a position fix using traditional GNSS techniques and a separate a Precise Positioning Engine (PPE) configured to correct the position fix of the SPE using correction data generated according to the improved DGNSS techniques described herein. The SPE and the PPE may be separately executed by one or more processors of the mobile device 110. Alternatively, the functionality of the SPE and PPE may be combined into a single positioning engine executed by one or more processors of the mobile device 110. An SPE or PPE may, in some instances, be integrated into a GNSS receiver of the mobile device 110.

The precise positioning engine or PPE of the mobile device 110 can determine position using differential correction and estimation techniques such as by using an Extended Kalman Filter (EKF), Weighted Least Squares (WLS), a particle filter, or the like. In some implementations, the precise positioning engine or PPE of the mobile device 110 may be configured to resolve ambiguity in a carrier phase measurement performed by a reference station 120. In other implementations, ambiguity resolution can instead be performed at the reference station prior to communicating correction data to the mobile device. The accuracy of the position fix for the mobile device 110 can depend on its distance, or "baseline length" 160, from the reference station 120, the accuracy of any differential corrections, and the like.

According to various aspects of the disclosure, a mobile device, e.g., the mobile device 110, measures each GNSS signal received at the mobile device to generate pseudorange measurements and carrier phase measurements. Such a GNSS receiver, for example, may be a GNSS receiver 980 (discussed in later sections) within the mobile device 110.

Similarly, a reference station, e.g., any of the reference station(s) 120, measures each GNSS signal received at the reference station to generate pseudorange measurements and carrier phase measurements. Such a GNSS receiver, for example, may be a GNSS receiver 1030 (discussed in later sections) within the reference station 120.

Figure 2:
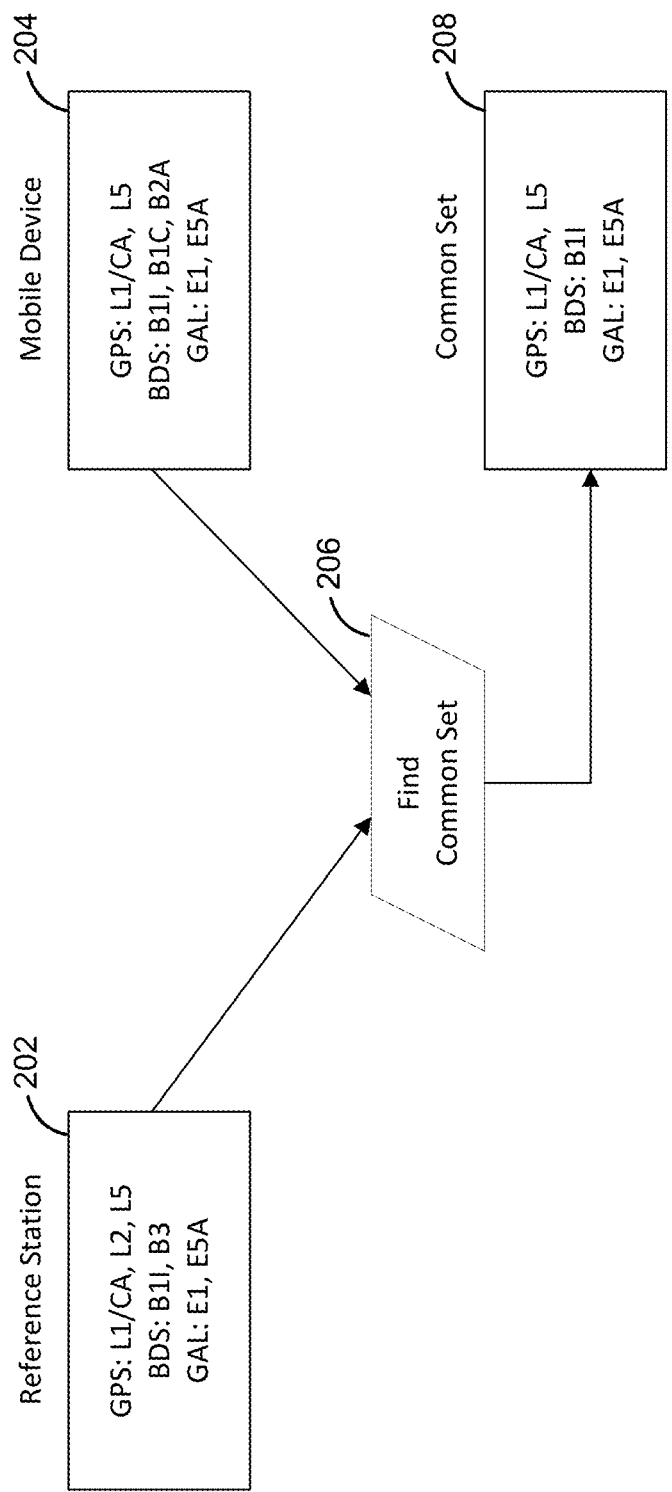
FIG. 2 illustrates a technique for GNSS precise positioning that is limited by the GNSS frequency bands received at the reference station.

FIG. 2 illustrates a technique for GNSS precise positioning that is limited by the GNSS frequency bands received at the reference station. According to aspects of such a conventional approach, a mobile device (e.g., mobile device 110 in FIG. 1) receives, from a reference station (e.g., reference station 120 in FIG. 1), correction data based on a pseudorange measurement of a GNSS signal sent from a satellite vehicle (e.g., SV 140 in FIG. 1) and received at the reference station on a GNSS frequency band (e.g., B1I in FIG. 2) centered on a GNSS carrier frequency. The mobile device obtains a pseudorange measurement of a GNSS signal sent from the satellite vehicle and received at the mobile device on the same GNSS frequency band. The mobile device determines a position of the mobile device using (a) the pseudorange measurement of the GNSS signal received at the mobile device on the GNSS carrier frequency and (b) the correction data based on the pseudorange measurement of the GNSS signal received at the reference station on the same GNSS carrier frequency.

The mobile device is thus limited to performing precise positioning on only GNSS carrier frequencies that are also received at the reference station, as illustrated in the example shown in FIG. 2. Here, a reference station is shown as being capable of receiving a set 202 of GNSS frequency bands, which include the L1/CA, L2, and L5 bands on the Global Positioning System (GPS) constellation, the B1I and B3 bands on the Beidou (BDS) constellation, and the E1 and E5A bands on the Galileo (GAL) constellation. A mobile device is shown as being capable of receiving a set 204 of GNSS frequency bands, which include the L1/CA and L5 bands on the GPS constellation, the B1I, B1C, and B2A bands on the BDS constellation, and the E1 and E5A bands on the GAL constellation. The set 202 and the set 204 of GNSS frequency bands are overlapping but not identical. The mobile device cannot expect to receive correction data for all of GNSS frequency bands (i.e., set 204) that it is capable of receiving. Instead, the mobile device is limited to only receiving correction data for those GNSS frequency bands (i.e., set 202) for which the reference station is capable of receiving.

In a typical implementation, a frequency overlap identification module 206 may be used identify a set 208 of GNSS frequency bands common to both the reference station and the mobile device. Here, the set 208 of GNSS frequency bands include the L1/CA and L5 bands on the GPS constellation, the B1I band on the BDS constellation, and the E1 and E5A bands on the GAL constellation. In at least one implementation, the frequency overlap identification module 206 is implemented within a PPE of the mobile device. Once the set 208 of GNSS frequency bands common to both the reference station and the mobile device is identified, the mobile device may select one or more GNSS signals from the common set of GNSS frequency bands to perform precise positioning. This procedure ensures that correction data would be available for the selected GNSS signals.

A drawback of the technique shown in FIG. 2 is that precise positioning performed at the mobile device is limited to the GNSS carrier frequencies capable of being received at the reference station. In some scenarios, this restriction can significantly curtail the potential capabilities of the positioning system. For example, the B1C band of the BDS constellation may be particularly desirable given that it provides a pilot channel that can be used for preventing "half-cycle slip." The B1C band has two channels: a data channel and a pilot channel. The data channel modulates data bits onto the carrier signal. Modulating data onto the GNSS carrier signal can introduce phase shifts such as a 180-degree phase shift, or half-cycle slip in the signal (e.g., in binary phase shift keying, or BPSK, modulation). Such phase shifts can introduce additional challenges for integer ambiguity resolution in RTK. By contrast, the pilot channel had no data modulated thereon and thus lacks half-cycle slips.

In another example, the B2A band of the BDS constellation may desirable due to its high code chip rate. Generally speaking, a high code chip rate is associated with lower impact from effects of multi-path and better measurement accuracy. In an environment where multi-path channels exist and are significant, a GNSS signal having a higher code chip rate may be preferred for this reason. For instance, a typical code chip rate of the B2A band is 10 MHz, which is a relatively high rate. By contrast, a typical code chip rate of the B1I band of the BDS constellation is only 2 MHz. A typical code chip rate of the L1/CA band of the GPS constellation is 1 MHz, which is even lower. By comparison, the B2A band is much more resilient to the effects of multi-path, because the code chip rate of the B2A band is five times higher than that of the B1I band and ten times higher than that of the L1/CA band.

Thus, in certain situations, it would be desirable for the mobile device to be able to perform precise positioning on GNSS signals it receives at carrier frequencies associated with the B1C and B2A bands. However, as shown in FIG. 2, the frequency overlap identification module 206 generates a common set 208 of GNSS frequency bands that does not include the B1C and B2A bands, because the reference station is not capable of receiving these two bands. Consequently, the mobile station is not allowed to select either the B1C or the B2A band in performing precise positioning.

Figure 3:
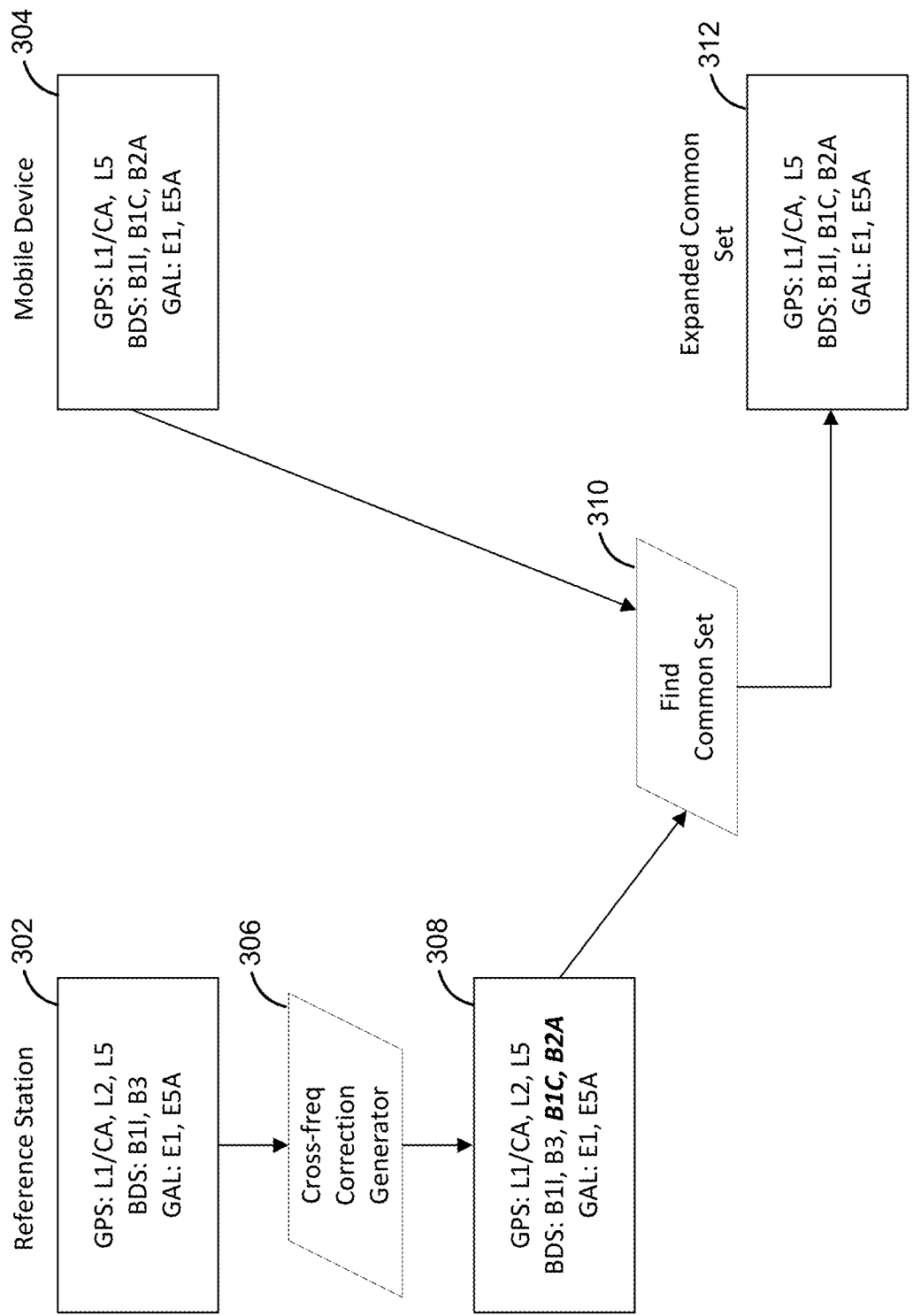
FIG. 3 illustrates a technique for GNSS precise positioning that is not limited by the GNSS frequency bands received at the reference station.

FIG. 3 illustrates a technique for GNSS precise positioning that is not limited by the GNSS frequency bands received at the reference station. According to certain aspects of the disclosure, a mobile device (e.g., mobile device 110 in FIG. 1) receives, from a reference station (e.g., reference station 120 in FIG. 1), correction data based on (1) a first pseudorange measurement of a first GNSS signal sent from a satellite vehicle (e.g., SV 140 in FIG. 1) and received at the reference station on a first GNSS carrier frequency (e.g., carrier frequency associated with the B1I band in FIG. 3) and (2) a second pseudorange measurement of a second GNSS signal sent from the satellite vehicle and received at the reference station on a second GNSS carrier frequency (e.g., carrier frequency associated with the B3 band in FIG. 3). The mobile device obtains a third pseudorange measurement of a third GNSS signal sent from the satellite vehicle and received at the mobile device on a third GNSS carrier frequency (e.g., carrier frequency associated with the B1C band in FIG. 3) different from the first GNSS carrier frequency and different from the second GNSS carrier frequency. The mobile device determines a position of the mobile device using (a) the third pseudorange measurement of the third GNSS signal on the third GNSS carrier frequency and (b) the correction data based on the first pseudorange measurement of the first GNSS signal on the first GNSS carrier frequency and the second pseudorange measurement of the second GNSS signal on the second GNSS carrier frequency.

In FIG. 3, a reference station is shown as being capable of receiving a set 302 of GNSS frequency bands, which include the L1/CA, L2, and L5 bands on the Global Positioning System (GPS) constellation, the B1I and B3 bands on the Beidou (BDS) constellation, and the E1 and E5A bands on the Galileo (GAL) constellation. A mobile device is shown as being capable of receiving a set 304 of GNSS frequency bands, which include the L1/CA and L5 bands on the GPS constellation, the B1I, B1C, and B2A bands on the BDS constellation, and the E1 and E5A bands on the GAL constellation. The set 302 and the set 304 of GNSS frequency bands are overlapping but not identical.

According to some aspects of the disclosure, available correction data is not limited to only those associated with GNSS carrier frequencies received at the reference station. A cross-frequency correction generator 306 receives measurements such as pseudorange measurements and/or carrier phase measurements on GNSS signals received at the reference station. Based on such input, the cross-frequency correction generator 306 generates correction data for GNSS carrier frequencies that are not received at the reference station. This correction data may include virtual pseudorange estimates, virtual carrier phase estimates, and/or virtual Doppler shift estimates, as discussed in more detail in later sections. For example, the cross-frequency correction generator 306 may generate correction data for a set 308 of GNSS carrier frequencies, such as GNSS carrier frequencies associated with the L1/CA, L2, and L5 bands on the GPS constellation, the B1I, B3, B1C, and B2A bands on the BDS constellation, and the E1 and E5A bands on the GAL constellation. Notably, these GNSS carrier frequencies include the GNSS carrier frequencies associated with the B1C band and the B2A band, discussed previously, that the reference station is not capable of receiving and indeed does not receive. Generation of such "virtual" correction data, such as virtual pseudorange measurements and/or virtual carrier phase measurements, is discussed in more detail in subsequent sections.

In some implementations, cross-frequency correction data is generated at the reference station. An example is found in FIG. 3, which shows the cross-frequency correction generator 306 being implemented as part of the reference station. The cross-frequency correction generator 306 may be executed, e.g., in one or more processors associated with the reference station. In such an implementation, the correction data sent from the reference station may comprise a virtual pseudorange measurement and/or a virtual carrier phase measurement generated (e.g., at cross-frequency correction generator 306) for a GNSS carrier frequency not being received at the reference station. The reference station may choose to generate such virtual pseudorange measurements and/or virtual carrier phase measurements for each of a plurality of different GNSS carrier frequencies (e.g., carrier frequencies associated with the B1C and B2A bands in FIG. 3) not being received at the reference station. In other implementations, the cross-frequency correction generator 306 may be implemented as part of a correction server (e.g., correction server 180), which may generate the correction data.

The mobile device, having received correction data for such an expanded list of GNSS carrier frequencies, can have more flexibility in determining which GNSS carrier frequenc(ies) on which to perform precise positioning. In this example, the mobile device may utilize a frequency overlap identification module 310 to generate a common set 312 of GNSS frequency bands that is both received at the mobile device and supported by the correction data received from the reference station. In the example shown, the common set 312 of GNSS frequency bands includes the L1/CA, L2, and L5 bands on the GPS constellation, the B1I, B1C, and B2A bands on the BDS constellation, and the E1 and E5A bands on the GAL constellation. In at least one implementation, the frequency overlap identification module 310 is implemented within a PPE of the mobile device.

In other implementations, cross-frequency correction data is generated at the mobile device. For example, the cross-frequency correction generator 306 may be implemented as part of the mobile device. The cross-frequency correction generator 306 may be executed, e.g., in one or more processors associated with the mobile device. In such an implementation, the correction data sent from the reference station may comprise at least two pseudorange measurements and/or at least two carrier phase measurements for GNSS carrier frequencies received at the reference station.

The mobile device, having received correction data in the form of pseudorange measurements and/or carrier phase measurements for GNSS carrier frequencies (e.g., carrier frequencies associated with the B1I and B3 bands in FIG. 3) limited those received at the reference station, may use such measurements to generate virtual pseudorange measurements and/or virtual carrier phase measurements for GNSS carrier frequencies (e.g., carrier frequencies associated with the B1C and B2A bands in FIG. 3) not being received at the reference station. The mobile device may then use the virtual pseudorange measurements and/or virtual carrier phase measurements for precise positioning based on pseudorange and/or carrier phase measurements made on GNSS signals received at the mobile device on GNSS carrier frequencies not being received at the reference station.

Regardless of whether it is implemented at the reference station or the mobile station, the cross-frequency correction generator 306 generates each virtual pseudorange measurement based on a linear combination of at least two existing pseudorange measurements of GNSS signals received at the reference station. Similarly, the cross-frequency correction generator 306 generates each virtual carrier phase measurement based on a linear combination of at least two existing carrier phase measurements of GNSS signals received at the reference station (if carrier phase correction is applicable, e.g., in RTK precise positioning).

According to aspects of the disclosure, a linear combination of (1) a first pseudorange measurement of a first GNSS signal sent from a satellite vehicle and received at a reference station on a first GNSS carrier frequency and (2) a second pseudorange measurement of a second GNSS signal sent from the same satellite vehicle and received at the reference station on a second GNSS carrier frequency yields a third pseudorange measurement for a third GNSS carrier frequency. In certain aspects, the third GNSS carrier frequency can be controlled by adjusting the coefficients, or weights, used in the linear combination. For example, if a mobile device receives a GNSS signal on a GNSS carrier frequency (e.g., carrier frequency associated with the B1C band in FIG. 3) not being received at the reference station, a virtual pseudorange measurement for that GNSS carrier frequency can be generated based on a linear combination of (1) a first pseudorange measurement of a first GNSS signal sent from a satellite vehicle and received at the reference station on a first GNSS carrier frequency (e.g., carrier frequency associated with the B1I band in FIG. 3) and (2) a second pseudorange measurement of a second GNSS signal sent from the same satellite vehicle and received at the reference station on a second GNSS carrier frequency (e.g., carrier frequency associated with the B3 band in FIG. 3).

Similarly, a linear combination of (1) a first carrier phase measurement of a first GNSS signal sent from a satellite vehicle and received at a reference station on a first GNSS carrier frequency and (2) a second carrier phase measurement of a second GNSS signal sent from the same satellite vehicle and received at the reference station on a second GNSS carrier frequency yields a third carrier phase measurement for the third GNSS carrier frequency. Thus, a virtual carrier phase measurement may also be generated for a GNSS carrier frequency not being received at the reference station. Once again, the third GNSS carrier frequency can be controlled by adjusting the coefficients, or weights, used in the linear combination. For example, if a mobile device receives a GNSS signal on a GNSS carrier frequency (e.g., carrier frequency associated with the B1C band in FIG. 3) not being received at the reference station, a virtual carrier phase measurement for that GNSS carrier frequency can be generated based on a linear combination of (1) a first carrier phase measurement of a first GNSS signal sent from a satellite vehicle and received at the reference station on a first GNSS carrier frequency (e.g., carrier frequency associated with the B1I band in FIG. 3) and (2) a second carrier phase measurement of a second GNSS signal sent from the same satellite vehicle and received at the reference station on a second GNSS carrier frequency (e.g., carrier frequency associated with the B3 band in FIG. 3).

In some aspects of the disclosure, the coefficients for each linear combination mentioned above can be derived based on mathematical models of pseudorange measurements and/or carrier phase measurements. Referring back to FIG. 1, generally speaking, a pseudorange is an estimate of the actual distance (geometric range) between a transmitter (e.g., an SV 140) and a receiver (e.g., reference station 120 or mobile device 110), using correlation between a pseudo-random binary sequence received in an RF signal (e.g., RF signal 130) and a reference signal. The accuracy of a pseudorange estimate is affected by various factors such as ionospheric and tropospheric delays, clock bias, and the like. Because reference station 120 is in close proximity to the mobile device 110 (e.g., within 30 kilometers), the effects of certain types of errors such as ionospheric delay and tropospheric delay are similar for the same GNSS signal received by reference station 120 and mobile device 110. Accordingly, if the degree of error in a pseudorange estimate performed by the reference station 120 is determined (which is possible since the location of the reference station 120 is known), then a correction can be applied to a pseudorange measurement of the same GNSS signal by the mobile device 110. Pseudorange measurements are sometimes referred to as code pseudorange measurements to distinguish from carrier phase measurements of the distance between a transmitter and a receiver.

A first pseudorange measurement $P_{L1}$ of a first GNSS signal L1 made at the reference station 120, as well as a second pseudorange measurement $P_{L2}$ of a second GNSS signal L2 made at the reference station 120, can be expressed mathematically as follows:

$$P_{L1} = \rho + dT + Trop + dIono + \epsilon_{P_{L1}} \quad (1)$$

$$P_{L2} = \rho + dT + Trop + dIono\frac{f_1^2}{f_2^2} + \epsilon_{P_{L2}} \quad (2)$$

where $\rho$ is geometric range, dT is the difference between the clocks of the receiver and transmitter (in this instance, SV 140 and reference station 120), Trop is tropospheric delay, dIono is ionospheric delay on L1 band (more specifically, a residual ionospheric delay error after applying a model of the ionosphere to reduce such error), $f_1$ and $f_2$ are the carrier frequencies of the GNSS signal L1 and L2, respectively, and c represents noise and multipath error associated with reception of the GNSS signal L1 and L2, respectively. In at least some embodiments, the carrier frequencies $f_1$ and $f_2$ are different frequencies. From equations 1 and 2, it can be seen that each of the pseudorange measurements includes the true distance or geometric range between the reference station 120 and the SV 140, plus various error terms associated with clock bias, ionospheric and tropospheric error, noise, and multipath error. As expressed here, pseudorange terms such $P_{L1}$ and $P_{L2}$ and the geometric range term $\rho$ may be expressed in units of distance, such as meters (m). Each of the transmitter and receiver clock difference term dT, tropospheric delay Trop, ionospheric delay dIono, and noise and multipath-attributed error terms $\epsilon_{P_{L1}}$ and $\epsilon_{P_{L2}}$ may also be expressed in units of distance, such as (m). Alternatively, these terms may be expressed in units of time, by dividing each term by a speed term such as the speed of light through space or relevant medium, e.g., $3*10^8$ meters per second (m/s).

Carrier phase measurements are another way to determine a measure of the distance between a transmitter and a receiver and are expressed in units of cycles of a carrier frequency of the RF signal transmitted. Carrier phase measurements are with much higher accuracy, namely one percent of the carrier wavelength and at millimeter level. However, there is one unknown integer number of cycles called ambiguity term in a carrier phase measurement, therefore carrier phase measurement cannot be directly used for GNSS positioning like pseudorange measurement, before resolving the unknown integer ambiguity. This ambiguity can be resolved through the estimation over time along with the GNSS satellite geometry change. Ambiguity resolution may involve using information about the transmitting satellite (e.g., satellite fractional bias) and/or using ambiguity resolution techniques such as moving window averaging, integer ambiguity search, etc.

A first carrier phase measurement $\Phi_{L1}$ of the first GNSS signal L1 made at the reference station 120, as well as a second carrier phase measurement $\Phi_{L2}$ of the second GNSS signal L2 made at the reference station 120, can be expressed mathematically as follows:

$$\Phi_{L1} = \rho + dT + Trop - dIono + \lambda_{L1}N_{L1} + \epsilon_{\Phi_{L1}} \tag{3}$$

$$\Phi_{L2} = \rho + dT + Trop - dIono\frac{f_1^2}{f_2^2} + \lambda_{L2}N_{L2} + \epsilon_{\Phi_{L2}} \tag{4}$$

The carrier phase measurements include components corresponding to those of the pseudorange measurements. In this instance, the sign of the of the ionospheric error is negative instead of positive as in equations 1 and 2. Hence, ionospheric error is generally referred to as ionospheric advance (not delay) in the context of carrier phase measurements. Additionally, the carrier phase measurements include, as error terms: an ambiguity term N, which is a value representing the number of cycles of the carrier frequency taken in traveling from the transmitter to the receiver, and a satellite fractional bias term s representing error due to inaccuracy of a satellite clock (e.g., a clock of the SV 140). $\lambda_{L1}$ and $\lambda_{L2}$ are the wavelengths of the GNSS signal L1 and L2, respectively.

A third pseudorange measurement and a third carrier phase measurement based on a third GNSS signal L3 that is needed, but which is not available at the reference station 120, may be expressed mathematically as:

$$P_{L3} = \rho + dT + Trop + dIono\frac{f_1^2}{f_3^2} + \epsilon_{P_{L3}} \tag{5}$$

$$\Phi_{L3} = \rho + dT + Trop - dIono\frac{f_1^2}{f_3^2} + \lambda_{L3}N_{L3} + \epsilon_{\Phi_{L3}} \tag{6}$$

where the geometric range $\rho$, receiver and transmitter clock difference dT, tropospheric delay Trop, ionospheric delay on L1 band dIono, ambiguity term N, and noise and multipath error c are similar to comparable components described previously.

Here, the reference station 120 is not capable (e.g., due to its manufacturer, model, firmware version, etc.) of receiving the third GNSS signal L3, which is transmitted on the third carrier frequency $f_3$. Nevertheless, mobile device 110 may need to perform precision positioning, e.g., carry out correction, on pseudorange or carrier phase measurements on the third GNSS signal L3. To address this need, "virtual" GNSS measurements may be generated, based on linear combinations of existing GNSS measurements. For example, a virtual pseudorange measurement $\hat{P}_{L3}$ may be generated as a linear combination of the first pseudorange measurement $P_{L1}$ and the second pseudorange measurement $P_{L2}$. A virtual carrier phase measurement $\hat{\Phi}_{L3}$ may be generated as a linear combination of the first carrier phase measurement $\Phi_{L1}$ and the second carrier phase measurement $\Phi_{L2}$:

$$\hat{P}_{L3} = a*P_{L1} + b*P_{L2} \tag{7}$$

$$\hat{\Phi}_{L3} = a*P_{L1} + b*\Phi_{L2} \tag{8}$$

According aspects of the disclosure, the values of the coefficients a and b may be found by limiting the solutions to satisfy two criteria expressed as:

$$a + b = 1 \tag{9}$$

$$\frac{a}{f_1^2} + \frac{b}{f_2^2} = \frac{1}{f_3^2} \tag{10}$$

As discussed, $f_1$ and $f_2$ are the carrier frequencies of the GNSS signal L1 and L2, respectively. Typically, the carrier frequencies $f_1$ and $f_2$ are carrier frequencies different from one another. Solving equations 9 and 10 yields explicit solutions for the values of coefficients a and b:

$$a = \frac{f_1^2 f_3^2 - f_1^2 f_2^2}{f_1^2 f_3^2 - f_2^2 f_3^2} \tag{11}$$

$$b = 1 - a = \frac{f_1^2 f_2^2 - f_2^2 f_3^2}{f_1^2 f_3^2 - f_2^2 f_3^2} \tag{12}$$

In some aspects of the disclosure, selecting coefficients a and b to satisfy equations 9 and 10 provides a virtual pseudorange measurement $\hat{P}_{L3}$ and a virtual carrier phase measurement $\hat{\Phi}_{L3}$ that can be used (e.g., as correction data) to remove errors in the pseudorange measurement and carrier phase measurement made by a mobile device (e.g., mobile device 110). Such errors include ionosphere delay errors and timing group delay (TGD) errors that may exist in the mobile device's measurements.

In various implementations, the carrier frequency $f_3$ can be set to any desired value. That is, a virtual pseudorange measurement $P_{L3}$ and a virtual carrier phase measurement $\hat{\Phi}_{L3}$ can be generated for any desired GNSS carrier frequency $f_3$, based on a linear combination of existing pseudorange measurements and carrier phase measurements of two GNSS signals received at the reference station on a first GNSS carrier frequency $f_1$ and a second GNSS carrier frequency $f_2$. In one example, the reference station 120 (or the mobile device 110) may generate a virtual pseudorange measurement and a virtual carrier phase measurement for a desired GNSS carrier frequency $f_3$, which may be B1C in FIG. 3, based on a linear combination of existing pseudorange measurements and carrier phase measurements of the B1I and B3 signals in FIG. 3. In another example, the reference station 120 (or the mobile device 110) may generate a virtual pseudorange measurement and a virtual carrier phase measurement for a desired GNSS carrier frequency $f_3$, which may be B2A in FIG. 3, based on a linear combination of existing pseudorange measurements and carrier phase measurements of the same B1I and B3 signals in FIG. 3. This process can be repeated to generate other virtual pseudorange measurements and virtual carrier phase measurements for additional GNSS carrier frequencies that are desired.

In some aspects of the disclosure, equations 1-6 may be modified to refine the models for the GNSS signal measurements, by include additional terms such as a satellite differential code bias (DCB) as well as a fractional cycle bias (FCB):

$$P_{L1} = \rho + dT + Trop + dIono + DCB_{P_{L1}} + \epsilon_{P_{L1}} \quad (13)$$

$$P_{L2} = \rho + dT + Trop + dIono\frac{f_1^2}{f_2^2} + DCB_{P_{L2}} + \epsilon_{P_{L2}} \quad (14)$$

$$\Phi_{L1} = \rho + dT + Trop - dIono + \lambda_{L1}(N_{L1} + FCB_{\Phi_{L1}}) + \epsilon_{\Phi_{L1}} \quad (15)$$

$$\Phi_{L2} = \rho + dT + Trop - dIono\frac{f_1^2}{f_2^2} + \lambda_{L2}(N_{L2} + FCB_{\Phi_{L2}}) + \epsilon_{\Phi_{L2}} \quad (16)$$

$$P_{L3} = \rho + dT + Trop + dIono\frac{f_1^2}{f_3^2} + DCB_{P_{L3}} + \epsilon_{P_{L3}} \quad (17)$$

$$\Phi_{L3} = \rho + dT + Trop - dIono\frac{f_1^2}{f_3^2} + \lambda_{L3}(N_{L3} + FCB_{\Phi_{L3}}) + \epsilon_{\Phi_{L3}} \quad (18)$$

There may exist a mismatch in the differential code bias term, DCB, between the actual third GNSS signal measurement (e.g., pseudorange measurement $P_{L3}$) and the virtual GNSS signal measurement (e.g., pseudorange measurement $\hat{P}_{L3}$). The virtual pseudorange measurement $\hat{P}_{L3}$ can be expressed as:

$$\hat{P}_{L3} = a * P_{L1} + b * P_{L2} = \rho + dT + Trop + dIono\frac{f_1^2}{f_3^2} + DCB_{\hat{P}_{L3}} + \epsilon_{P_{L3}} \quad (19)$$

where the virtual DCB term $DCB_{\hat{P}_{L3}}$ is expressed as:

$$DCB_{\hat{P}_{L3}} = a * DCB_{P_{L1}} + b * DCB_{P_{L2}} \quad (20)$$

DCB is typically caused by satellite hardware delay, which may have different values on different types of pseudorange measurements, either at the same GNSS carrier frequency or at different GNSS carrier frequencies. Thus, the virtual DCB term $DCB_{\hat{P}_{L3}}$ is not necessarily the same as the actual DCB term $DCB_{P_{L3}}$. If such difference is not considered in the virtual GNSS measurement, precision positioning performance (e.g., as carried out by the PPE) may be degraded. Thus, according to some aspects of the disclosure, a virtual pseudorange measurement for a third GNSS carrier frequency is generated by taking into account a differential code bias correction term. In one implementation, it is assumed that satellite DCB is long-term stable (e.g., on the order of nanoseconds of stability over months or even years, depending on the GNSS constellation/satellite type). As such, the difference between the virtual DCB term $DCB_{\hat{P}_{L3}}$ and the actual DCB term $DCB_{P_{L3}}$ is pre-computed, i.e., computed prior to reception of the GNSS signal L1 and L2. A differential code bias correction term $\Delta DCB_{\hat{P}_{L3}}$ based on known values of differential code biases $DCB_{P_{L1}}$, $DCB_{P_{L2}}$, and $DCB_{P_{L3}}$, for the first, second, and third GNSS carrier frequencies, respectively, may be computed as:

$$\Delta DCB_{\hat{P}_{L3}} = DCB_{P_{L3}} - (a * DCB_{P_{L1}} + b * DCB_{P_{L2}}) \quad (21)$$

A modified version of the virtual pseudorange measurement $\hat{P}_{L3}$ can be expressed as:

$$\hat{P}_{L3} = a * P_{L1} + b * P_{L2} + \Delta DCB_{\hat{P}_{L3}} \quad (22)$$

$$= \rho + dT + Trop + dIono\frac{f_1^2}{f_3^2} + DBC_{\hat{P}_{L3}} + \Delta DCB_{\hat{P}_{L3}} + \epsilon_{P_{L3}}$$

By including the differential code bias correction term $\Delta DCB_{\hat{P}_{L3}}$, the modified version of the virtual pseudorange measurement $\hat{P}_{L3}$ can be immune to the impact of DCB mismatch between the virtual DCB term $DBC_{\hat{P}_{L3}}$ and the actual DCB term $DCB_{P_{L3}}$, thereby improving the performance of precision position as performed by the PPE.

There may also exist a mismatch in the fractional cycle bias term, FCB, between the actual third GNSS signal measurement (e.g., carrier phase measurement $\Phi_{L3}$) and the virtual GNSS signal measurement (e.g., carrier phase measurement $\hat{\Phi}_{L3}$). The virtual carrier phase measurement $\hat{\Phi}_{L3}$ can be expressed as:

$$\hat{\Phi}_{L3} = a * \Phi_{L1} + b * \Phi_{L2} \quad (23)$$

$$= \rho + dT + Trop - \frac{dIono}{f_3^2} + \lambda_{L3}(M_{L3} + FCB_{\hat{\Phi}_{L3}}) + \epsilon_{\hat{\Phi}_{L3}}$$

where $M_{L3}$ is the ambiguity integer term and $FCB_{\Phi_{L3}}$ is the fractional cycle bias for the virtual carrier phase measurement $\Phi_{L3}$.

Similar to the DCB term in virtual pseudorange estimate, FCB is also caused by satellite hardware delay, and it has different values on different types of carrier phase measurements, either at the same or different frequencies. Therefore, the virtual FCB term $FCB_{\hat{\Phi}_{L3}}$ is not necessarily the same value as the actual FCB term $FCB_{\Phi_{L3}}$. If such difference is not considered in the new virtual measurement, the double-differenced ambiguity term at the third frequency band L3 may not have an integer property when the virtual third-frequency carrier phase correction is applied.

Different approaches may be taken to resolve such a non-integer ambiguity term issue, which can plague the virtual carrier phase measurement. According to one embodiment, the third-frequency ambiguity term is simply excluded from the integer ambiguity resolution process described earlier. In such an implementation, the number of cycles of the carrier wave in the expression for the virtual carrier phase measurement is simply kept as a floating-point number, as opposed to an integer. According to another embodiment, the FCB correction is computed using other reference stations which have the actual measurement on the third-frequency band L3. Here, the computed FCB correction may be transmitted through using a messaging protocol (e.g., through a QCT priority message) to the device responsible for computing the virtual carrier phase (e.g., the mobile device). At the device side, after applying the computed FCB correction, the third-frequency band ambiguity can retain its integer property and therefore can be included in the integer ambiguity resolution process.

For instance, the FCB correction, $\delta FCB_{\Phi_{L3}}$, can be computed from other reference stations which have the actual measurement on the third-frequency band according to the equation below:

$$\delta FCB_{\hat{\Phi}_{L3}} = \left(\frac{\Phi_{L3} - \hat{\Phi}_{L3}}{\lambda_{L3}}\right) - \left(\frac{\Phi_{L3} - \hat{\Phi}_{L3}}{\lambda_{L3}}\right) \qquad (24)$$

where $\hat{\Phi}_{L3}$ is the virtually generated third frequency band carrier phase measurement (m), $\Phi_{L3}$ is the actual third frequency band carrier phase measurement (m), $\lambda_{L3}$ is the wavelength of third frequency band (m), and ( ) represents an operation for rounding-off to closest integer operator.

In the example described in equations 1-24, a linear combination of pseudorange and/or carrier phase measurements for two GNSS signals, L1 and L2, at two GNSS carrier frequencies, $f_1$ and $f_2$, generates virtual pseudorange and/or carrier phase measurement for a virtual GNSS signal, L3, at a desired GNSS carrier frequency, $f_3$. However, aspects of the present disclosure are not limited to using only two GNSS signals in the linear combination of pseudorange and/or carrier phase measurements. Indeed, in some aspects of the disclosure, the number of GNSS signals used in the linear combination can be greater than two.

Just as an example, a linear combination of pseudorange and/or carrier phase measurements for three GNSS signals, L1, L2, and L3, at three GNSS carrier frequencies, $f_1$, $f_2$, and $f_3$, can generate virtual pseudorange and/or carrier phase measurements for a virtual GNSS signal, L4, at a desired GNSS carrier frequency, $f_4$. In such a case, a virtual pseudorange measurement $\hat{P}_{L4}$ may be generated as a linear combination of the first pseudorange measurement $P_{L1}$, the second pseudorange measurement $P_{L2}$, and the third pseudorange measurement $P_{L3}$. A virtual carrier phase measurement $\hat{\Phi}_{L4}$ may be generated as a linear combination of the first carrier phase measurement $\Phi_{L1}$, the second carrier phase measurement $\Phi_{L2}$, and the third carrier phase measurement $\Phi_{L3}$:

$$\hat{P}_{L4} = a*P_{L1}b*P_{L2}+c*P_{L3} \qquad (25)$$

$$\hat{\Phi}_{L4}a*\Phi_{L1}+b*\Phi_{L2}+c*\Phi_{L3} \qquad (26)$$

According to aspects of the disclosure, the values of the coefficients a, b, and c may be found by limiting the solutions to satisfy two criteria expressed as:

$$a+b+c = 1 \qquad (27)$$

$$\frac{a}{f_1^2} + \frac{b}{f_2^2} + \frac{c}{f_3^2} = \frac{1}{f_4^2} \qquad (28)$$

In some aspects of the disclosure, selecting coefficients a, b, and c to satisfy equations 27 and 28 provides a virtual pseudorange measurement $\hat{P}_{L4}$ and a virtual carrier phase measurement $\hat{\Phi}_{L4}$ that can be used (e.g., as correction data) to remove errors in the pseudorange measurement and carrier phase measurement made by a mobile device (e.g., mobile device 110). Such errors include ionosphere delay errors and timing group delay (TGD) errors that may exist in the mobile device's measurements Note that in this particular example, equations 27 and 28 are underdetermined, because there are three variables, a, b, and c, and only two equations. Thus, there may be more than one set of solutions that satisfy equations 27 and 28. More than one set of possible values of a, b, and c can be chosen to generate the virtual pseudorange $\hat{P}_{L4}$ and/or carrier phase measurements $O_{L4}$ at the desired GNSS carrier frequency $f_4$.

Doppler shift measurements are typically made of each received GNSS signal and used, along with pseudo range and/or carrier phase measurements, in position determination. A Doppler shift results from a relative velocity of an SV, such as a GNSS satellite, with respect to the receiver. The Doppler shift can be expressed as a time derivative of the carrier phase of the received GNSS signal. A first Doppler shift measurement $\dot{P}_{L1}$ of the first GNSS signal L1 made at the reference station 120, as well as a second Doppler shift measurement $\dot{P}_{L2}$ of the second GNSS signal L2 made at the reference station 120, can be expressed mathematically as:

$$\dot{P}_{L1} = \dot{\rho} + \dot{dT} + \dot{Trop} - \dot{dIono} + \epsilon_{\dot{P}_{L1}} \qquad (29)$$

$$\dot{P}_{L2} = \dot{\rho} + \dot{dT} + \dot{Trop} - \dot{dIono}\frac{f_1^2}{f_2^2} + \epsilon_{\dot{P}_{L2}} \qquad (30)$$

Here, the Doppler shift measurements $\dot{P}_{L1}$ and $\dot{P}_{L2}$ may be expressed in units of meters per second (m/s). The geometric range rate $\dot{\rho}$ may be expressed in units of (m/s). The receiver and transmitter clock difference rate $\dot{dT}$ may also be expressed in units of (m/s) and represents the rate of change of the difference between the receiver clock and the transmitter clock. The troposphere delay rate $\dot{Trop}$ may also be expressed in units of (m/s). The ionosphere delay residual error rate $\dot{dIono}$ may also be expressed in units of (m/s) and represents the ionosphere delay rate after applying the model described above. Carrier frequencies $f_1$ and $f_2$ are the carrier frequencies of the GNSS signal L1 and L2, respectively. The error terms $\epsilon_{\dot{P}_{L1}}$ and $\epsilon_{\dot{P}_{L2}}$ represent error in the Doppler shift measurements attributed to noise and multipath and may also be expressed in units of (m/s).

A third Doppler shift measurement based on a third GNSS signal L3 that is needed, but which is not available at the reference station 120, may be expressed mathematically as:

$$\dot{P}_{L3} = \dot{\rho} + \dot{dT} + \dot{Trop} - \dot{dIono}\frac{f_1^2}{f_3^2} + \epsilon_{\dot{P}_{L3}} \qquad (31)$$

where the geometric range rate $\dot{\rho}$, receiver and transmitter clock difference rate $\dot{dT}$, tropospheric delay rate $\dot{Trop}$, ionosphere delay residual error rate $\dot{dIono}$, and noise and multipath-attributed Doppler shift error term $\epsilon_{\dot{P}_{L1}}$ are similar to comparable components described previously.

Once again, the reference station 120 is not capable (e.g., due to its manufacturer, model, firmware version, etc.) of receiving the third GNSS signal L3, which is transmitted on the third carrier frequency $f_3$. Nevertheless, mobile device 110 may need to perform positioning, e.g., including estimating Doppler shift, on the third GNSS signal L3. To address this need, "virtual" GNSS measurements may be generated, based on linear combinations of existing GNSS measurements. For example, a virtual Doppler shift measurement $\hat{P}_{L3}$ may be generated as a linear combination of the first Doppler shift measurement $\dot{P}_{L1}$ and the second Doppler shift measurement $\dot{P}_{L2}$:

$$\hat{\dot{P}}_{L3} = a * \dot{P}_{L1} + b * \dot{P}_{L2} \tag{32}$$

According aspects of the disclosure, the values of the coefficients a and b may be found by limiting the solutions to satisfy two criteria expressed as:

$$a + b = 1 \tag{33}$$

$$\frac{a}{f_1^2} + \frac{b}{f_2^2} = \frac{1}{f_3^2} \tag{34}$$

Solving equations 33 and 34 yields explicit solutions for the values of coefficients a and b:

$$a = \frac{f_1^2 f_3^2 - f_1^2 f_2^2}{f_1^2 f_3^2 - f_2^2 f_3^2} \tag{35}$$

$$b = 1 - a = \frac{f_1^2 f_2^2 - f_2^2 f_3^2}{f_1^2 f_3^2 - f_2^2 f_3^2} \tag{36}$$

In various implementations, the carrier frequency $f_3$ can be set to any desired value. That is, a virtual Doppler shift measurement $\hat{\dot{P}}_{L3}$ can be generated for any desired GNSS carrier frequency $f_3$, based on a linear combination of existing Doppler shift measurements of two GNSS signals received at the reference station on a first GNSS carrier frequency $f_1$ and a second GNSS carrier frequency $f_2$. In one example, the reference station 120 (or the mobile device 110) may generate a virtual Doppler shift measurement for a desired GNSS carrier frequency $f_3$, which may be B1C in FIG. 3, based on a linear combination of existing Doppler shift measurements of the B1I and B3 signals in FIG. 3. In another example, the reference station 120 (or the mobile device 110) may generate a virtual Doppler shift measurement for a desired GNSS carrier frequency $f_3$, which may be B2A in FIG. 3, based on a linear combination of existing Doppler shift measurements of the same B1I and B3 signals in FIG. 3. This process can be repeated to generate other Doppler shift measurements for additional GNSS carrier frequencies that are desired. In some implementations, the impact of satellite differential code bias (DCB) on Doppler shift measurements are sufficiently small such that they are negligible and not taken into account in virtual Doppler shift measurements.

Figure 4:
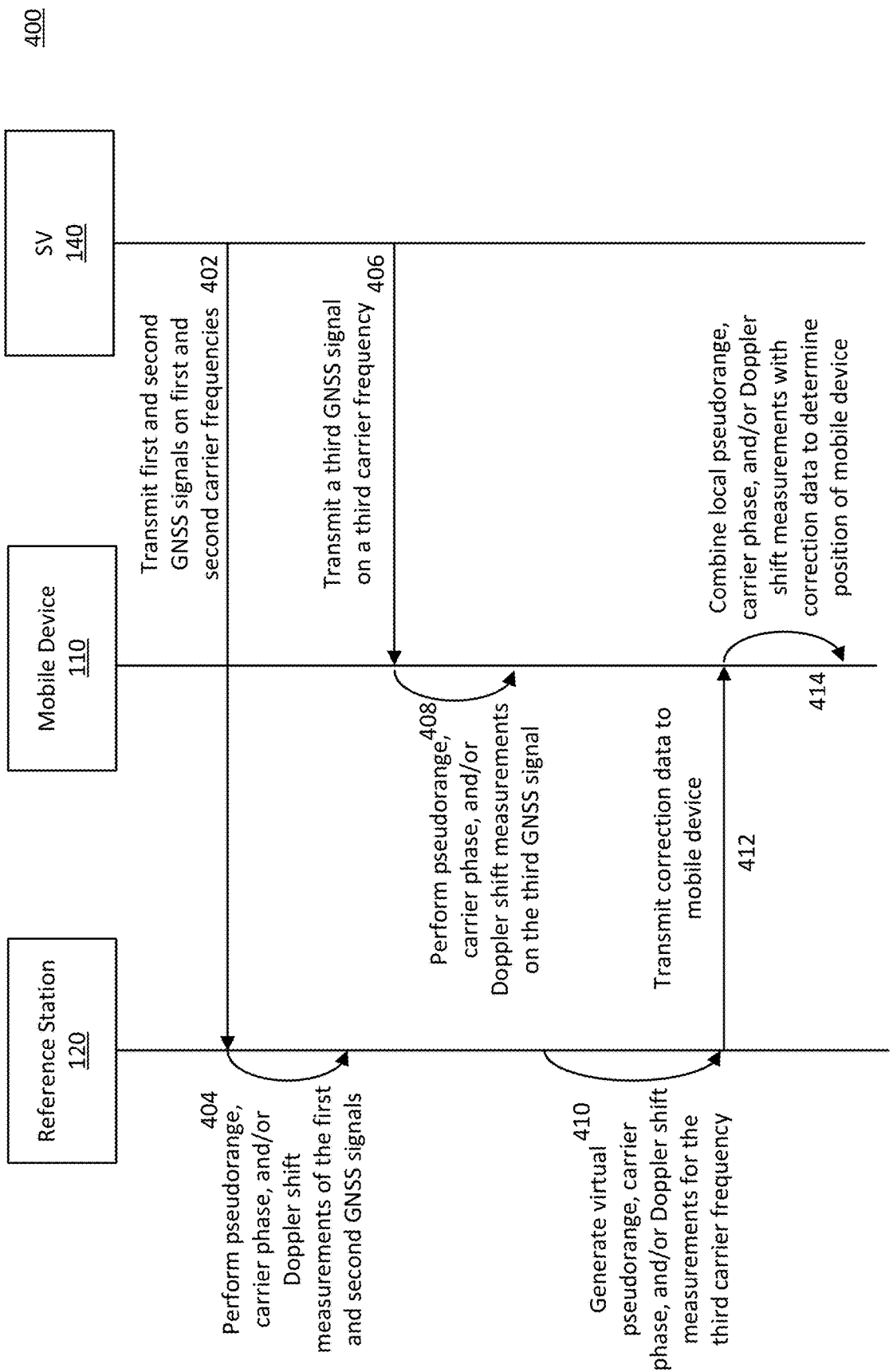
FIG. 4 is flow diagram illustrating a process for performing precise positioning based on virtual pseudorange, carrier phase, and/or Doppler shift measurements generated at a reference station, according to some aspects of the disclosure.

FIG. 4 is flow diagram illustrating a process 400 for performing precise positioning based on virtual pseudorange, carrier phase, and/or Doppler shift measurements generated at a reference station, according to some aspects of the disclosure. The process 400 involves functionality performed by a reference station 120, mobile device 110, and a GNSS satellite (SV 140), each of which is described above in connection with FIG. 1. The example of FIG. 4 is provided to illustrate that virtual pseudorange measurements, virtual carrier phase measurements, and/or virtual Doppler shift measurements can be generated at a reference station and sent as correction data to a mobile device. According to some aspects of the disclosure, mobile device 110 is within a predetermined proximity to reference station 120. The predetermined proximity may be set at a value such as 5 kilometers, 10 kilometers, 30 kilometers, 50 kilometers, 100 kilometers, or some other distance. This condition may be deemed satisfied if the baseline distance 160 is at or below the predetermined proximity. Although one satellite is shown, it will be understood that the functionality depicted in FIG. 4 may be repeated in connection with other satellites of a GNSS constellation (e.g., to perform precise positioning between mobile device 110 and a second SV, between mobile device 110 and a third SV, between the mobile device 110 and a fourth SV, etc.), with correction data provided by one reference station 120 and possibly additional reference stations, in order to determine a number of positioning measurements sufficient for estimating the position of the mobile device 110 geometrically (e.g., using multiangulation and/or multilateration) and based on distance and/or angle measurements, along with the known position of one or more components such as reference stations 120.

At 402, SV 140 transmits a first GNSS signal L1 on a first carrier frequency $f_1$ and a second GNSS signal L2 on a second carrier frequency $f_2$. For example, SV 140 may transmit a signal using the B1I frequency and another signal using the B3 frequency, e.g., as part of dual-band transmission. For illustration purposes, certain examples of the present disclosure refers to B1I and B3 frequencies. However, it will be understood that other frequencies may also be used. Accordingly, the techniques described herein are not limited to being used with B1I and B3 frequencies. The first and second GNSS signals may be transmitted concurrently and are typically broadcast at periodic intervals.

At 404, reference station 120 receives the first GNSS signal and the second GNSS signal using its local GNSS receiver and performs pseudorange, carrier phase, and/or Doppler measurements on each signal. The pseudorange measurements can be denoted $P_{L1}$ and $P_{L2}$. The carrier phase measurements can be denoted $\Phi_{L1}$ and $\Phi_{L2}$. The Doppler shift measurements can be denoted $\dot{P}_{L1}$ and $\dot{P}_{L2}$.

At 406, SV 140 transmits a third GNSS signal L3 on a third carrier frequency $f_3$. For example, SV 140 may transmit a signal using the B1C. This particular carrier frequency is presented as an example, and it will be understood that other frequencies may also be used. The third GNSS signal L3 may be transmitted concurrently with the first GNSS signal L1 and the second GNSS signal L2 and is typically broadcast at periodic intervals. In some instances, an SV may transmit on more than three frequencies concurrently.

At 408, mobile device 110 receives the third GNSS signal using its local GNSS receiver and performs pseudorange, carrier phase, and/or Doppler shift measurements on third GNSS signal. The local pseudorange measurement can be denoted $P_{L3}$, the local carrier phase measurement can be denoted $\Phi_{L3}$, and the local Doppler shift measurement can be denoted $\dot{P}_{L3}$.

At 410, reference station 120 generates virtual pseudorange and carrier phase measurements for the third carrier frequency $f_3$. The virtual pseudorange measurement and the virtual carrier phase measurement may be generated based on processes described herein, e.g., according to equations 1-24. The virtual pseudorange measurement can be denoted $\hat{P}_{L3}$, and the virtual carrier phase measurement can be denoted $\hat{\Phi}P_{L3}$. Reference station 120 may also generate a virtual Doppler shift measurement (which can be denoted as $\hat{P}_{L3}$) for the third carrier frequency $f_3$, as discussed previously, e.g., according to equations 29-36.

At 412, reference station 120 transmits correction data to mobile device 110. The correction data may comprise the virtual pseudorange measurement, the virtual carrier phase measurement, and/or the virtual Doppler shift measurement generated at reference station 120.

At 414, mobile device 110 combines local pseudorange measurement $P_{L3}$, local carrier phase measurement $\Phi_{L3}$, and/or local Doppler shift measurement $\dot{P}_{L3}$ with the correction data received from reference station 120 to determine the position of mobile device 110. The correction data may comprise the virtual pseudorange measurement $\hat{P}_{L3}$, the virtual carrier phase measurement $\hat{\Phi}_{L3}$, and/or the virtual Doppler shift measurement $\hat{\dot{P}}_{L3}$. In particular, the mobile device 110 can use the correction data to correct errors in the local pseudorange measurements, e.g., according to DNSS techniques. Also, the mobile device 110 can use the correction data to correct errors in the local carrier phase measurements, e.g., according to RTK techniques. The mobile device 110 can also use the correction data to correct Doppler shift measurements. Having obtained corrected, local pseudorange, carrier phase measurements, and/or Doppler shift measurements, mobile device 110 can establish its position through traditional GNSS positioning techniques. This may involve obtaining additional pseudorange, carrier phase measurements, and/or Doppler shift measurements corresponding to signal from other space vehicles. In general, measurements of signals from at least four GNSS satellites are needed to establish a three-dimensional position fix (horizontal coordinates such as latitude and longitude, plus elevation) through GNSS positioning.

As previously discussed, in some aspects of the disclosure, correction data can be generated at an optional correction server (e.g., correction server 180 in FIG. 1), based on measurements made at one or more reference stations. In such implementations, the process may be similar to that shown in FIG. 4 in many respects. For example, steps 402, 404, 406, and 408 may be carried out in the manner shown in FIG. 4 and described previously. However, steps 410 and 412 may be replaced by operations performed in conjunction with the correction server. For example, once the pseudorange and/or carrier phase measurements of the first and second GNSS signals have been made at reference station 120, the measurements may be sent to the correction server. The correction server, instead of reference station 120, may generate the virtual pseudorange, carrier phase, and/or Doppler shift measurements for third carrier frequency. Also, the correction server may send the correction data to mobile device 110. At 414, mobile device 110 may combine local pseudorange measurement $P_{L3}$, local carrier phase measurement $\Phi_{L3}$, and/or local Doppler shift measurement $\dot{P}_{L3}$ with the correction data received from correction server to determine the position of mobile device 110.

Implementation of the technique illustrated in FIG. 4 can potentially be detected based on the existence of a flag or other indication provided by the reference station that a virtual pseudorange measurement, a virtual carrier phase measurement, and/or virtual Doppler shift measurement provided (e.g., as correction data) by the reference station is not suitable to be used in ambiguity resolution. As shown in equations 3 and 4, the carrier phase of a GNSS signal includes an ambiguity term N. The ambiguity term can be resolved by a receiving device (e.g., a mobile device) by combining or taking the difference of multiple carrier phase measurements. The introduction of "virtual" carrier phase measurement (e.g., equation 8) generated based on a linear combination of actual carrier phase measurements, has the potential to snarl the ambiguity resolution process. The virtual carrier phase according to certain aspects of the disclosure is a linear combination of, for example, two actual carrier phase measurements $N_1$ and $N_2$. If the two actual phase measurements have different ambiguity terms ($N_1 \neq N_2$), then a linear combination of the two ambiguity terms would likely produce a non-integer ambiguity term $\hat{N}$ as a component of the virtual carrier phase measurement. Such a non-integer ambiguity term is not a real ambiguity term (i.e., it is not a real number of carrier phase cycles), and it cannot be used in the ambiguity resolution process. Thus, the reference station likely would provide a flag or some other indication, e.g., as part of the correction data, that the virtual carrier phase measurement is to be treated differently, e.g., it cannot be used in ambiguity resolution. Otherwise, a mobile device receiving the virtual carrier phase measurement may not be able to tell it apart from an actual carrier phase measurement and may use the virtual carrier phase measurement in ambiguity resolution, which can lead to incorrect ambiguity resolution results.

Figure 5:
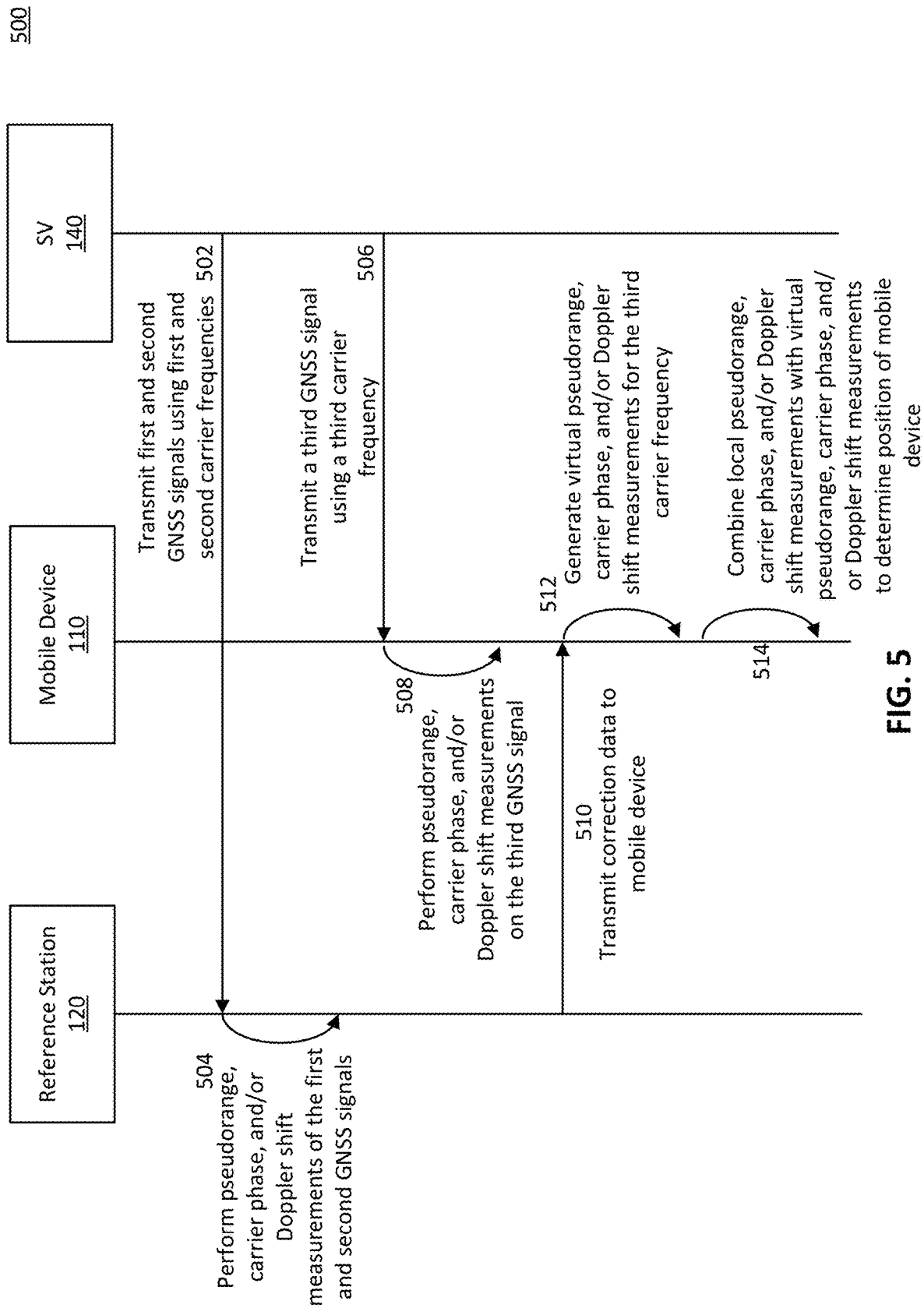
FIG. 5 is flow diagram illustrating a process for performing precise positioning based on virtual pseudorange, carrier phase, and/or Doppler shift measurements generated at a mobile device, according to some aspects of the disclosure.

FIG. 5 is flow diagram illustrating a process 500 for performing precise positioning based on virtual pseudorange, carrier phase, and/or Doppler shift measurements generated at a mobile device, according to some aspects of the disclosure. The process 500 involves functionality performed by a reference station 120, mobile device 110, and a GNSS satellite (SV 140), each of which is described above in connection with FIG. 1. The example of FIG. 5 is provided to illustrate that virtual pseudorange measurements, virtual carrier phase measurements, and/or virtual Doppler shift measurements can be generated at a mobile device, based on correction data received from a reference station. According to some aspects of the disclosure, mobile device 110 is within a predetermined proximity to reference station 120. The predetermined proximity may be set at a value such as 5 kilometers, 10 kilometers, 30 kilometers, 50 kilometers, 100 kilometers, or some other distance. This condition may be deemed satisfied if the baseline distance 160 is at or below the predetermined proximity. Although one satellite is shown, it will be understood that the functionality depicted in FIG. 5 may be repeated in connection with other satellites of a GNSS constellation (e.g., to perform precise positioning between mobile device 110 and a second SV, between mobile device 110 and a third SV, between the mobile device 110 and a fourth SV, etc.), with correction data provided by one reference station 120 and possibly additional reference stations, in order to determine a number of positioning measurements sufficient for estimating the position of the mobile device 110 geometrically (e.g., using multiangulation and/or multilateration) and based on distance and/or angle measurements, along with the known position of one or more components such as reference stations 120.

At 502, SV 140 transmits a first GNSS signal L1 on a first carrier frequency $f_1$ and a second GNSS signal L2 on a second carrier frequency $f_2$. For example, SV 140 may transmit a signal using the B1I frequency and another signal using the B3 frequency, e.g., as part of dual-band transmission. For illustration purposes, certain examples of the present disclosure refer to B1I and B3 frequencies. However, it will be understood that other frequencies may also be used. Accordingly, the techniques described herein are not limited to being used with B1I and B3 frequencies. The first and second GNSS signals may be transmitted concurrently and are typically broadcast at periodic intervals.

At 504, reference station 120 receives the first GNSS signal and the second GNSS signal using its local GNSS receiver and performs pseudorange, carrier phase, and/or Doppler shift measurements on each signal. The pseudorange measurements can be denoted $P_{L1}$ and $P_{L2}$. The carrier phase measurements can be denoted $\Phi_{L1}$ and $\Phi_{L2}$. The Doppler shift measurements can be denoted $\dot{P}_{L1}$ and $\dot{P}_{L2}$.

At 506, SV 140 transmits a third GNSS signal L3 on a third carrier frequency $f_3$. For example, SV 140 may transmit a signal using the B1C. This particular carrier frequency is presented as an example, and it will be understood that other frequencies may also be used. The third GNSS signal L3 may be transmitted concurrently with the first GNSS signal L1 and the second GNSS signal L2 and is typically broadcast at periodic intervals. In some instances, an SV may transmit on more than three frequencies concurrently.

At 508, mobile device 110 receives the third GNSS signal using its local GNSS receiver and performs pseudorange, carrier phase, and/or Doppler shift measurements on third GNSS signal. The local pseudorange measurement can be denoted $P_{L3}$, the local carrier phase measurement can be denoted $\Phi_{L3}$, and the local Doppler shift measurement can be denoted $\dot{P}_{L3}$.

At 510, reference station 120 transmits correction data to mobile device 110. The correction data may comprise the pseudorange measurements $P_{L1}$ and $P_{L2}$ made at reference station 120, the carrier phase measurements $\Phi_{L1}$ and $\Phi_{L2}$ made at reference station 120, and/or the Doppler shift measurements $\dot{P}_{L1}$ and $\dot{P}_{L2}$ made at the reference station 120.

At 512, mobile device 110 generates virtual pseudorange, carrier phase, and/or Doppler shift measurements for the third carrier frequency $f_3$. The virtual pseudorange measurement and the virtual carrier phase measurement may be generated based on processes described herein, e.g., according to equations 1-24. The virtual pseudorange measurement can be denoted $\hat{P}_{L3}$, and the virtual carrier phase measurement can be denoted $\hat{\Phi}_{L3}$. Mobile device 110 may also generate a virtual Doppler shift measurement (which can be denoted as $\hat{\dot{P}}_{L3}$) for the third carrier frequency $f_3$, as discussed previously, e.g., according to equations 29-36.

At 514, mobile device 110 combines local pseudorange measurement $P_{L3}$, local carrier phase measurement $\Phi_{L3}$, and/or local Doppler shift measurement $\dot{P}_{L3}$ with the locally generated virtual pseudorange measurement $\hat{P}_{L3}$, the virtual carrier phase measurement $\hat{\Phi}_{L3}$, and/or virtual Doppler shift measurement $\hat{\dot{P}}_{L3}$ (based on the correction data). In particular, the mobile device 110 can use the locally generated virtual pseudorange measurement $\hat{P}_{L3}$ to correct errors in the local pseudorange measurements, e.g., according to DNSS techniques. Also, the mobile device 110 can use the locally generated virtual carrier phase measurement $\hat{\Phi}_{L3}$ to correct errors in the local carrier phase measurements, e.g., according to RTK techniques. Having obtained corrected, local pseudorange, carrier phase, and/or Doppler shift measurements, mobile device 110 can establish its position through traditional GNSS positioning techniques. This may involve obtaining additional pseudorange, carrier phase measurements, and/or Doppler shift measurements corresponding to signal from other space vehicles. In general, measurements of signals from at least four GNSS satellites are needed to establish a three-dimensional position fix (horizontal coordinates such as latitude and longitude, plus elevation) through GNSS positioning.

Implementation of the technique illustrated in FIG. 5 can potentially be detected by (1) providing, from a reference station to a mobile device, correction data containing pseudorange, carrier phase, and/or Doppler shift measurements on a first set of GNSS carrier frequencies (e.g., B1I and B3) received at the reference station, (2) allowing the mobile device to receive GNSS signals on a second set of GNSS carrier frequencies (e.g., B1C and B2A) that do not overlap with the first set of GNSS carrier frequencies, and (3) detecting that the mobile station nevertheless performs precise positioning such as DGNSS or RTK. The first set and second set of GNSS carrier frequencies may be associated with a particular GNSS constellation (e.g., BDS). Under such circumstances, a mobile device that has no capability to generate virtual pseudorange and/or virtual carrier phase measurements based on the first set of GNSS carrier frequencies would not enter a DNSS or RTK mode. By contrast, a mobile device that does have a capability to generate virtual pseudorange and/or virtual carrier phase measurements based on the first set of GNSS carrier frequencies may enter a DGNSS or RTK mode, even though the correction data corresponds to GNSS carrier frequencies that do not overlap with the set of GNSS carrier frequencies on which the mobile device is receiving GNSS signals.

Aspects of the disclosure are not necessarily limited to the particular order of events shown in FIG. 4 or 5. Just as an example, FIG. 4 shows the transmission of the first and second GNSS signals (402) and measurement of pseudorange and carrier phase for the first and second GNSS signals (404) followed by the transmission of the third GNSS signal (406) and measurement of the pseudorange and carrier phase for the third signal (408). However, such an order is not necessarily required. The transmission of the third GNSS signal (406) and measurement of the pseudorange and carrier phase for the third signal (408) may occur prior to the transmission of the first and second GNSS signals (402) and measurement of pseudorange and carrier phase for the first and second GNSS signals (404). As another example, FIG. 4 shows the generation of the virtual pseudorange and carrier phase measurements for the third carrier frequency (410) and transmission of the correction data (414) as occurring after all the GNSS signal transmission and pseudorange and carrier phase measurement events (i.e., 402, 404, 406, and 408). Once again, such an order is not necessarily required. The generation of the virtual pseudorange and carrier phase measurements for the third carrier frequency (410) and transmission of the correction data (414) can occur before, during, after, or interspersed with, the various GNSS signal transmission and pseudorange and carrier phase measurement events (i.e., 402, 404, 406, and 408). Similarly, the particular order of events shown in FIG. 5 is not necessarily required. For example, transmission of the third GNSS signal (506) and measurement of the pseudorange and carrier phase for the third signal (508) may occur prior to the transmission of the first and second GNSS signals (502) and measurement of pseudorange and carrier phase for the first and second GNSS signals (504). Also, the transmission of correction data (510) may occur before the transmission of the third GNSS signal (506) and measurement of the pseudorange and carrier phase for the third signal (508).

Figure 6:
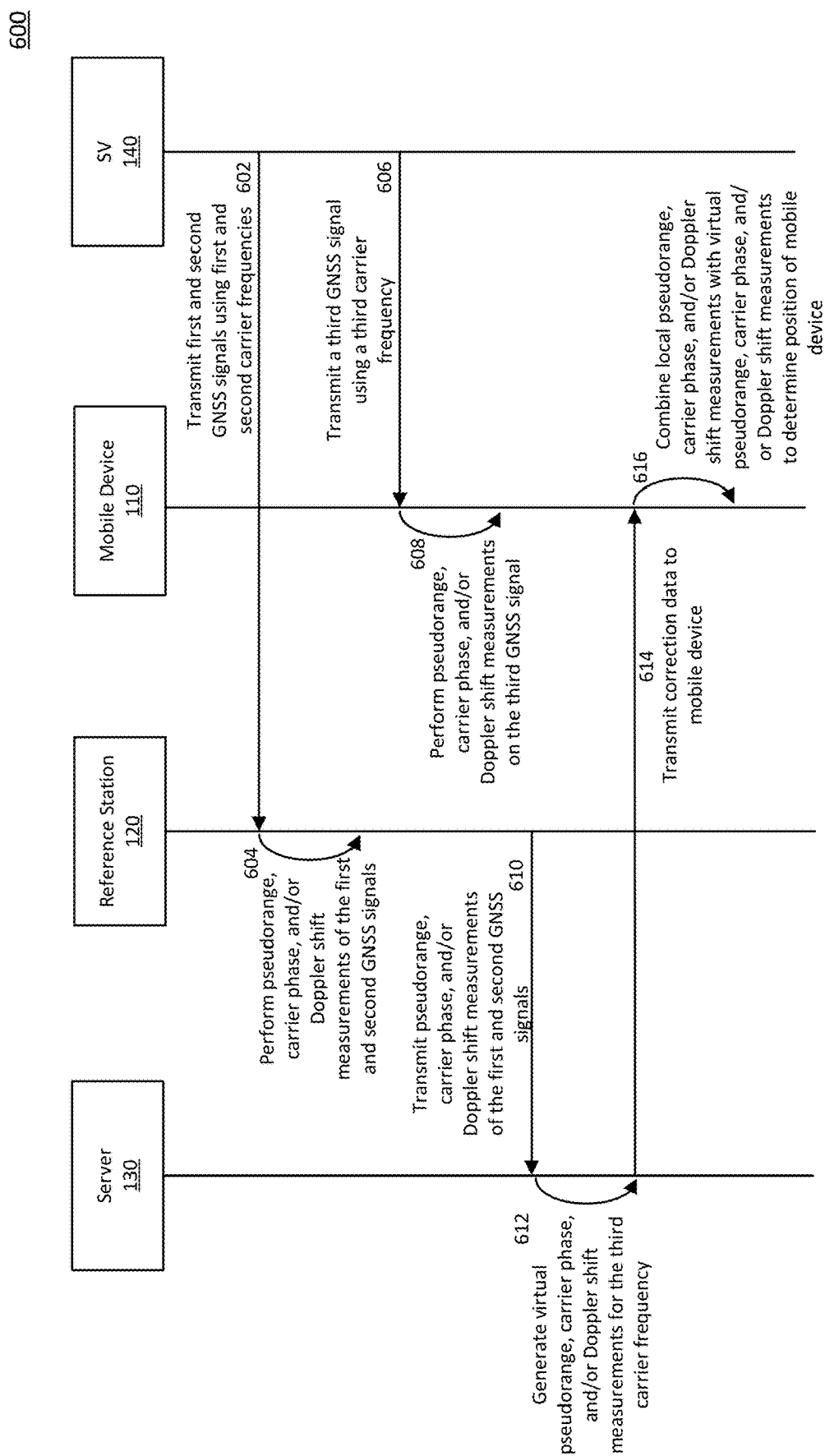
FIG. 6 is flow diagram illustrating a process for performing precise positioning based on virtual pseudorange, carrier phase, and/or Doppler shift measurements generated at a server, according to some aspects of the disclosure.

FIG. 6 is flow diagram illustrating a process 600 for performing precise positioning based on virtual pseudorange, carrier phase, and/or Doppler shift measurements generated at a server, according to some aspects of the disclosure. The process 600 involves functionality performed by a server 130, reference station 120, mobile device 110, and a GNSS satellite (SV 140), each of which is described above in connection with FIG. 1. The example of FIG. 6 is provided to illustrate that virtual pseudorange measurements, virtual carrier phase measurements, and/or virtual Doppler shift measurements can be generated at a server, based on correction data received from a reference station. According to some aspects of the disclosure, mobile device 110 is within a predetermined proximity to reference station 120. The predetermined proximity may be set at a value such as 5 kilometers, 10 kilometers, 30 kilometers, 50 kilometers, 100 kilometers, or some other distance. This condition may be deemed satisfied if the baseline distance 160 is at or below the predetermined proximity. Although one satellite is shown, it will be understood that the functionality depicted in FIG. 6 may be repeated in connection with other satellites of a GNSS constellation (e.g., to perform precise positioning between mobile device 110 and a second SV, between mobile device 110 and a third SV, between the mobile device 110 and a fourth SV, etc.), with correction data provided by one reference station 120 and possibly additional reference stations, in order to determine a number of positioning measurements sufficient for estimating the position of the mobile device 110 geometrically (e.g., using multiangulation and/or multilateration) and based on distance and/or angle measurements, along with the known position of one or more components such as reference stations 120.

At 602, SV 140 transmits a first GNSS signal L1 on a first carrier frequency $f_1$ and a second GNSS signal L2 on a second carrier frequency $f_2$. For example, SV 140 may transmit a signal using the B1I frequency and another signal using the B3 frequency, e.g., as part of dual-band transmission. For illustration purposes, certain examples of the present disclosure refers to B1I and B3 frequencies. However, it will be understood that other frequencies may also be used. Accordingly, the techniques described herein are not limited to being used with B1I and B3 frequencies. The first and second GNSS signals may be transmitted concurrently and are typically broadcast at periodic intervals.

At 604, reference station 120 receives the first GNSS signal and the second GNSS signal using its local GNSS receiver and performs pseudorange, carrier phase, and/or Doppler shift measurements on each signal. The pseudorange measurements can be denoted $P_{L1}$ and $P_{L2}$. The carrier phase measurements can be denoted $\Phi_{L1}$ and $\Phi_{L2}$. The Doppler shift measurements can be denoted $\dot{P}_{L1}$ and $\dot{P}_{L2}$.

At 606, SV 140 transmits a third GNSS signal L3 on a third carrier frequency $f_3$. For example, SV 140 may transmit a signal using the B1C. This particular carrier frequency is presented as an example, and it will be understood that other frequencies may also be used. The third GNSS signal L3 may be transmitted concurrently with the first GNSS signal L1 and the second GNSS signal L2 and is typically broadcast at periodic intervals. In some instances, an SV may transmit on more than three frequencies concurrently.

At 608, mobile device 110 receives the third GNSS signal using its local GNSS receiver and performs pseudorange, carrier phase, and/or Doppler shift measurements on third GNSS signal. The local pseudorange measurement can be denoted $P_{L3}$, the local carrier phase measurement can be denoted $\Phi_{L3}$, and the local Doppler shift measurement can be denoted $\dot{P}_{L3}$.

At 610, reference station 120 transmits pseudorange, carrier phase, and/or Doppler shift measurements it made of the first and second GNSS signals, on the first and second GNSS carrier frequencies, respectively, to server 130. Again, the pseudorange measurements can be denoted $P_{L1}$ and $P_{L2}$. The carrier phase measurements can be denoted $\Phi_{L1}$ and $\Phi_{L2}$. The Doppler shift measurements can be denoted $\dot{P}_{L1}$ and $\dot{P}_{L2}$.

At 612, server 130 generates virtual pseudorange and carrier phase measurements for the third carrier frequency $f_3$. The virtual pseudorange measurement and the virtual carrier phase measurement may be generated based on processes described herein, e.g., according to equations 1-24. The virtual pseudorange measurement can be denoted $\hat{P}_{L3}$, and the virtual carrier phase measurement can be denoted $\hat{\Phi}_{L3}$. Reference station 120 may also generate a virtual Doppler shift measurement (which can be denoted as $\hat{\dot{P}}_{L3}$) for the third carrier frequency $f_3$, as discussed previously, e.g., according to equations 29-36.

At 614, server 130 transmits correction data to mobile device 110. The correction data may comprise the virtual pseudorange measurement, the virtual carrier phase measurement, and/or the virtual Doppler shift measurement generated at server 130.

At 616, mobile device 110 combines local pseudorange measurement $P_{L3}$, local carrier phase measurement $\Phi_{L3}$, and/or local Doppler shift measurement $\dot{P}_{L3}$ with the correction data received from server 130 to determine the position of mobile device 110. The correction data may comprise the virtual pseudorange measurement $\hat{P}_{L3}$, the virtual carrier phase measurement $\hat{\Phi}_{L3}$, and/or the virtual Doppler shift measurement $\hat{\dot{P}}_{L3}$. In particular, the mobile device 110 can use the correction data to correct errors in the local pseudorange measurements, e.g., according to DNSS techniques. Also, the mobile device 110 can use the correction data to correct errors in the local carrier phase measurements, e.g., according to RTK techniques. The mobile device 110 can also use the correction data to correct Doppler shift measurements. Having obtained corrected, local pseudorange, carrier phase measurements, and/or Doppler shift measurements, mobile device 110 can establish its position. through traditional GNSS positioning techniques. In general, measurements of signals from at least four GNSS satellites are needed to establish a three-dimensional position fix (horizontal coordinates such as latitude and longitude, plus elevation) through GNSS positioning.

Figure 7A:
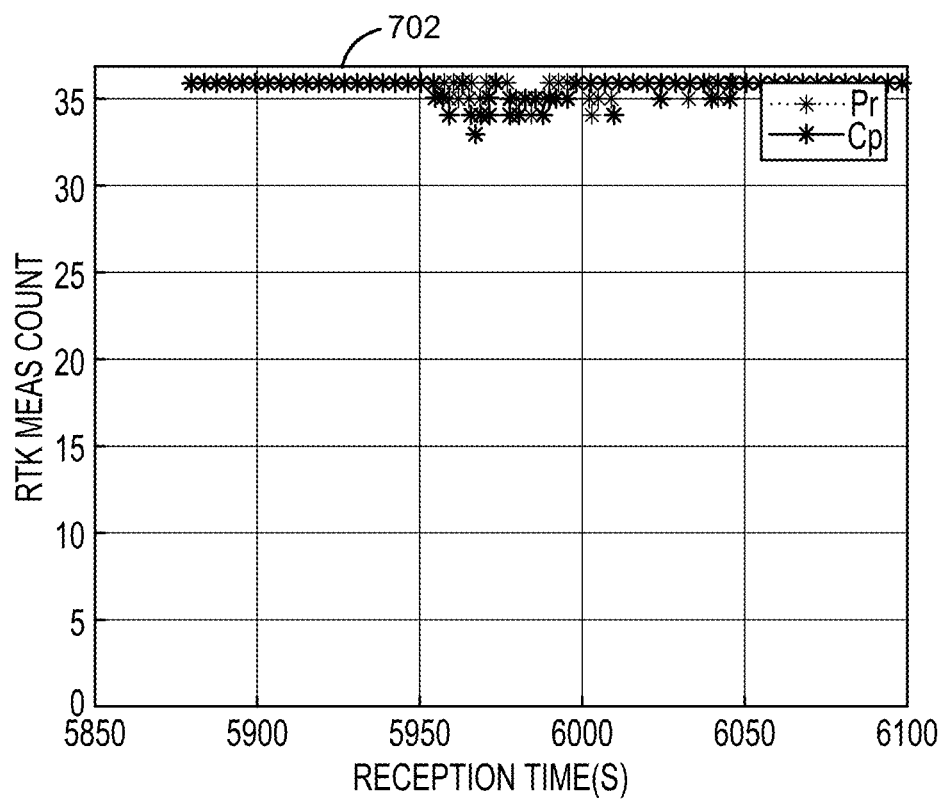
FIGS. 7A-7D present a series of plots illustrating improvements in performance resulting from the implementation of cross-frequency correction in accordance with aspects of the disclosure.

FIGS. 7A-7D present a series of plots illustrating improvements in performance resulting from the implementation of cross-frequency correction in accordance with aspects of the disclosure. In FIG. 7A, plot 702 is a plot of the number of RTK measurements generated at a particular reference station, without implementing cross-frequency correction. The y-axis represents the number of RTK measurements made, such as pseudorange (Pr) and carrier phase (Cp) measurements. Here, the RTK measurements only include pseudorange and carrier phase measurements made for GNSS signals received at the reference station. The x-axis represents the GNSS reception time in seconds (s). As can be seen, the average number of RTK measurements over time is roughly around 35 measurements.

Figure 7B:
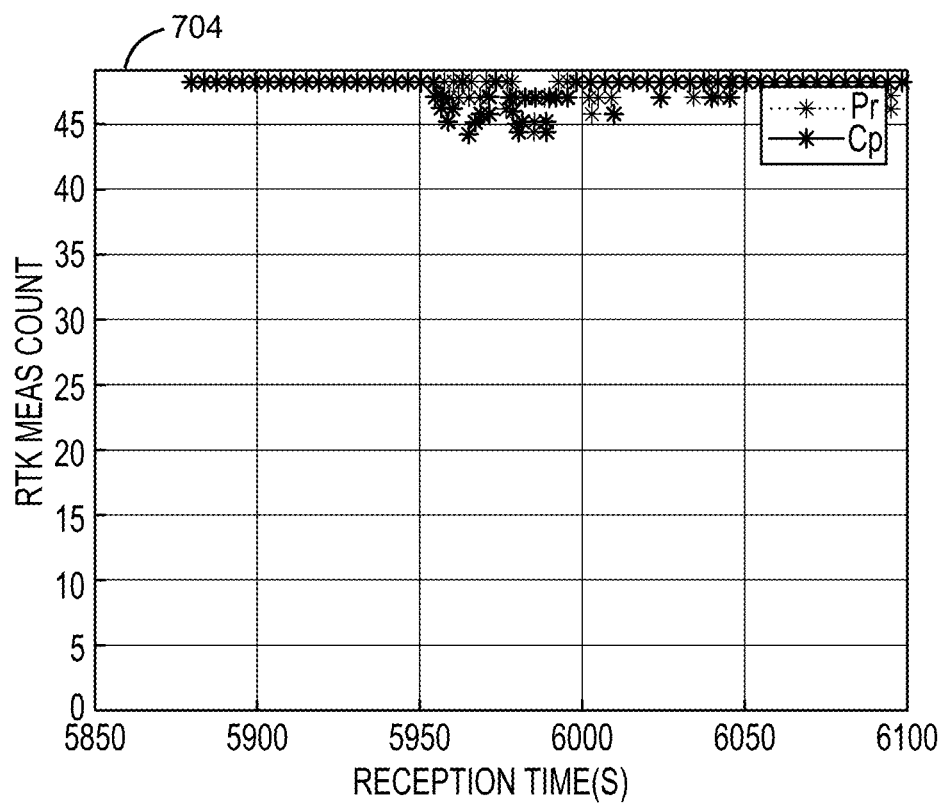

In FIG. 7B, plot 704 is a plot of the number of RTK measurements generated at the same reference station, with cross-frequency correction implemented according to aspects of the present disclosure. Again, the y-axis represents the number of RTK measurements made, such as pseudorange (Pr) and carrier phase (Cp) measurements. However, these RTK measurements include both (1) pseudorange and carrier phase measurements made for GNSS signals received at the reference station and (2) virtual pseudorange measurements and virtual carrier phase measurements generated at the reference station for GNSS signals not received at the reference station. This significantly increases the number of total RTK measurements available to serve as the basis of correction data provided to a mobile device. As can be seen, the average number of RTK measurements over time is over 45 measurements, which is markedly higher than the average number of RTK measurements of roughly 35 measurements shown in plot 702. The availability of more RTK measurements, particularly those for GNSS signals not being received at the reference station (but possibly being received at the mobile device) increases the potential for correction opportunities in precise positioning.

Figure 7C:
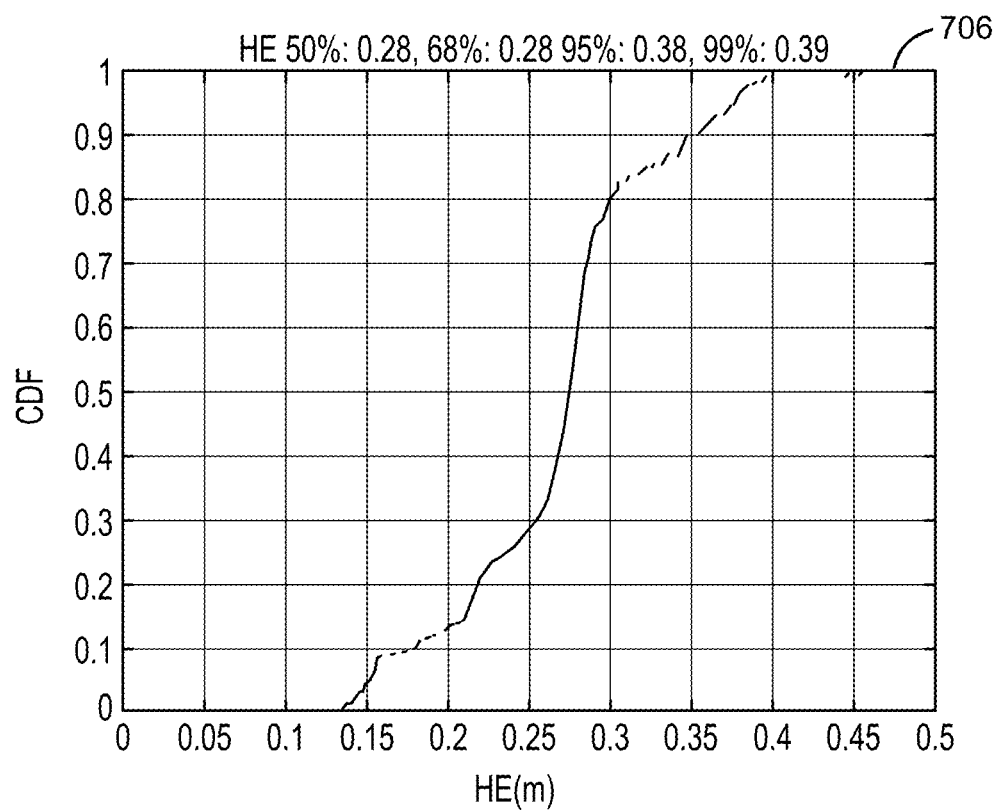

In FIG. 7C, plot 706 is a plot of the cumulative distribution function (CDF) of the horizontal error (HE) in estimating the position of a mobile device in a GNSS receiver under certain conditions (e.g., a particular set of GNSS carrier frequencies, at certain signal strengths, at a certain amount noise, in a particular environment, etc.), without implementing cross-frequency correction. The y-axis represents the CDF. The x-axis represents the horizontal error expressed in meters (m). A collection of position estimates generated by the GNSS receiver is obtained. Each position estimate is compared to the true position to yield a horizontal error (HE) data point. The resulting collection of HE data points has a particular distribution, which is represented by the CDF curve. As shown in the figure, 50% of the HE data points are accounted for at an HE value of 0.28 meter. 68% of the HE data points are accounted for at an HE value of 0.28 meter (possibly slightly higher but for rounding of the HE value to two decimal places). 95% of the HE data points are accounted for at an HE value of 0.38 meter. 99% of the HE data points are accounted for at an HE value of 0.39 meter.

Figure 7D:
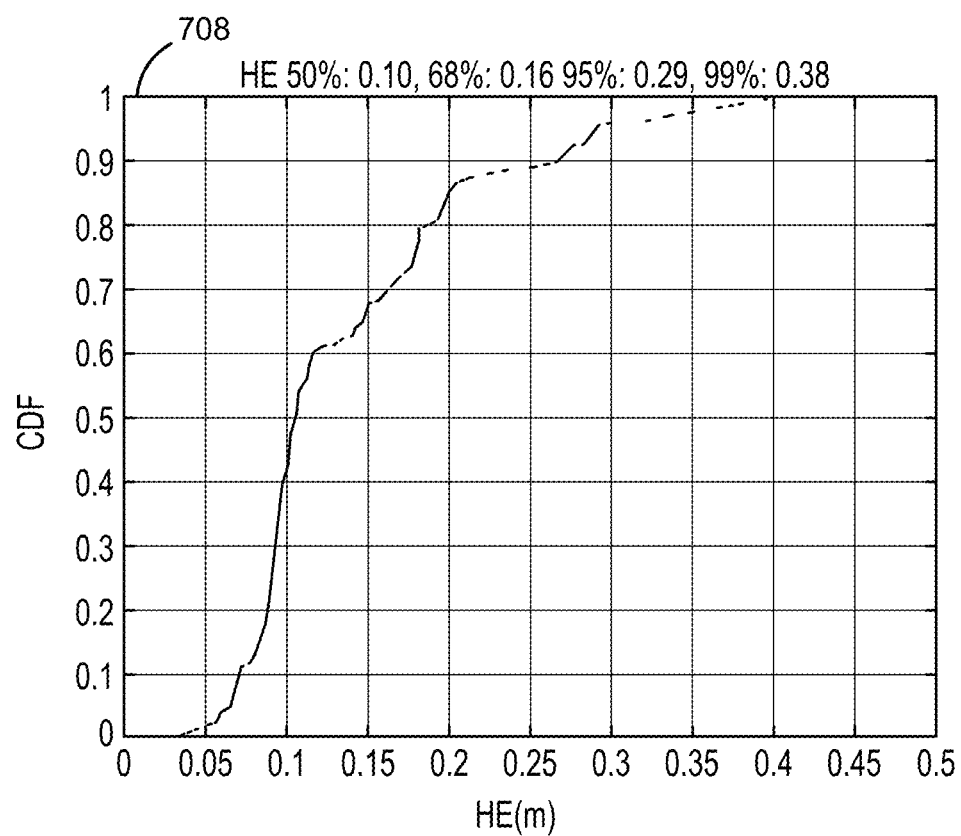

In FIG. 7D, plot 708 is a plot of the cumulative distribution function (CDF) of the horizontal error (HE) in estimating the position of the mobile device using the same GNSS receiver under the same conditions (as that of 706), but with cross-frequency correction implemented according to aspects of the present disclosure. Here, 50% of the HE data points are accounted for at an HE value of 0.10 meter. 68% of the HE data points are accounted for at an HE value of 0.16 meter. 95% of the HE data points are accounted for at an HE value of 0.29 meter. 99% of the HE data points are accounted for at an HE value of 0.38 meter. Clearly, the horizontal error is significantly reduced when cross-frequency correction is implemented.

Figure 8A:
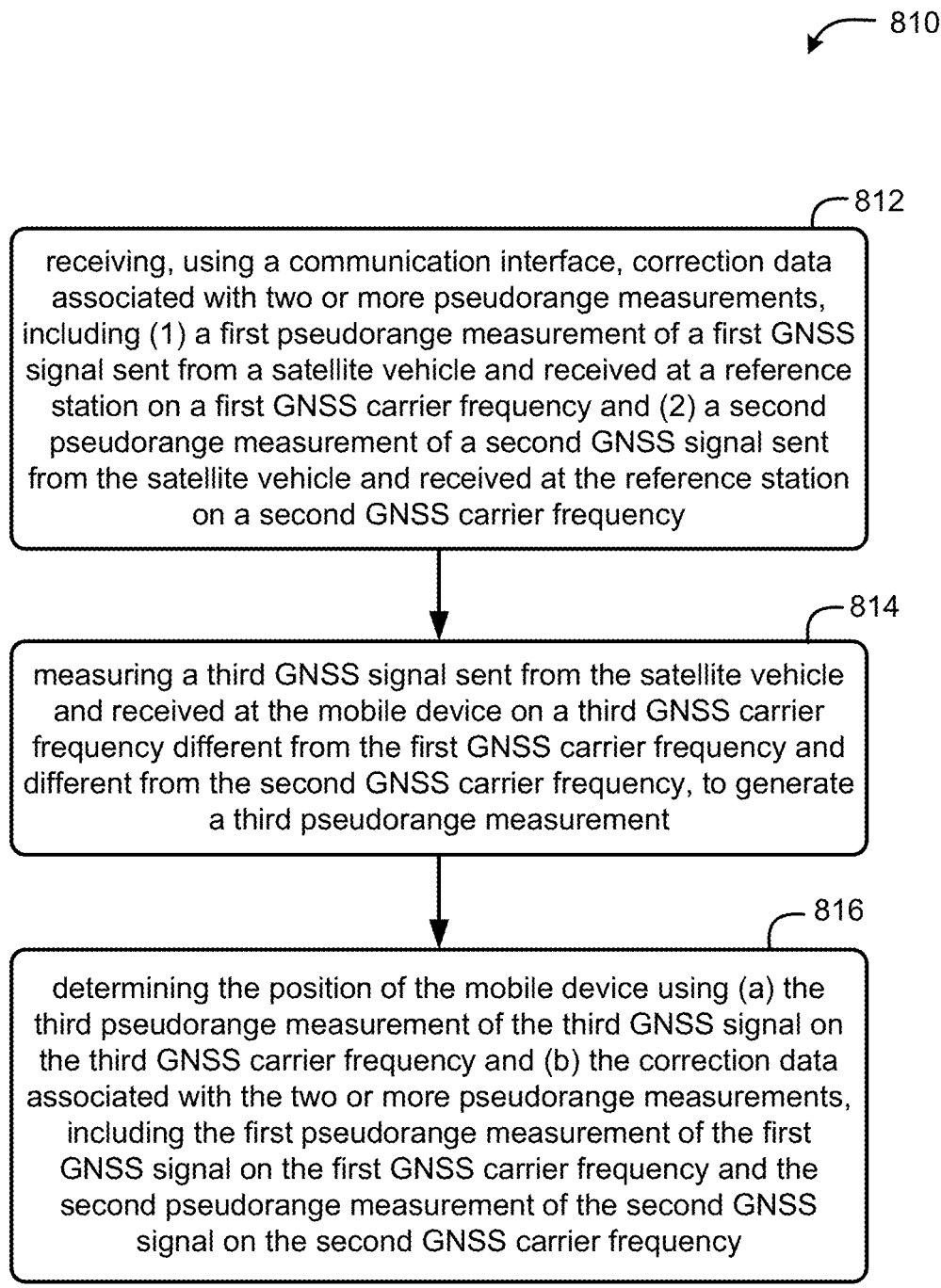
FIG. 8A is a flow diagram of a method performed at a mobile device for determining a position based on GNSS signals, according to an aspect of the disclosure.
Figure 12:
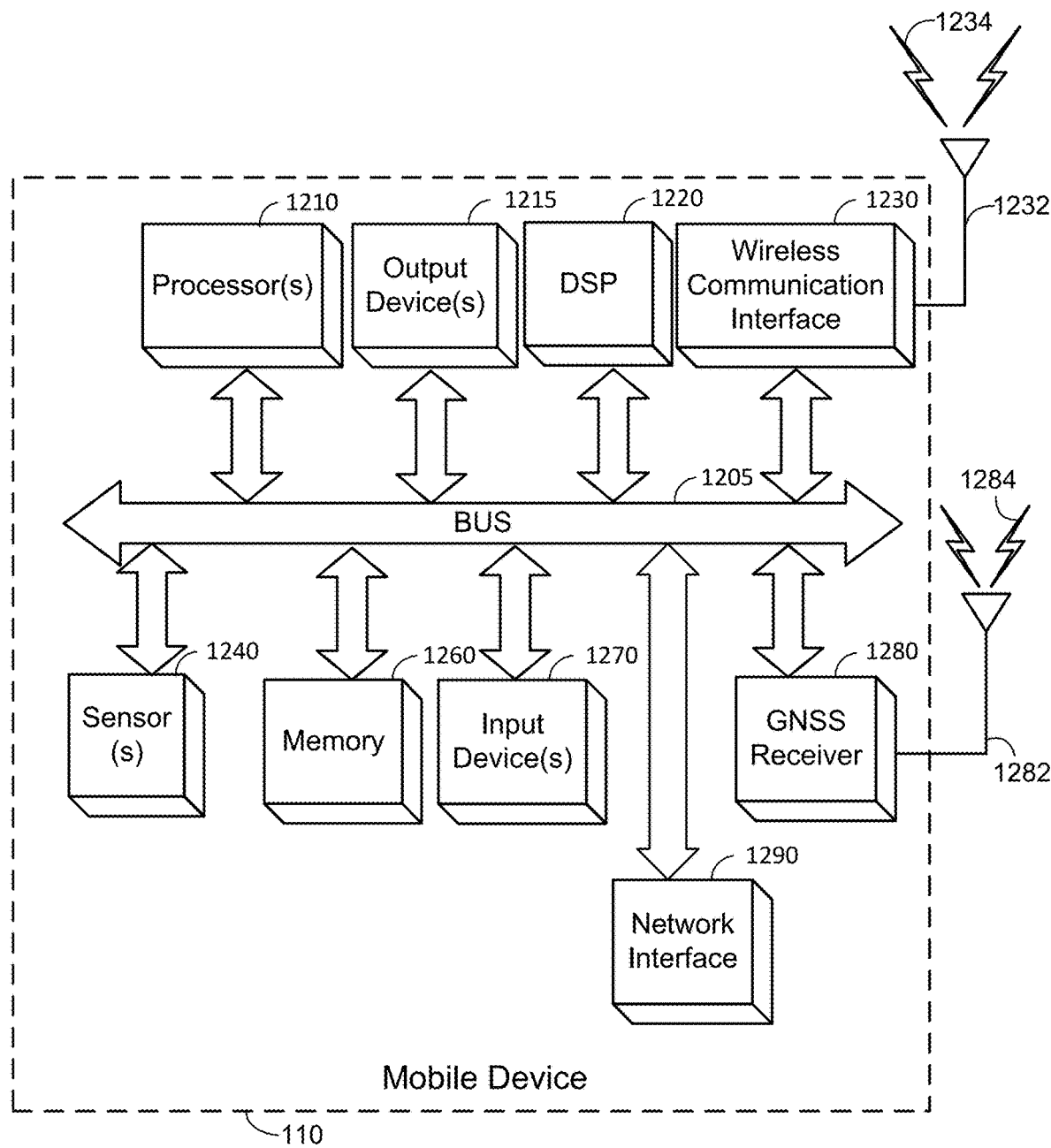
FIG. 12 is a block diagram of an embodiment of a mobile device, which can be utilized in embodiments as described herein.

FIG. 8A. is a flow diagram of a method 810 performed at a mobile device for determining a position based on GNSS signals, according to an aspect of the disclosure. Means for performing the functionality illustrated in one or more of the blocks shown in FIG. 8 may be performed by hardware and/or software components of a mobile device. Example components of a mobile device are illustrated in FIG. 12, which is described in more detail below.

At block 812, the functionality comprises receiving, using a communication interface, correction data associated with two or more pseudorange measurements, including (1) a first pseudorange measurement of a first GNSS signal sent from a satellite vehicle and received at a reference station on a first GNSS carrier frequency and (2) a second pseudorange measurement of a second GNSS signal sent from the satellite vehicle and received at the reference station on a second GNSS carrier frequency. The correction data received from the reference station or a correction server may comprise a virtual pseudorange measurement generated at the reference station or the correction server for the third GNSS carrier frequency. Means for performing functionality at block 812 may comprise, for example, a Global Navigation Satellite System (GNSS) receiver 1280 as illustrated in FIG. 12.

At block 814, the functionality comprises measuring a third GNSS signal sent from the satellite vehicle and received at the mobile device on a third GNSS carrier frequency different from the first GNSS carrier frequency and different from the second GNSS carrier frequency, to generate a third pseudorange measurement. Means for performing functionality at block 814 may comprise, for example, the GNSS receiver 1280, processor(s) 1210, and/or memory 1260 illustrated in FIG. 12.

At block 816, the functionality comprises determining the position of the mobile device using (a) the third pseudorange measurement of the third GNSS signal on the third GNSS carrier frequency and (b) the correction data associated with the two or more pseudorange measurements, including the first pseudorange measurement of the first GNSS signal on the first GNSS carrier frequency and the second pseudorange measurement of the second GNSS signal on the second GNSS carrier frequency. Means for performing functionality at block 816 may comprise, for example, the GNSS receiver 1280, processor(s) 1210, and/or memory 1260 illustrated in FIG. 12.

Figure 8B:
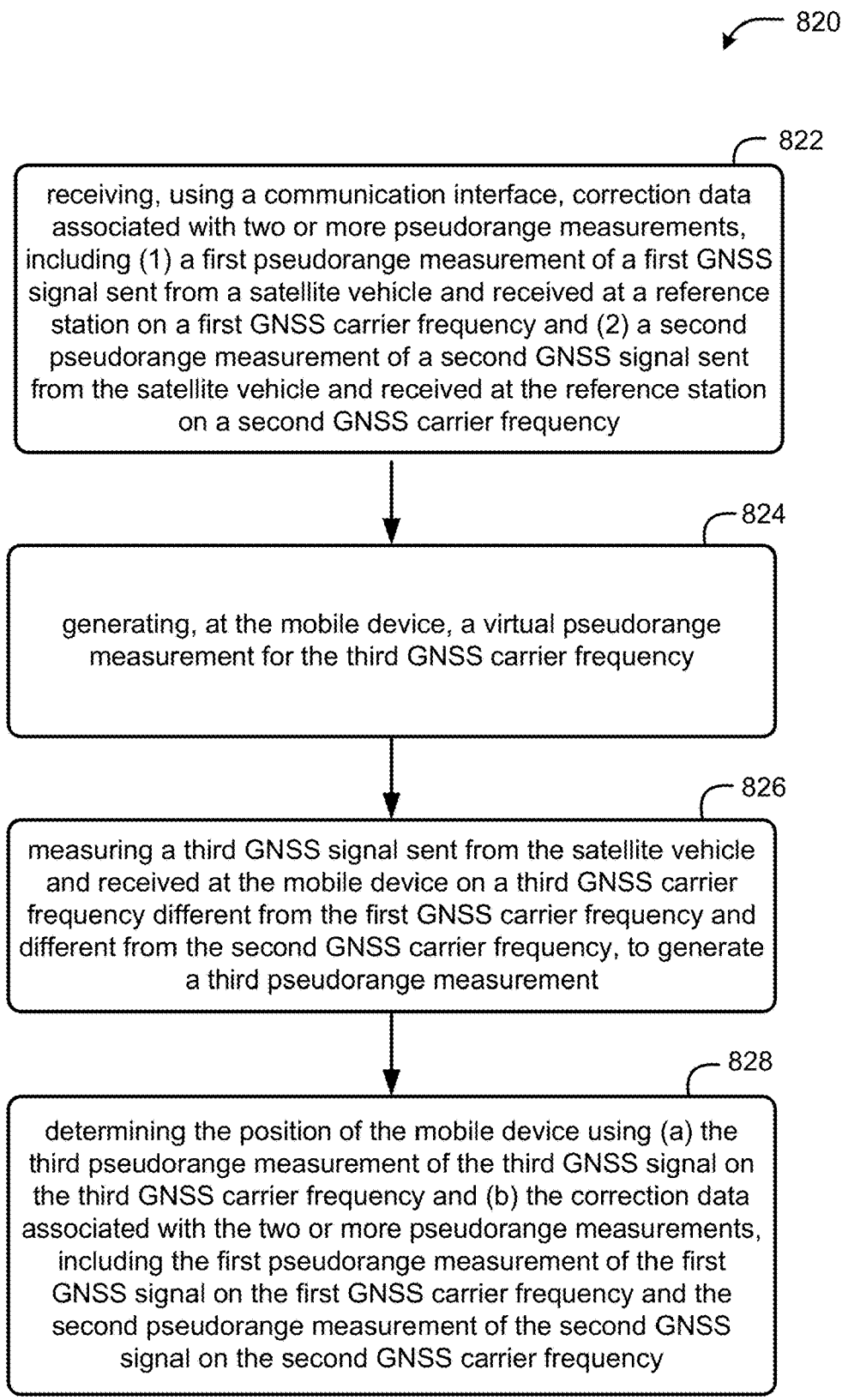
FIG. 8B is a flow diagram of a method performed at a mobile device for determining a position based on GNSS signals, with correction data being generated at the mobile device, according to an aspect of the disclosure.

FIG. 8B is a flow diagram of a method 820 performed at a mobile device for determining a position based on GNSS signals, with correction data being generated at the mobile device, according to an aspect of the disclosure. Means for performing the functionality illustrated in one or more of the blocks shown in FIG. 8B may be performed by hardware and/or software components of a mobile device. Example components of a mobile device are illustrated in FIG. 12, which is described in more detail below.

At block 822, the functionality comprises receiving, using a communication interface, correction data associated with two or more pseudorange measurements, including (1) a first pseudorange measurement of a first GNSS signal sent from a satellite vehicle and received at a reference station on a first GNSS carrier frequency and (2) a second pseudorange measurement of a second GNSS signal sent from the satellite vehicle and received at the reference station on a second GNSS carrier frequency.

At block 824, the functionality comprises generating, at the mobile device, a virtual pseudorange measurement for the third GNSS carrier frequency. The correction data may be generated based on (e.g., using a linear combination) the first pseudorange measurement and the second pseudorange measurement discussed above. Means for performing functionality at block 824 may comprise, for example, the GNSS receiver 1280, processor(s) 1210, and/or memory 1260 illustrated in FIG. 12.

At block 826, the functionality comprises measuring a third GNSS signal sent from the satellite vehicle and received at the mobile device on a third GNSS carrier frequency different from the first GNSS carrier frequency and different from the second GNSS carrier frequency, to generate a third pseudorange measurement. Means for performing functionality at block 826 may comprise, for example, the GNSS receiver 1280, processor(s) 1210, and/or memory 1260 illustrated in FIG. 12.

At block 828, the functionality comprises determining the position of the mobile device using (a) the third pseudorange measurement of the third GNSS signal on the third GNSS carrier frequency and (b) the correction data associated with the two or more pseudorange measurements, including the first pseudorange measurement of the first GNSS signal on the first GNSS carrier frequency and the second pseudorange measurement of the second GNSS signal on the second GNSS carrier frequency. Using the correction data to determine the position of the mobile device in this manner may comprise using the virtual pseudorange measurement for the third GNSS carrier frequency generated at the mobile device to correct the third pseudorange measurement for the third GNSS signal on the third GNSS carrier frequency measured at the mobile device. Means for performing functionality at block 828 may comprise, for example, the GNSS receiver 1280, processor(s) 1210, and/or memory 1260 illustrated in FIG. 12.

Figure 8C:
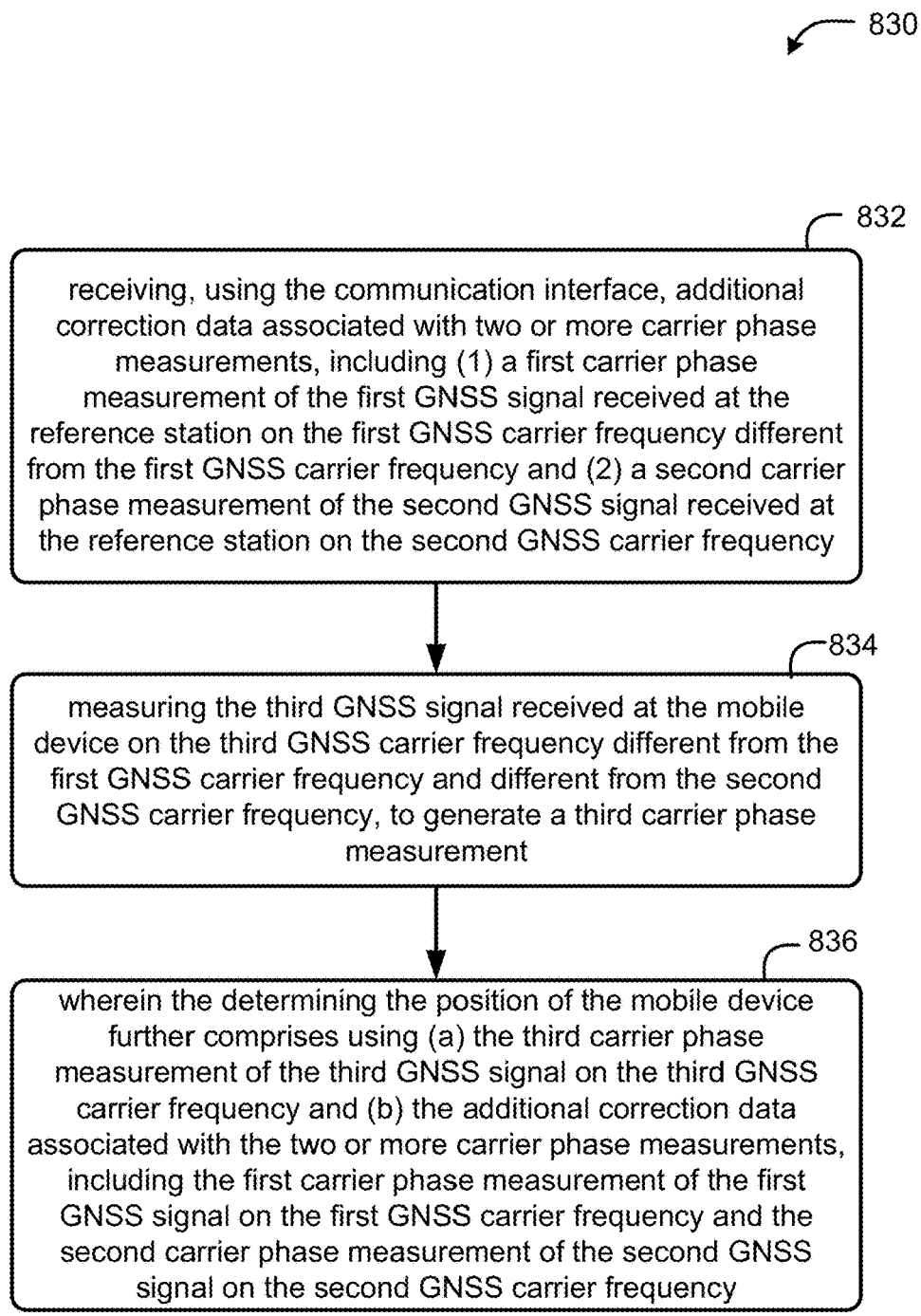
FIG. 8C is a flow diagram of a method performed at a mobile device for determining a position based on GNSS signals, further taking into account estimation of a carrier phase, according to an aspect of the disclosure.

FIG. 8C is a flow diagram of a method 830 performed at a mobile device for determining a position based on GNSS signals, further taking into account estimation of a carrier phase, according to an aspect of the disclosure. The steps shown in FIG. 8C may be performed in conjunction with the steps shown in FIG. 8A, 8B, 8D, or any combination thereof, to improve carrier phase estimation. Means for performing the functionality illustrated in one or more of the blocks shown in FIG. 8C may be performed by hardware and/or software components of a mobile device. Example components of a mobile device are illustrated in FIG. 12, which is described in more detail below.

At block 832, the functionality comprises receiving, using the communication interface, additional correction data associated with two or more carrier phase measurements, including (1) a first carrier phase measurement of the first GNSS signal received at the reference station on the first GNSS carrier frequency different from the first GNSS carrier frequency and (2) a second carrier phase measurement of the second GNSS signal received at the reference station on the second GNSS carrier frequency. The additional correction data received from the reference station or a correction server may comprise a virtual carrier phase measurement of the third GNSS signal on the third GNSS carrier frequency generated at the reference station or the correction server, based on the first carrier phase measurement and the second carrier phase measurement. Alternatively, the virtual carrier phase measurement of the third GNSS signal on the third GNSS carrier frequency may be generated at the mobile device. Means for performing functionality at block 832 may comprise, for example, a Global Navigation Satellite System (GNSS) receiver 1280 as illustrated in FIG. 12.

At block 834, the functionality comprises measuring the third GNSS signal received at the mobile device on the third GNSS carrier frequency different from the first GNSS carrier frequency and different from the second GNSS carrier frequency, to generate a third carrier phase measurement. Means for performing functionality at block 834 may comprise, for example, the GNSS receiver 1280, processor(s) 1210, and/or memory 1260 illustrated in FIG. 12.

At block 836, the functionality comprises wherein the determining the position of the mobile device further comprises using (a) the third carrier phase measurement of the third GNSS signal on the third GNSS carrier frequency and (b) the additional correction data associated with the two or more carrier phase measurements, including the first carrier phase measurement of the first GNSS signal on the first GNSS carrier frequency and the second carrier phase measurement of the second GNSS signal on the second GNSS carrier frequency. Using the additional correction data to determine the position of the mobile device may comprise using the virtual carrier phase measurement, included in the additional correction data or generated at the mobile device, to estimate a carrier phase offset in the third GNSS signal. Determination of the position of the mobile device may take into account the carrier phase offset in the third GNSS signal, by including the carrier phase measurement. Means for performing functionality at block 836 may comprise, for example, the GNSS receiver 1280, processor(s) 1210, and/or memory 1260 illustrated in FIG. 12.

Figure 8D:
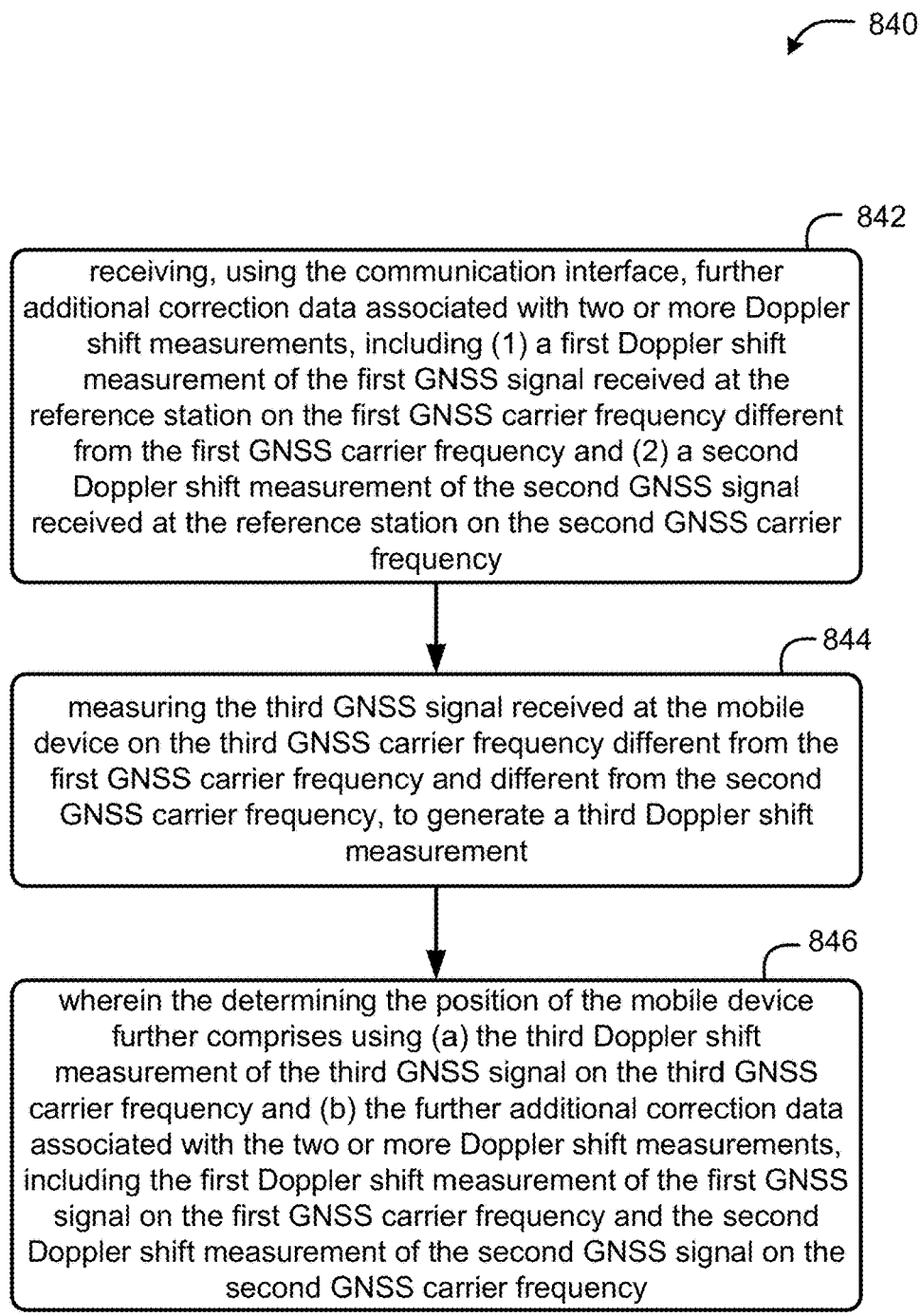
FIG. 8D is a flow diagram of a method performed at a mobile device for determining a position based on GNSS signals, further taking into account estimation of a Doppler shift, according to an aspect of the disclosure.

FIG. 8D is a flow diagram of a method 840 performed at a mobile device for determining a position based on GNSS signals, taking into account estimation of a Doppler shift, according to an aspect of the disclosure. The steps shown in FIG. 8D may be performed in conjunction with the steps shown in FIG. 8A, 8B, 8C, or any combination thereof, to improve Doppler shift estimation. Means for performing the functionality illustrated in one or more of the blocks shown in FIG. 8D may be performed by hardware and/or software components of a mobile device. Example components of a mobile device are illustrated in FIG. 12, which is described in more detail below.

At block 842, the functionality comprises receiving, using the communication interface, further additional correction data associated with two or more Doppler shift measurements, including (1) a first Doppler shift measurement of the first GNSS signal received at the reference station on the first GNSS carrier frequency different from the first GNSS carrier frequency and (2) a second Doppler shift measurement of the second GNSS signal received at the reference station on the second GNSS carrier frequency. The further additional correction data received from the reference station or a correction server may comprise a virtual Doppler shift measurement of the third GNSS signal on the third GNSS carrier frequency generated at the reference station or the correction server, based on the first Doppler shift measurement and the second Doppler shift measurement. Alternatively, the virtual Doppler shift measurement of the third GNSS signal on the third GNSS carrier frequency may be generated at the mobile device. Means for performing functionality at block 842 may comprise, for example, a Global Navigation Satellite System (GNSS) receiver 1280 as illustrated in FIG. 12.

At block 844, the functionality comprises measuring the third GNSS signal received at the mobile device on the third GNSS carrier frequency different from the first GNSS carrier frequency and different from the second GNSS carrier frequency, to generate a third Doppler shift measurement. Means for performing functionality at block 844 may comprise, for example, the GNSS receiver 1280, processor(s) 1210, and/or memory 1260 illustrated in FIG. 12.

At block 846, the functionality comprises wherein the determining the position of the mobile device further comprises using (a) the third Doppler shift measurement of the third GNSS signal on the third GNSS carrier frequency and (b) the further additional correction data associated with the two or more Doppler shift measurements, including the first Doppler shift measurement of the first GNSS signal on the first GNSS carrier frequency and the second Doppler shift measurement of the second GNSS signal on the second GNSS carrier frequency. Using the further additional correction data to determine the position of the mobile device may comprise using the virtual Doppler shift measurement, included in the further additional correction data or generated at the mobile device, to estimate a frequency offset in the third GNSS signal. The frequency offset may correspond to a Doppler shift associated with a relative velocity between the satellite vehicle and mobile device. Determination of the position of the mobile device may take into account the frequency offset in the third GNSS signal, by including the virtual Doppler shift measurement. Means for performing functionality at block 846 may comprise, for example, the GNSS receiver 1280, processor(s) 1210, and/or memory 1260 illustrated in FIG. 12.

Figure 9:
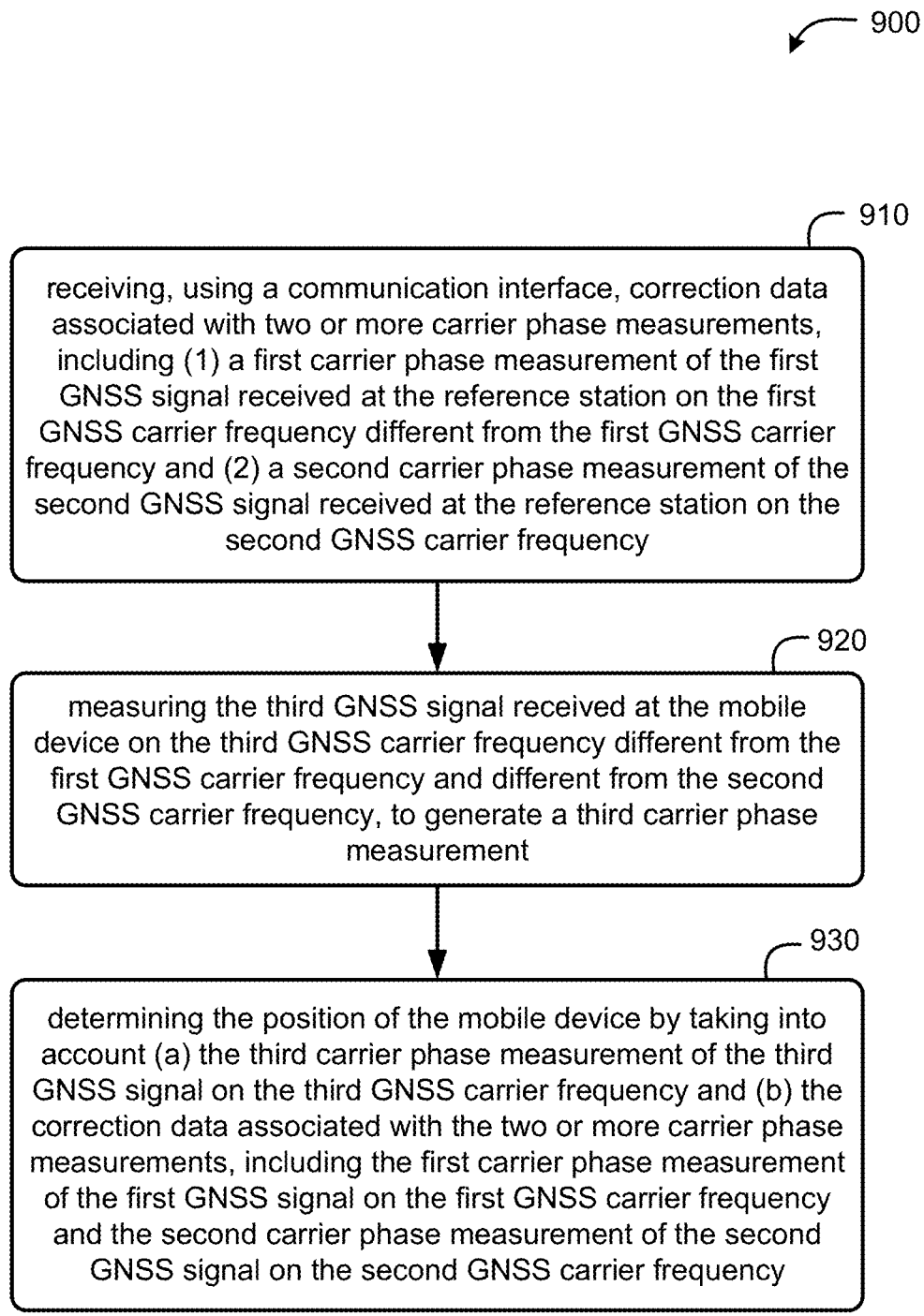
FIG. 9 is a flow diagram of a method performed at a mobile device for determining a position based on GNSS signals, taking into account estimation of a carrier phase, according to an aspect of the disclosure.

FIG. 9 is a flow diagram of a method 900 performed at a mobile device for determining a position based on GNSS signals, taking into account estimation of a carrier phase, according to an aspect of the disclosure. Means for performing the functionality illustrated in one or more of the blocks shown in FIG. 8C may be performed by hardware and/or software components of a mobile device. Example components of a mobile device are illustrated in FIG. 12, which is described in more detail below.

At block 910, the functionality comprises receiving, using a communication interface, correction data associated with two or more carrier phase measurements, including (1) a first carrier phase measurement of the first GNSS signal received at the reference station on the first GNSS carrier frequency different from the first GNSS carrier frequency and (2) a second carrier phase measurement of the second GNSS signal received at the reference station on the second GNSS carrier frequency. The correction data received from the reference station or a correction server may comprise a virtual carrier phase measurement of the third GNSS signal on the third GNSS carrier frequency generated at the reference station or the correction server, based on the first carrier phase measurement and the second carrier phase measurement. Alternatively, the virtual carrier phase measurement of the third GNSS signal on the third GNSS carrier frequency may be generated at the mobile device. Means for performing functionality at block 910 may comprise, for example, a Global Navigation Satellite System (GNSS) receiver 1280 as illustrated in FIG. 12.

At block 920, the functionality comprises measuring the third GNSS signal received at the mobile device on the third GNSS carrier frequency different from the first GNSS carrier frequency and different from the second GNSS carrier frequency, to generate a third carrier phase measurement. Means for performing functionality at block 920 may comprise, for example, the GNSS receiver 1280, processor(s) 1210, and/or memory 1260 illustrated in FIG. 12.

At block 930, the functionality comprises determining the position of the mobile device by taking into account (a) the third carrier phase measurement of the third GNSS signal on the third GNSS carrier frequency and (b) the correction data associated with the two or more carrier phase measurements, including the first carrier phase measurement of the first GNSS signal on the first GNSS carrier frequency and the second carrier phase measurement of the second GNSS signal on the second GNSS carrier frequency. Using the additional correction data to determine the position of the mobile device may comprise using the virtual carrier phase measurement, included in the additional correction data or generated at the mobile device, to estimate a carrier phase offset in the third GNSS signal. Determination of the position of the mobile device may take into account the carrier phase offset in the third GNSS signal, by including the carrier phase measurement. Means for performing functionality at block 836 may comprise, for example, the GNSS receiver 1280, processor(s) 1210, and/or memory 1260 illustrated in FIG. 12.

Figure 10:
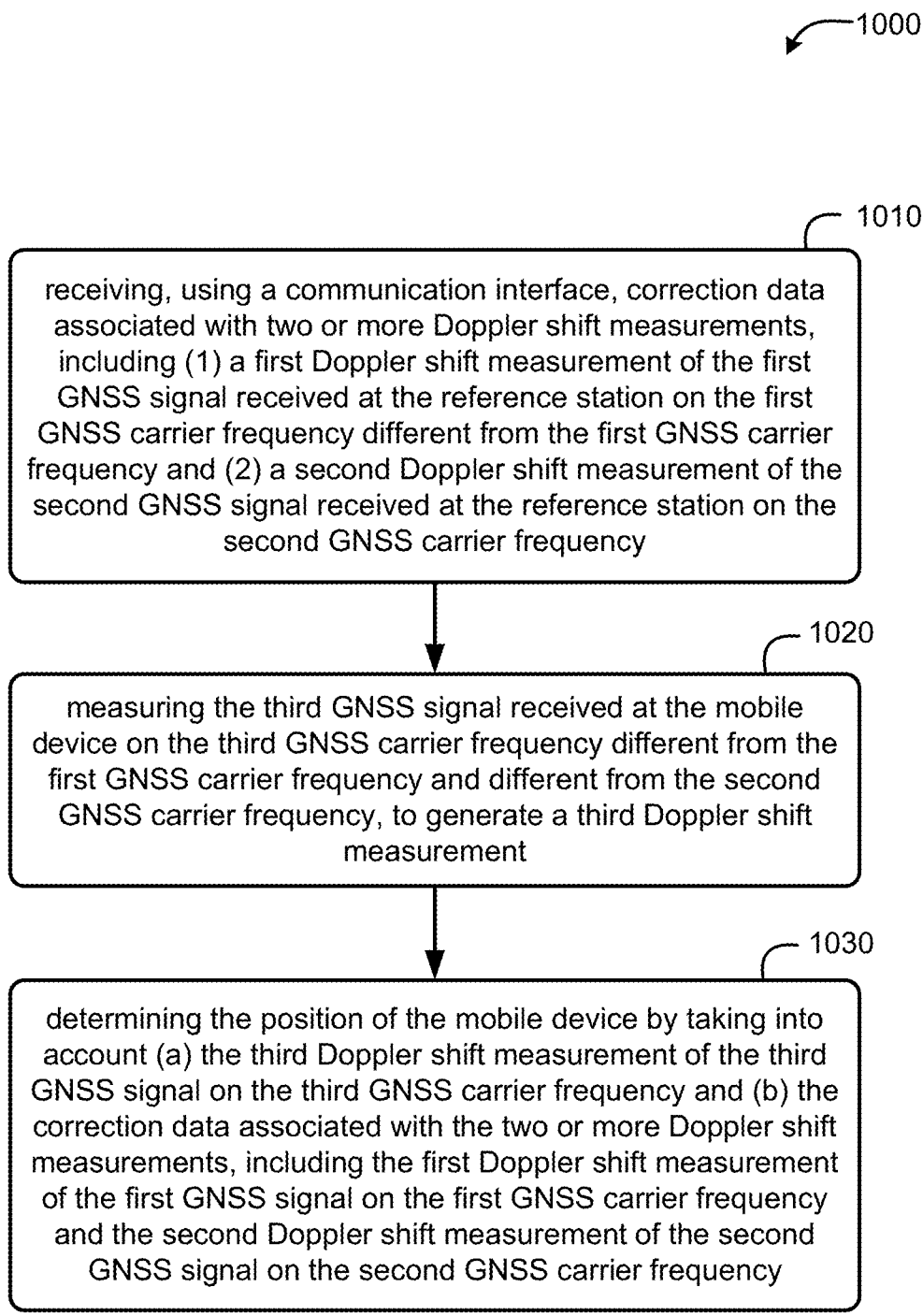
FIG. 10 is a flow diagram of a method performed at a mobile device for determining a position based on GNSS signals, taking into account estimation of a Doppler shift, according to an aspect of the disclosure.

FIG. 10 is a flow diagram of a method 1000 performed at a mobile device for determining a position based on GNSS signals, taking into account estimation of a Doppler shift, according to an aspect of the disclosure. Means for performing the functionality illustrated in one or more of the blocks shown in FIG. 10 may be performed by hardware and/or software components of a mobile device. Example components of a mobile device are illustrated in FIG. 12, which is described in more detail below.

At block 1010, the functionality comprises receiving, using the communication interface, correction data associated with two or more Doppler shift measurements, including (1) a first Doppler shift measurement of the first GNSS signal received at the reference station on the first GNSS carrier frequency different from the first GNSS carrier frequency and (2) a second Doppler shift measurement of the second GNSS signal received at the reference station on the second GNSS carrier frequency. The further additional correction data received from the reference station or a correction server may comprise a virtual Doppler shift measurement of the third GNSS signal on the third GNSS carrier frequency generated at the reference station or the correction server, based on the first Doppler shift measurement and the second Doppler shift measurement. Alternatively, the virtual Doppler shift measurement of the third GNSS signal on the third GNSS carrier frequency may be generated at the mobile device. Means for performing functionality at block 1010 may comprise, for example, a Global Navigation Satellite System (GNSS) receiver 1280 as illustrated in FIG. 12.

At block 1020, the functionality comprises measuring the third GNSS signal received at the mobile device on the third GNSS carrier frequency different from the first GNSS carrier frequency and different from the second GNSS carrier frequency, to generate a third Doppler shift measurement. Means for performing functionality at block 1020 may comprise, for example, the GNSS receiver 1280, processor(s) 1210, and/or memory 1260 illustrated in FIG. 12.

At block 1030, the functionality comprises determining the position of the mobile device by taking into account (a) the third Doppler shift measurement of the third GNSS signal on the third GNSS carrier frequency and (b) the further additional correction data associated with the two or more Doppler shift measurements, including the first Doppler shift measurement of the first GNSS signal on the first GNSS carrier frequency and the second Doppler shift measurement of the second GNSS signal on the second GNSS carrier frequency. Using the correction data to determine the position of the mobile device may comprise using the virtual Doppler shift measurement, included in the further additional correction data or generated at the mobile device, to estimate a frequency offset in the third GNSS signal. The frequency offset may correspond to a Doppler shift associated with a relative velocity between the satellite vehicle and mobile device. Determination of the position of the mobile device may take into account the frequency offset in the third GNSS signal, by including the virtual Doppler shift measurement. Means for performing functionality at block 1030 may comprise, for example, the GNSS receiver 1280, processor(s) 1210, and/or memory 1260 illustrated in FIG. 12

Figure 11:
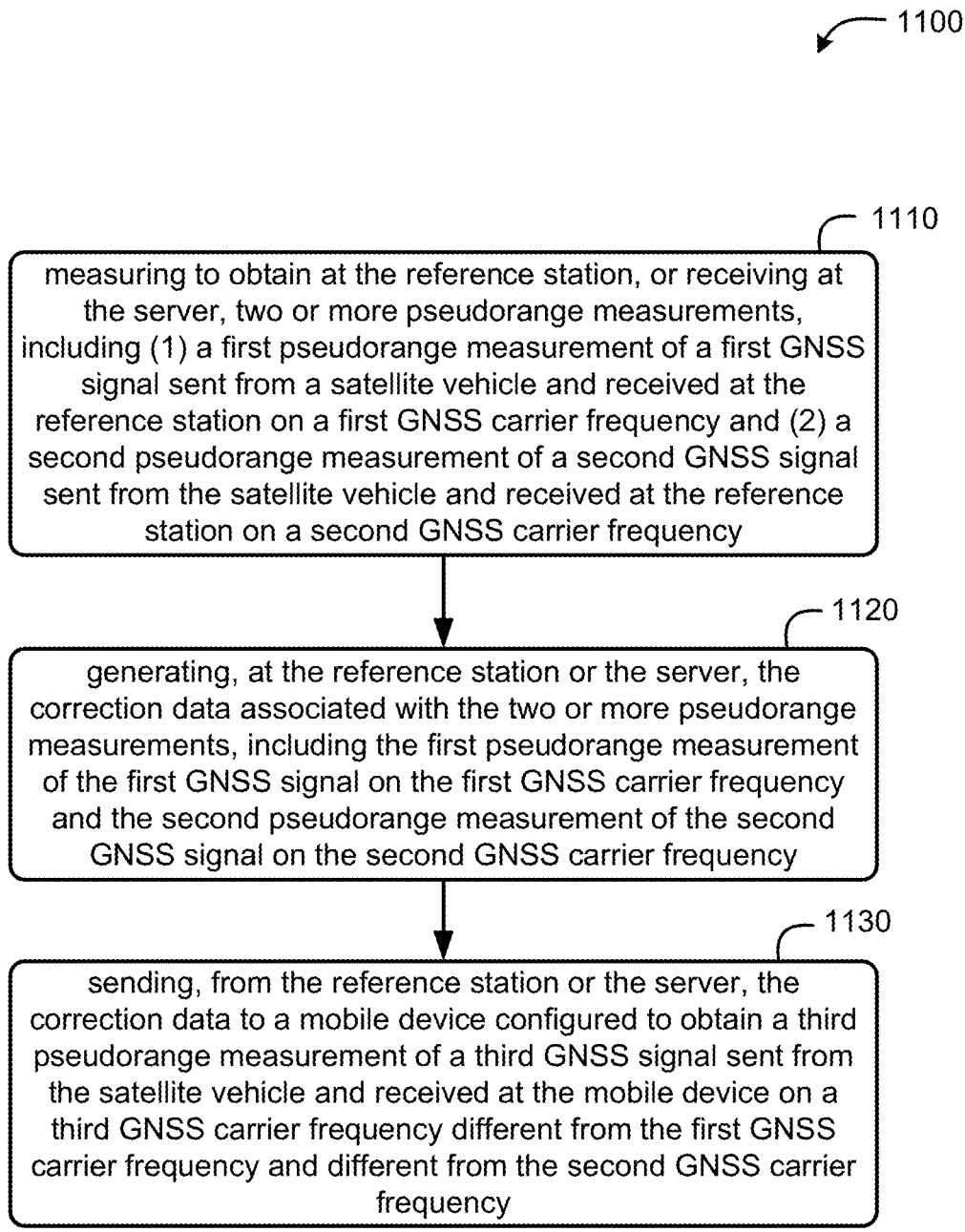
FIG. 11 is a flow diagram of a method performed at a reference station or a server for providing correction data for GNSS signals, according to an aspect of the disclosure.

FIG. 11 is a flow diagram of a method 1100 performed at a reference station or a server for providing correction data for GNSS signals, according to an aspect of the disclosure. An example of such a server is the correction server 180 illustrated in FIG. 1. Means for performing the functionality illustrated in one or more of the blocks shown in FIG. 11 may be performed by hardware and/or software components of a reference station. Example components of a reference station are illustrated in FIG. 10, which is described in more detail below.

At block 1110, the functionality comprises measuring to obtain at the reference station, or receiving at the server, two or more pseudorange measurements, including (1) a first pseudorange measurement of a first GNSS signal sent from a satellite vehicle and received at the reference station on a first GNSS carrier frequency and (2) a second pseudorange measurement of a second GNSS signal sent from the satellite vehicle and received at the reference station on a second GNSS carrier frequency. Means for performing functionality at block 1110 may comprise, for example, the GNSS receiver 1030 illustrated in FIG. 10, as well as the communication subsystem 1130, the processor(s) 1110, and the storage device(s) 1125 illustrated in FIG. 11, which is described in more detail below.

At block 1120, the functionality comprises generating, at the reference station or the server, the correction data associated with the two or more pseudorange measurements, including the first pseudorange measurement of the first GNSS signal on the first GNSS carrier frequency and the second pseudorange measurement of the second GNSS signal on the second GNSS carrier frequency. Means for performing functionality at block 1110 may comprise, for example, the GNSS receiver 1030, processor(s) 1010, and/or memory 1060 illustrated in FIG. 10, as well as the processor(s) 1110 and the storage device(s) 1125 illustrated in FIG. 11.

At block 1130, the functionality comprises sending, from the reference station or the server, the correction data to a mobile device configured to obtain a third pseudorange measurement of a third GNSS signal sent from the satellite vehicle and received at the mobile device on a third GNSS carrier frequency different from the first GNSS carrier frequency and different from the second GNSS carrier frequency. Means for performing functionality at block 1130 may comprise, for example, the GNSS receiver 1030 illustrated in FIG. 10, as well as the communication subsystem 1130, the processor(s) 1110, and the storage device(s) 1125 illustrated in FIG. 11.

FIG. 12 is a block diagram of an embodiment of a mobile device 110, which can be utilized as described herein above (e.g., in association with FIGS. 1-5). For example, the mobile device 110 can perform one or more of the functions of the method shown in FIGS. 4, 5, and 8. It should be noted that FIG. 12 is meant only to provide a generalized illustration of various components, any or all of which may be utilized as appropriate. Mobile devices may vary in form and function, and may ultimately comprise any GNSS-enabled device, including vehicles, commercial and consumer electronic devices, survey equipment, and more. Thus, in some instances, components illustrated by FIG. 12 can be localized to a single physical device and/or distributed among various networked devices, which may be disposed at different physical locations (e.g., different locations of a vehicle). Furthermore, as previously noted, the functionality of the mobile device discussed in the previously described embodiments may be executed by one or more of the hardware and/or software components illustrated in FIG. 12.

The mobile device 110 is shown comprising hardware elements that can be electrically coupled via a bus 1205 (or may otherwise be in communication, as appropriate). The hardware elements may include a processor(s) 1210 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1210 may comprise one or more processing units, which may be housed in a single integrated circuit (IC) or multiple ICs. As shown in FIG. 12, some embodiments may have a separate DSP 1220, depending on desired functionality. Location determination and/or other determinations based on wireless communication may be provided in the processor(s) 1210 and/or wireless communication interface 1230 (discussed below). The mobile device 110 also can include one or more input devices 1270, which can include without limitation one or more keyboards, touch screens, touch pads, microphones, buttons, dials, switches, and/or the like; and one or more output devices 1215, which can include without limitation one or more displays (e.g., touch screens), light emitting diodes (LEDs), speakers, and/or the like.

The mobile device 110 may also include a wireless communication interface 1230, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 110 to communicate with other devices via the networks described above with regard to FIG. 1. The wireless communication interface 1230 may permit data and signaling to be communicated (e.g. transmitted and received) with a network, for example, via WAN access points, cellular reference stations and/or other access node types, and/or other network components, computer systems, and/or any other electronic devices described herein. The communication can be carried out via one or more wireless communication antenna(s) 1232 that send and/or receive wireless signals 1234. According to some embodiments, the wireless communication antenna(s) 1232 may comprise a plurality of discrete antennas, antenna arrays, or any combination thereof.

Depending on desired functionality, the wireless communication interface 630 may comprise separate transceivers, a separate receiver and transmitter, or any combination of transceivers, transmitters, and/or receivers to communicate with reference stations and other terrestrial transceivers, such as wireless devices and access points. As previously noted, the mobile device 110 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000@, WCDMA, and so on. CDMA2000@includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 110 can further include sensor(s) 1240. Sensor(s) 1240 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile device 110 may also include a Global Navigation Satellite System (GNSS) receiver 1280 capable of receiving signals 1284 from one or more GNSS satellites using an antenna 1282 (which could be the same as antenna 1232). GNSS receiver 1280 can take measurements described herein to determine a position fix for the mobile device 110, using signals 1284 from GNSS SVs (e.g., SVs 140) of one or more GNSS constellations, and DGNSS-related data provided by a reference station and/or service provider (e.g., correction data, which can include measurements taken at the reference station and/or information derived from such measurements). Examples of GNSS constellations include Global Positioning System (GPS), Galileo, GLONASS, Quasi-Zenith Satellite System (QZSS) over Japan, IRNSS over India, BeiDou Navigation Satellite System (BD S) over China, and/or the like. The GNSS receiver 1280 can perform the measurements of the signals 1284 using internal processing units and/or in conjunction with processing performed by one or more processing units 1210. Thus, a position fix can be determined by the GNSS receiver 1280 itself or by a processing unit 1210 based on output of the GNSS receiver 1280. Measurements of the signals 1284 can include raw measurements (e.g., uncorrected pseudorange) and/or processed measurements (e.g., differential pseudorange measurements, pseudorange combined with carrier phase, etc.). GNSS receiver 1280 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1280 is illustrated in FIG. 12 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1210, DSP 1220, and/or a processor within the wireless communication interface 1230 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1210 or DSP 1220.

The mobile device 110 may be configured to receive measurements of signals (e.g., pseudorandom and carrier phase measurements) and/or information derived therefrom (e.g., virtual pseudorandom and carrier phase measurements) as correction data from the reference station 120 or the correction server 180. The correction data may further include other DGNSS-related data such as a known location of the reference station 120. The mobile device 110 can receive such correction data from the reference station 120 directly using wireless communication interface 930. Alternatively, mobile device 110 can receive such correction data from the reference station 120 or the correction server 180 through a network entity (e.g., data communication network 150) using a network interface 990. Here, network interface 990 is also an example of a communication interface but is based on wired instead of wireless communications.

Network interface 990 can support wireline communication technologies. The network interface 990 may include a modem, network card, chipset, and/or the like. The network interface 990 may include one or more input and/or output communication interfaces to permit data to be exchanged with a network (e.g., the data communication network 150), communication network servers, computer systems, and/or any other electronic devices described herein.

The mobile device 110 may further include and/or be in communication with a memory 1260. The memory 1260 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1260 of the mobile device 110 also can comprise software elements (not shown in FIG. 12), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1260 that are executable by the mobile device 110 (and/or processor(s) 1210 or DSP 1220 within mobile device 110). In some embodiments, then, such code and/or instructions can be used to configure and/or adapt a general-purpose computer (or other device) to perform one or more operations in accordance with the described methods.

Figure 13:
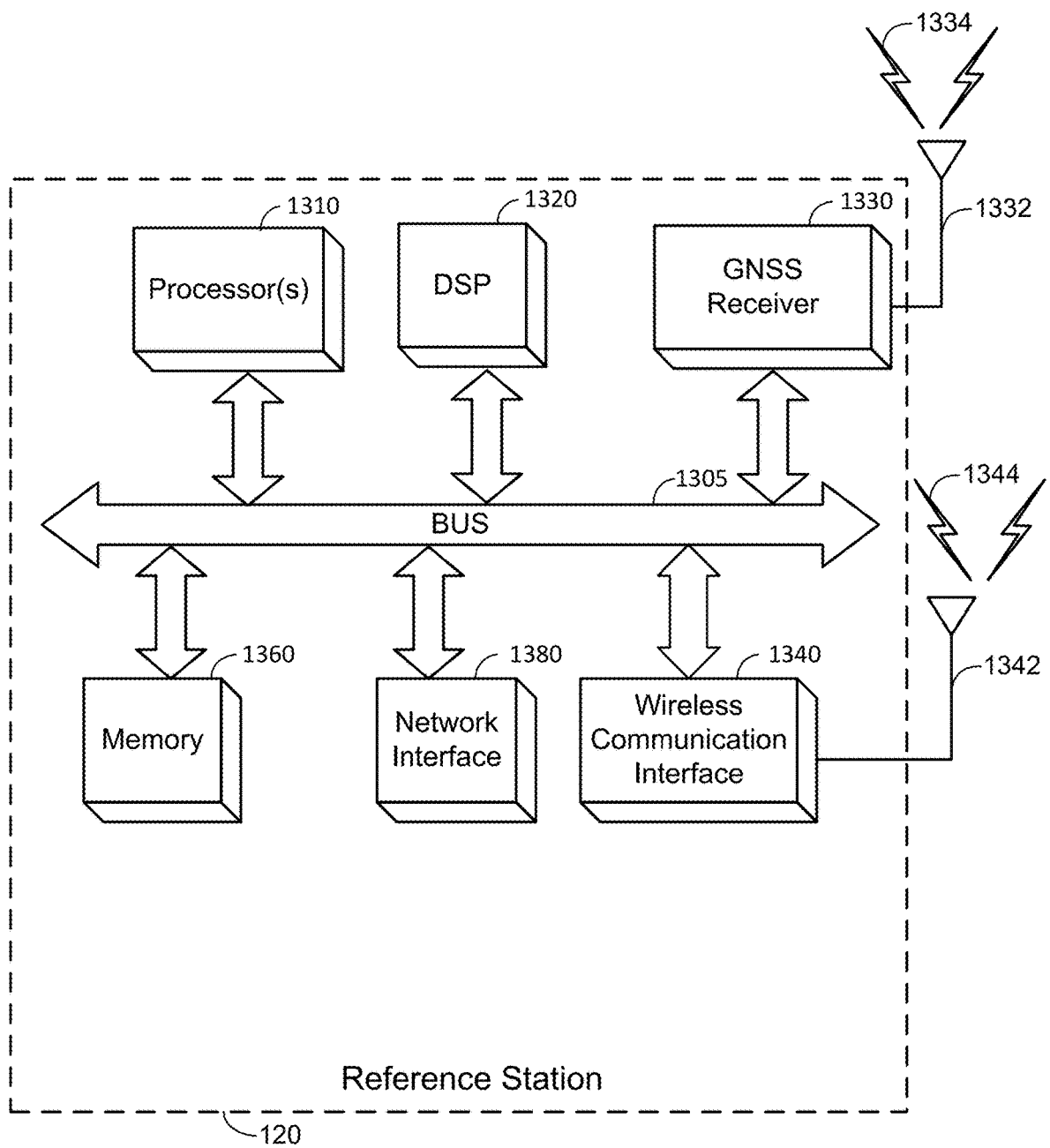
FIG. 13 is a block diagram of an embodiment of a reference station, which can be utilized in embodiments as described herein.

FIG. 13 is a block diagram of an embodiment of a reference station 120, which can be utilized as described herein above (e.g., in association with FIGS. 1-5). For example, the mobile device 110 can perform one or more of the functions of the method shown in FIGS. 4, 5, and 8. It should be noted that FIG. 13 is meant only to provide a generalized illustration of various components, any or all of which may be utilized as appropriate. In some embodiments, the reference station 120 may correspond to a gNB, an ng-eNB, and/or (more generally) a TRP. In other embodiments, the reference station 120 may not include any functionality associated with a gNB, an ng-eNB, and/or a TRP.

The reference station 120 is shown comprising hardware elements that can be electrically coupled via a bus 1305 (or may otherwise be in communication, as appropriate). The hardware elements may include a processor(s) 1310 which can include without limitation one or more general-purpose processors, one or more special-purpose processors (such as DSP chips, graphics acceleration processors, ASICs, and/or the like), and/or other processing structure or means. As shown in FIG. 13, some embodiments may have a separate DSP 1320, depending on desired functionality. Location determination and/or other determinations based on wireless communication may be provided in the processor(s) 1310 and/or wireless communication interface 1340, according to some embodiments. Wireless communication interface 1040 can transmit and receive wireless signals 1044 using an antenna 1042. The reference station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The reference station 120 further comprises a GNSS receiver 1330 capable taking measurements of signals 1334 received using an antenna 1332 from one or more GNSS satellites (e.g., SVs 140). The measurements of the signals 1334 can include any of the types of signals described herein as capable of being performed by a reference station (e.g., reference station 120). For example, the measurements of the signals 1334 can include raw measurements (e.g., uncorrected pseudorange measurements and/or carrier phase measurements (which may or may not be disambiguated)) and/or processed measurements (e.g., differential pseudorange, differential carrier phase, linear combinations of pseudorange, linear combinations of carrier phase, etc.).

The reference station 120 may be configured to provide measurements of signals (e.g., pseudorandom and carrier phase measurements) and/or information derived therefrom (e.g., virtual pseudorandom and carrier phase measurements) as correction data to a mobile device (e.g., mobile device 110). The correction data may further include other DGNSS-related data such as a known location of the reference station 120. The reference station 120 can communicate such correction data to the mobile device using wireless communication interface 1040 or through a network entity (e.g., data communication network 150) using a network interface 1380.

Network interface 1380 can support wireline communication technologies. The network interface 1380 may include a modem, network card, chipset, and/or the like. The network interface 1380 may include one or more input and/or output communication interfaces to permit data to be exchanged with a network (e.g., the data communication network 150), communication network servers, computer systems, and/or any other electronic devices described herein.

The reference station 120 may further comprise a memory 1360. The memory 1360 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1360 of the reference station 120 also may comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the reference station 120 (and/or processor(s) 1310 or DSP 1320 within reference station 120). In some embodiments, then, such code and/or instructions can be used to configure and/or adapt a general-purpose computer (or other device) to perform one or more operations in accordance with the described methods.

Figure 14:
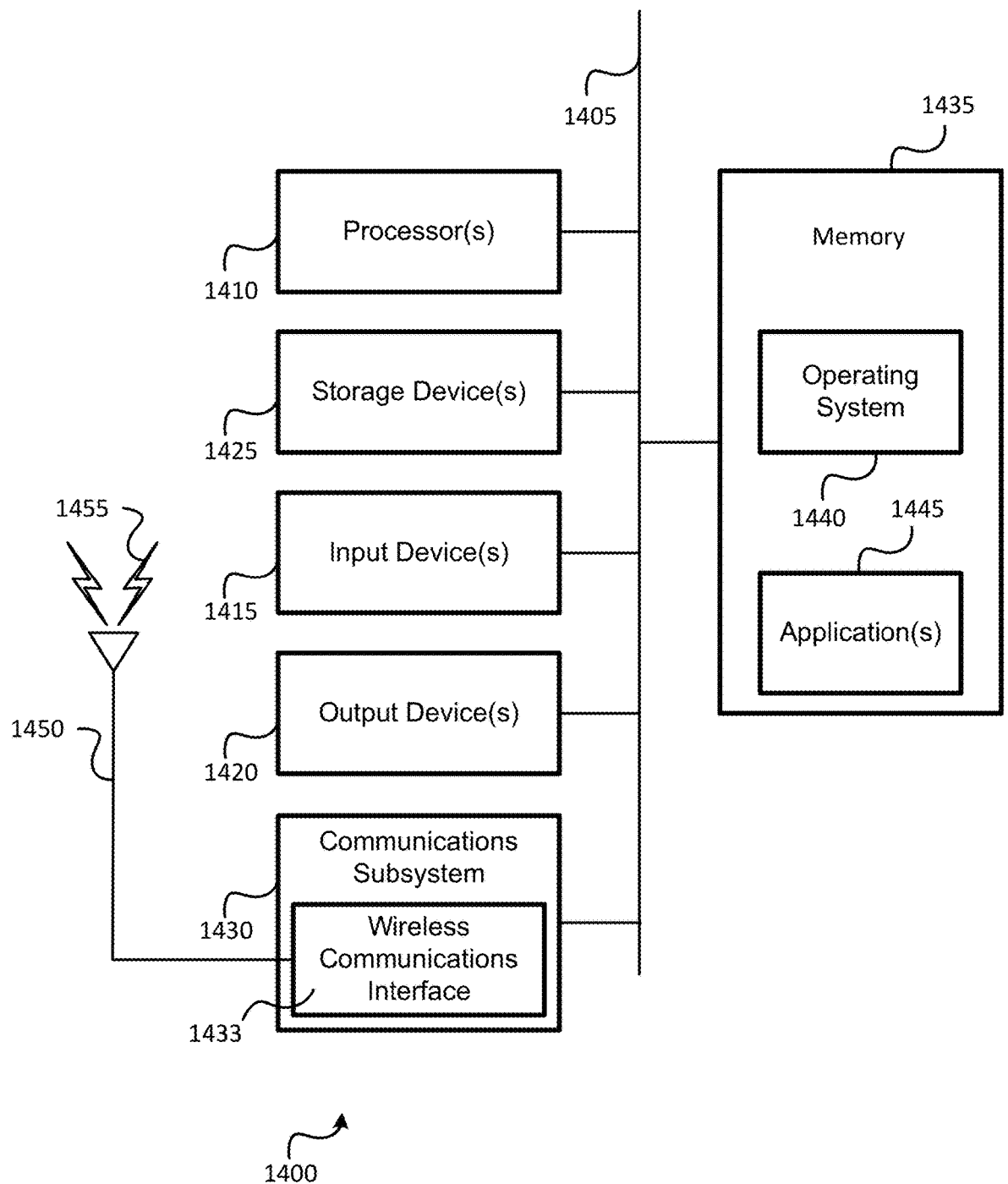
FIG. 14 is a block diagram of an embodiment of a computer system, which can be utilized in embodiments as described herein.

FIG. 14 is a block diagram of an embodiment of a computer system 1400, which may be used, in whole or in part, to provide the functions of one or more network components as described in the embodiments herein (e.g., service provider 170 of FIG. 1. It should be noted that FIG. 14 is meant only to provide a generalized illustration of various components, any or all of which may be utilized as appropriate. FIG. 14, therefore, broadly illustrates how individual system elements may be implemented in a relatively separated or relatively more integrated manner. In addition, it can be noted that components illustrated by FIG. 14 can be localized to a single device and/or distributed among various networked devices, which may be disposed at different geographical locations.

The computer system 1400 is shown comprising hardware elements that can be electrically coupled via a bus 1405 (or may otherwise be in communication, as appropriate). The hardware elements may include processor(s) 1410, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1400 also may comprise one or more input devices 1415, which may comprise without limitation a mouse, a keyboard, a camera, a microphone, and/or the like; and one or more output devices 1420, which may comprise without limitation a display device, a printer, and/or the like.

The computer system 1400 may further include (and/or be in communication with) one or more non-transitory storage devices 1425, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1400 may also include a communications subsystem 1430, which may comprise wireless communication technologies managed and controlled by a wireless communication interface 1433, as well as wired technologies (such as Ethernet, coaxial communications, universal serial bus (USB), and the like). The wireless communication interface 1433 may comprise one or more wireless transceivers that may send and receive wireless signals 1455 (e.g., signals according to 5G NR or LTE) via wireless antenna(s) 1450. Thus the communications subsystem 1430 may comprise a modem, a network card (wireless or wired), an infrared communication device, a wireless communication device, and/or a chipset, and/or the like, which may enable the computer system 1400 to communicate on any or all of the communication networks described herein to any device on the respective network, including a User Equipment (UE), base stations and/or other TRPs, and/or any other electronic devices described herein. Hence, the communications subsystem 1430 may be used to receive and send data as described in the embodiments herein.

In many embodiments, the computer system 1400 will further comprise a working memory 1435, which may comprise a RAM or ROM device, as described above. Software elements, shown as being located within the working memory 1435, may comprise an operating system 1440, device drivers, executable libraries, and/or other code, such as one or more applications 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer);

in an aspect, then, such code and/or instructions can be used to configure and/or adapt a general-purpose computer (or other device) to perform one or more operations in accordance with the described methods.

A set of these instructions and/or code might be stored on a non-transitory computer-readable storage medium, such as the storage device(s) 1425 described above. In some cases, the storage medium might be incorporated within a computer system, such as computer system 1400. In other embodiments, the storage medium might be separate from a computer system (e.g., a removable medium, such as an optical disc), and/or provided in an installation package, such that the storage medium can be used to program, configure, and/or adapt a general-purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method performed at a mobile device for determining a position based on Global Navigational Satellite System (GNSS) signals, the method comprising: receiving, using a communication interface, correction data based on two or more pseudorange measurements, including (1) a first pseudorange measurement of a first GNSS signal sent from a satellite vehicle and received at a reference station on a first GNSS carrier frequency and (2) a second pseudorange measurement of a second GNSS signal sent from the satellite vehicle and received at the reference station on a second GNSS carrier frequency, the first GNSS carrier frequency being different from the second GNSS carrier frequency; measuring a third GNSS signal sent from the satellite vehicle and received at the mobile device on a third GNSS carrier frequency different from the first GNSS carrier frequency and different from the second GNSS carrier frequency, to generate a third pseudorange measurement; and determining the position of the mobile device using (a) the third pseudorange measurement of the third GNSS signal on the third GNSS carrier frequency and (b) the correction data based on the two or more pseudorange measurements, including the first pseudorange measurement of the first GNSS signal on the first GNSS carrier frequency and the second pseudorange measurement of the second GNSS signal on the second GNSS carrier frequency.

Clause 2: The method of clause 1, wherein the correction data comprises (1) the first pseudorange measurement and (2) the second pseudorange measurement.

Clause 3: The method of any one of clauses 1-2 wherein the method further comprises: generating, at the mobile device, a virtual pseudorange measurement for the third GNSS carrier frequency.

Clause 4: The method of clause 1, wherein the correction data comprises a virtual pseudorange measurement generated at the reference station or a server for the third GNSS carrier frequency.

Clause 5: The method of any one of clauses 1-4 wherein the correction data includes or is used to generate a virtual pseudorange measurement for the third GNSS carrier frequency, the virtual pseudorange measurement based on a linear combination of (1) the first pseudorange measurement of the first GNSS signal on the first GNSS carrier frequency and (2) the second pseudorange measurement of the second GNSS signal on the second GNSS carrier frequency.

Clause 6: The method of clause 5, wherein the linear combination for generating the virtual pseudorange measurement is expressed by:

$$\hat{P}_{L3} = a^* P_{L1} + b^* P_{L2},$$

wherein $P_{L3}$ corresponds to the virtual pseudorange measurement for the third GNSS carrier frequency, $P_{L1}$ corresponds to the first pseudorange measurement of the first GNSS signal on the first GNSS carrier frequency, $P_{L2}$ corresponds to the second pseudorange measurement of the second GNSS signal on the second GNSS carrier frequency, and a and b are coefficients satisfying:

$$a = \frac{f_1^2 f_3^2 - f_1^2 f_2^2}{f_1^2 f_3^2 - f_2^2 f_3^2} \text{ and}$$

$$b = 1 - a = \frac{f_1^2 f_2^2 - f_2^2 f_3^2}{f_1^2 f_3^2 - f_2^2 f_3^2},$$

wherein $f_1$ corresponds to the first GNSS carrier frequency, $f_2$ corresponds to the second GNSS carrier frequency, and $f_3$ corresponds to the third GNSS carrier frequency.

Clause 7: The method of clause 5, wherein the virtual pseudorange measurement for the third GNSS carrier frequency is generated by taking into account a differential code bias correction term.

Clause 8: The method of clause 7, wherein the linear combination for generating the virtual pseudorange measurement, including the differential code bias correction term, denoted as $\Delta DCB_{P_{L3}}$, is expressed as:

$$\hat{P}_{L3} = a^* P_{L1} + b^* P_{L2} + \Delta DCB_{PP_{L3}}.$$

Clause 9: The method of clause 8, wherein the differential code bias correction term $\Delta DCB_{P_{L3}}$ is based on known values of differential code biases $DCB_{P_{L1}}$, $DCB_{P_{L2}}$, and $DCB_{P_{L3}}$, for the first, second, and third GNSS carrier frequencies, respectively, and expressed as:

$$\Delta DCB_{P_{L3}} = DCB_{P_{L3}} - (a^* DCB_{P_{L1}} + b^* DCB_{P_{L2}}).$$

Clause 10: The method of any one of clauses 1-9 wherein the method further comprises: receiving, using the communication interface, additional correction data based on two or more carrier phase measurements, including (1) a first carrier phase measurement of the first GNSS signal received at the reference station on the first GNSS carrier frequency different from the first GNSS carrier frequency and (2) a second carrier phase measurement of the second GNSS signal received at the reference station on the second GNSS carrier frequency; and measuring the third GNSS signal received at the mobile device on the third GNSS carrier frequency different from the first GNSS carrier frequency and different from the second GNSS carrier frequency, to generate a third carrier phase measurement, wherein the determining the position of the mobile device further comprises using (a) the third carrier phase measurement of the third GNSS signal on the third GNSS carrier frequency and (b) the additional correction data based on the two or more carrier phase measurements, including the first carrier phase measurement of the first GNSS signal on the first GNSS carrier frequency and the second carrier phase measurement of the second GNSS signal on the second GNSS carrier frequency.

Clause 11: The method of clause 10, wherein the additional correction data comprises (1) the first carrier phase measurement and (2) the second carrier phase measurement.

Clause 12: The method of clause 11, wherein the method further comprises: generating, at the mobile device, a virtual carrier phase measurement for the third GNSS carrier frequency.

Clause 13: The method of clause 10, wherein the additional correction data comprises a virtual carrier phase measurement generated at the reference station or a server for the third GNSS carrier frequency.

Clause 14: The method of any one of clauses 10-13 wherein the additional correction data includes or is used to generate a virtual carrier phase measurement for the third GNSS carrier frequency, the virtual carrier phase measurement based on a linear combination of (1) the first carrier phase measurement of the first GNSS signal on the first GNSS carrier frequency and (2) the second carrier phase measurement of the second GNSS signal on the second GNSS carrier frequency.

Clause 15: The method of clause 14 wherein the linear combination for generating the virtual carrier phase measurement for the third GNSS carrier frequency is expressed as:

$$\hat{\Phi}_{L3} = a^* \Phi_{L1} + b^* \Phi_{L2},$$

wherein $\hat{\Phi}_{L3}$ corresponds to the virtual carrier phase measurement for the third GNSS carrier frequency, $\Phi_{L1}$ corresponds to the first carrier phase measurement of the first GNSS signal on the first GNSS carrier frequency, $\Phi_{L2}$ corresponds to the second carrier phase measurement of the second GNSS signal on the second GNSS carrier frequency, and a and b are coefficients satisfying:

$$a = \frac{f_1^2 f_3^2 - f_1^2 f_2^2}{f_1^2 f_3^2 - f_2^2 f_3^2} \text{ and}$$

-continued $$b = 1 - a = \frac{f_1^2 f_2^2 - f_2^2 f_3^2}{f_1^2 f_3^2 - f_2^2 f_3^2},$$

wherein $f_1$ corresponds to the first GNSS carrier frequency, $f_2$ corresponds to the second GNSS carrier frequency, and $f_3$ corresponds to the third GNSS carrier frequency.

Clause 16: The method of any one of clauses 1-15 wherein the determining the position of the mobile device comprises using the correction data, the additional correction data, or both the correction data and the additional correction data, to perform Real-Time Kinematic (RTK) correction on the third carrier phase measurement.

Clause 17: The method of any one of clauses 1-15 wherein the determining the position of the mobile device comprises using the correction data, the additional correction data, or both the correction data and the additional correction data, to perform Differential Global Navigation Satellite (DGNSS) correction on the third pseudorange measurement.

Clause 18: The method of any one of clauses 1-17 wherein the method further comprises: receiving, using the communication interface, further additional correction data based on two or more Doppler shift measurements, including (1) a first Doppler shift measurement of the first GNSS signal received at the reference station on the first GNSS carrier frequency different from the first GNSS carrier frequency and (2) a second Doppler shift measurement of the second GNSS signal received at the reference station on the second GNSS carrier frequency; and measuring the third GNSS signal received at the mobile device on the third GNSS carrier frequency different from the first GNSS carrier frequency and different from the second GNSS carrier frequency, to generate a third Doppler shift measurement, wherein the determining the position of the mobile device further comprises using (a) the third Doppler shift measurement of the third GNSS signal on the third GNSS carrier frequency and (b) the further additional correction data based on the two or more Doppler shift measurements, including the first Doppler shift measurement of the first GNSS signal on the first GNSS carrier frequency and the second Doppler shift measurement of the second GNSS signal on the second GNSS carrier frequency.

Clause 19: The method of claim 18, wherein the further additional correction data received from the reference station or a correction server comprises a virtual Doppler shift measurement of the third GNSS signal on the third GNSS carrier frequency generated at the reference station or the correction server, based on the first Doppler shift measurement and the second Doppler shift measurement.

Clause 20: The method of claim 18, further comprising generating, at the mobile device, a virtual Doppler shift measurement of the third GNSS signal on the third GNSS carrier frequency, based on the first Doppler shift measurement and the second Doppler shift measurement.

Clause 21: The method of any one of clauses 19 or 20, wherein the using the further additional correction data to determine the position of the mobile device may comprise using the virtual Doppler shift measurement, included in the further additional correction data or generated at the mobile device, to estimate a frequency offset in the third GNSS signal and taking into account the frequency offset in the third GNSS signal to determine the position of the mobile device.

Clause 22: The method of any one of clauses 1-21, wherein the mobile device is within a predetermined proximity to the reference station.

Clause 23: A method performed at a reference station or a server for providing correction data for Global Navigational Satellite System (GNSS) signals, the method comprising: measuring to obtain at the reference station, or receiving at the server, two or more pseudorange measurements, including (1) a first pseudorange measurement of a first GNSS signal sent from a satellite vehicle and received at the reference station on a first GNSS carrier frequency and (2) a second pseudorange measurement of a second GNSS signal sent from the satellite vehicle and received at the reference station on a second GNSS carrier frequency, the first GNSS carrier frequency being different from the second GNSS carrier frequency; generating, at the reference station or the server, the correction data based on the two or more pseudorange measurements, including the first pseudorange measurement of the first GNSS signal on the first GNSS carrier frequency and the second pseudorange measurement of the second GNSS signal on the second GNSS carrier frequency; and sending, from the reference station or the server, the correction data to a mobile device configured to obtain a third pseudorange measurement of a third GNSS signal sent from the satellite vehicle and received at the mobile device on a third GNSS carrier frequency different from the first GNSS carrier frequency and different from the second GNSS carrier frequency.

Clause 24: The method of clause 23, wherein the method further comprises: measuring to obtain at the reference station, or receiving at the server, two or more carrier phase measurements, including (1) a first carrier phase measurement of the first GNSS signal received at the reference station on the first GNSS carrier frequency and (2) a second carrier phase measurement of the second GNSS signal received at the reference station on the second GNSS carrier frequency; generating, at the reference station or the server, additional correction data based on the two or more carrier phase measurements, including the first carrier phase measurement of the first GNSS signal on the first GNSS carrier frequency and the second carrier phase measurement of the second GNSS signal on the second GNSS carrier frequency; and sending, from the reference station or the server, the additional correction data to the mobile device, wherein the mobile device is configured to obtain a third carrier phase measurement of the third GNSS signal received at the mobile device on the third GNSS carrier frequency different from the first GNSS carrier frequency and different from the second GNSS carrier frequency.

Clause 25: The method of any one of clauses 23 or 24, wherein the mobile device is within a predetermined proximity to the reference station.

Clause 26: A mobile device for determining a position based on Global Navigational Satellite System (GNSS) signals, the mobile device comprising: a communication interface configured to receive correction data based on two or more pseudorange measurements, including (1) a first pseudorange measurement of a first GNSS signal sent from a satellite vehicle and received at a reference station on a first GNSS carrier frequency and (2) a second pseudorange measurement of a second GNSS signal sent from the satellite vehicle and received at the reference station on a second GNSS carrier frequency, the first GNSS carrier frequency being different from the second GNSS carrier frequency; a GNSS receiver configured to measure a third GNSS signal sent from the satellite vehicle and received at the GNSS receiver on a third GNSS carrier frequency different from the first GNSS carrier frequency and different from the second GNSS carrier frequency, to generate a third pseudorange measurement; a memory; and one or more processing units communicatively coupled with the communication interface, the GNSS receiver, and the memory, the one or more processing units configured to determine the position of the mobile device using (a) the third pseudorange measurement of the third GNSS signal on the third GNSS carrier frequency and (b) the correction data based on the two or more pseudorange measurements, including the first pseudorange measurement of the first GNSS signal on the first GNSS carrier frequency and the second pseudorange measurement of the second GNSS signal on the second GNSS carrier frequency.

Clause 27: The mobile device of clause 26, wherein the correction data comprises (1) the first pseudorange measurement and (2) the second pseudorange measurement.

Clause 28: The mobile device of clause 27, wherein the one or more processing units are further configured to: generate a virtual pseudorange measurement for the third GNSS carrier frequency.

Clause 29: The mobile device of clause 26, wherein the correction data comprises a virtual pseudorange measurement generated at the reference station or a server for the third GNSS carrier frequency.

Clause 30: The mobile device of any one of clauses 26-29 wherein the correction data includes or is used to generate a virtual pseudorange measurement, the virtual pseudorange measurement based on a linear combination of (1) the first pseudorange measurement of the first GNSS signal on the first GNSS carrier frequency and (2) the second pseudorange measurement of the second GNSS signal on the second GNSS carrier frequency.

Clause 31: The mobile device of any one of clauses 26-30 wherein the communication interface is further configured to receive additional correction data based on two or more carrier phase measurements, including (1) a first carrier phase measurement of the first GNSS signal received at the reference station on the first GNSS carrier frequency different from the first GNSS carrier frequency and (2) a second carrier phase measurement of the second GNSS signal received at the reference station on the second GNSS carrier frequency, the GNSS receiver is further configured to measure the third GNSS signal received at the GNSS receiver on the third GNSS carrier frequency different from the first GNSS carrier frequency and different from the second GNSS carrier frequency, to generate a third carrier phase measurement, and the one or more processing units are further configured to determine the position of the mobile device by further using (a) the third carrier phase measurement of the third GNSS signal on the third GNSS carrier frequency and (b) the additional correction data based on the two or more carrier phase measurements, including the first carrier phase measurement of the first GNSS signal on the first GNSS carrier frequency and the second carrier phase measurement of the second GNSS signal on the second GNSS carrier frequency.

Clause 32: The mobile device of clause 31, wherein the additional correction data comprises (1) the first carrier phase measurement and (2) the second carrier phase measurement.

Clause 33: The mobile device of clause 32, wherein the one or more processing units are further configured to: generate, at the mobile device, a virtual carrier phase measurement for the third GNSS carrier frequency.

Clause 34: The mobile device of clause 31, wherein the additional correction data comprises a virtual carrier phase measurement generated at the reference station or a server for the third GNSS carrier frequency.

Clause 35: The mobile device of any one of clauses 26-34, wherein the mobile device is within a predetermined proximity to the reference station.

Clause 36: An apparatus for determining a position of a mobile device based on Global Navigational Satellite System (GNSS) signals, the apparatus comprising: means for receiving correction data based on two or more pseudorange measurements, including (1) a first pseudorange measurement of a first GNSS signal sent from a satellite vehicle and received at a reference station on a first GNSS carrier frequency and (2) a second pseudorange measurement of a second GNSS signal sent from the satellite vehicle and received at the reference station on a second GNSS carrier frequency, the first GNSS carrier frequency being different from the second GNSS carrier frequency; means for measuring a third GNSS signal sent from the satellite vehicle and received at the mobile device on a third GNSS carrier frequency different from the first GNSS carrier frequency and different from the second GNSS carrier frequency, to generate a third pseudorange measurement; and means for determining the position of the mobile device using (a) the third pseudorange measurement of the third GNSS signal on the third GNSS carrier frequency and (b) the correction data based on the two or more pseudorange measurements, including the first pseudorange measurement of the first GNSS signal on the first GNSS carrier frequency and the second pseudorange measurement of the second GNSS signal on the second GNSS carrier frequency.

Clause 37: The apparatus of clause 36, wherein the mobile device is within a predetermined proximity to the reference station.

Clause 38: A method performed at a mobile device for determining a position based on Global Navigational Satellite System (GNSS) signals, the method comprising: receiving, using a communication interface, correction data associated with two or more satellite signal measurements, including (1) a first satellite signal measurement of a first GNSS signal sent from a satellite vehicle and received at a reference station on a first GNSS carrier frequency and (2) a second satellite signal measurement of a second GNSS signal sent from the satellite vehicle and received at the reference station on a second GNSS carrier frequency, the first GNSS carrier frequency being different from the second GNSS carrier frequency; measuring a third GNSS signal sent from the satellite vehicle and received at the mobile device on a third GNSS carrier frequency different from the first GNSS carrier frequency and different from the second GNSS carrier frequency, to generate a third satellite signal measurement; and determining the position of the mobile device using (a) the third satellite signal measurement of the third GNSS signal on the third GNSS carrier frequency and (b) the correction data associated with the two or more satellite signal measurements, including the first satellite signal measurement of the first GNSS signal on the first GNSS carrier frequency and the second satellite signal measurement of the second GNSS signal on the second GNSS carrier frequency.

Clause 39: The method of clause 38, wherein: the first satellite signal measurement comprises a first pseudorange measurement, the second satellite signal measurement comprises a second pseudorange measurement, and the third satellite signal measurement comprises a third pseudorange measurement.

Clause 40: The method of clause 38, wherein: the first satellite signal measurement comprises a first carrier phase measurement, the second satellite signal measurement comprises a second carrier phase measurement, and the third satellite signal measurement comprises a third carrier phase measurement.

Clause 41: The method of clause 38, wherein: the first satellite signal measurement comprises a first Doppler shift measurement, the second satellite signal measurement comprises a second Doppler shift measurement, and the third satellite signal measurement comprises a third Doppler shift measurement.

Clause 42: A method performed at a reference station or a server for providing correction data for Global Navigational Satellite System (GNSS) signals, the method comprising: measuring to obtain at the reference station, or receiving at the server, two or more satellite signal measurements, including (1) a first satellite signal measurement of a first GNSS signal sent from a satellite vehicle and received at the reference station on a first GNSS carrier frequency and (2) a second satellite signal measurement of a second GNSS signal sent from the satellite vehicle and received at the reference station on a second GNSS carrier frequency, the first GNSS carrier frequency being different from the second GNSS carrier frequency; generating, at the reference station or the server, the correction data associated with the two or more satellite signal measurements, including the first satellite signal measurement of the first GNSS signal on the first GNSS carrier frequency and the second satellite signal measurement of the second GNSS signal on the second GNSS carrier frequency; and sending, from the reference station or the server, the correction data to a mobile device configured to obtain a third satellite signal measurement of a third GNSS signal sent from the satellite vehicle and received at the mobile device on a third GNSS carrier frequency different from the first GNSS carrier frequency and different from the second GNSS carrier frequency.

Clause 43: The method of clause 42, wherein: the first satellite signal measurement comprises a first pseudorange measurement, the second satellite signal measurement comprises a second pseudorange measurement, and the third satellite signal measurement comprises a third pseudorange measurement.

Clause 44: The method of clause 42, wherein: the first satellite signal measurement comprises a first carrier phase measurement, the second satellite signal measurement comprises a second carrier phase measurement, and the third satellite signal measurement comprises a third carrier phase measurement.

Clause 45: The method of clause 42, wherein: the first satellite signal measurement comprises a first Doppler shift measurement, the second satellite signal measurement comprises a second Doppler shift measurement, and the third satellite signal measurement comprises a third Doppler shift measurement.

Clause 46: A mobile device for determining a position based on Global Navigational Satellite System (GNSS) signals, the mobile device comprising: a communication interface configured to receive correction data associated with two or more satellite signal measurements, including (1) a first satellite signal measurement of a first GNSS signal sent from a satellite vehicle and received at a reference station on a first GNSS carrier frequency and (2) a second satellite signal measurement of a second GNSS signal sent from the satellite vehicle and received at the reference station on a second GNSS carrier frequency, the first GNSS carrier frequency being different from the second GNSS carrier frequency; a GNSS receiver configured to measure a third GNSS signal sent from the satellite vehicle and received at the GNSS receiver on a third GNSS carrier frequency different from the first GNSS carrier frequency and different from the second GNSS carrier frequency, to generate a third satellite signal measurement; a memory; and one or more processing units communicatively coupled with the communication interface, the GNSS receiver, and the memory, the one or more processing units configured to determine the position of the mobile device using (a) the third satellite signal measurement of the third GNSS signal on the third GNSS carrier frequency and (b) the correction data associated with the two or more satellite signal measurements, including the first satellite signal measurement of the first GNSS signal on the first GNSS carrier frequency and the second satellite signal measurement of the second GNSS signal on the second GNSS carrier frequency.

Clause 47: The mobile device of clause 46, wherein: the first satellite signal measurement comprises a first pseudorange measurement, the second satellite signal measurement comprises a second pseudorange measurement, and the third satellite signal measurement comprises a third pseudorange measurement.

Clause 48: The mobile device of clause 46, wherein: the first satellite signal measurement comprises a first carrier phase measurement, the second satellite signal measurement comprises a second carrier phase measurement, and the third satellite signal measurement comprises a third carrier phase measurement.

Clause 49: The mobile device of clause 46, wherein: the first satellite signal measurement comprises a first Doppler shift measurement, the second satellite signal measurement comprises a second Doppler shift measurement, and the third satellite signal measurement comprises a third Doppler shift measurement.

Clause 50: An apparatus for determining a position of a mobile device associated with Global Navigational Satellite System (GNSS) signals, the apparatus comprising: means for receiving correction data based on two or more satellite signal measurements, including (1) a first satellite signal measurement of a first GNSS signal sent from a satellite vehicle and received at a reference station on a first GNSS carrier frequency and (2) a second satellite signal measurement of a second GNSS signal sent from the satellite vehicle and received at the reference station on a second GNSS carrier frequency, the first GNSS carrier frequency being different from the second GNSS carrier frequency; means for measuring a third GNSS signal sent from the satellite vehicle and received at the mobile device on a third GNSS carrier frequency different from the first GNSS carrier frequency and different from the second GNSS carrier frequency, to generate a third satellite signal measurement; and means for determining the position of the mobile device using (a) the third satellite signal measurement of the third GNSS signal on the third GNSS carrier frequency and (b) the correction data associated with the two or more satellite signal measurements, including the first satellite signal measurement of the first GNSS signal on the first GNSS carrier frequency and the second satellite signal measurement of the second GNSS signal on the second GNSS carrier frequency.

Clause 51: The apparatus of clause 50, wherein: the first satellite signal measurement comprises a first pseudorange measurement, the second satellite signal measurement comprises a second pseudorange measurement, and the third satellite signal measurement comprises a third pseudorange measurement.

Clause 52: The apparatus of clause 50, wherein: the first satellite signal measurement comprises a first carrier phase measurement, the second satellite signal measurement comprises a second carrier phase measurement, and the third satellite signal measurement comprises a third carrier phase measurement.

Clause 53: The apparatus of clause 50, wherein: the first satellite signal measurement comprises a first Doppler shift measurement, the second satellite signal measurement comprises a second Doppler shift measurement, and the third satellite signal measurement comprises a third Doppler shift measurement.

What is claimed is:

1. A method performed at a mobile device for determining a position based on Global Navigational Satellite System (GNSS) signals, the method comprising:
receiving, using a communication interface, correction data associated with two or more pseudorange measurements, including (1) a first pseudorange measurement of a first GNSS signal sent from a satellite vehicle and received at a reference station on a first GNSS carrier frequency and (2) a second pseudorange measurement of a second GNSS signal sent from the satellite vehicle and received at the reference station on a second GNSS carrier frequency, the first GNSS carrier frequency being different from the second GNSS carrier frequency;
measuring a third GNSS signal sent from the satellite vehicle and received at the mobile device on a third GNSS carrier frequency different from the first GNSS carrier frequency and different from the second GNSS carrier frequency, to generate a third pseudorange measurement; and
determining the position of the mobile device using (a) the third pseudorange measurement of the third GNSS signal on the third GNSS carrier frequency and (b) the correction data associated with the two or more pseudorange measurements, including the first pseudorange measurement of the first GNSS signal on the first GNSS carrier frequency and the second pseudorange measurement of the second GNSS signal on the second GNSS carrier frequency,
wherein the correction data includes or is used to generate a virtual pseudorange measurement for the third GNSS carrier frequency, the virtual pseudorange measurement based on a linear combination of (1) the first pseudorange measurement of the first GNSS signal on the first GNSS carrier frequency and (2) the second pseudorange measurement of the second GNSS signal on the second GNSS carrier frequency, and
wherein the linear combination depends on one or more coefficients based on the first GNSS carrier frequency, the second GNSS carrier frequency, and the third GNSS carrier frequency.

2. The method of claim 1, wherein the correction data comprises (1) the first pseudorange measurement and (2) the second pseudorange measurement.

3. The method of claim 2, wherein the method further comprises:
generating, at the mobile device, a virtual pseudorange measurement for the third GNSS carrier frequency.

4. The method of claim 1, wherein the correction data comprises a virtual pseudorange measurement generated at the reference station or a server for the third GNSS carrier frequency.

5. The method of claim 1, wherein the linear combination for generating the virtual pseudorange measurement is expressed by:

$$\hat{P}_{L3} a^* P_{L1} + b^* P_{L2},$$

wherein $\hat{P}_{L3}$ corresponds to the virtual pseudorange measurement for the third GNSS carrier frequency, $P_{L1}$ corresponds to the first pseudorange measurement of the first GNSS signal on the first GNSS carrier frequency, $P_{L2}$ corresponds to the second pseudorange measurement of the second GNSS signal on the second GNSS carrier frequency, and a and b are coefficients satisfying:

$$a = \frac{f_1^2 f_3^2 - f_1^2 f_2^2}{f_1^2 f_3^2 - f_2^2 f_3^2} \text{ and}$$

$$b = 1 - a = \frac{f_1^2 f_2^2 - f_2^2 f_3^2}{f_1^2 f_3^2 - f_2^2 f_3^2},$$

wherein $f_1$ corresponds to the first GNSS carrier frequency, $f_2$ corresponds to the second GNSS carrier frequency, and $f_3$ corresponds to the third GNSS carrier frequency.

6. The method of claim 1, wherein the virtual pseudorange measurement for the third GNSS carrier frequency is generated by taking into account a differential code bias correction term.

7. The method of claim 6, wherein the linear combination for generating the virtual pseudorange measurement, including the differential code bias correction term, denoted as $\Delta DCB_{\hat{P}_{L3}}$, is expressed as:

$$\hat{P}_{L3} = a^* P_{L1} + b^* P_{L2} + \Delta DCB_{\hat{P}_{L3}}$$

wherein $\hat{P}_{L3}$ corresponds to the virtual pseudorange measurement for the third GNSS carrier frequency, $P_{L1}$ corresponds to the first pseudorange measurement of the first GNSS signal on the first GNSS carrier frequency, $P_{L2}$ corresponds to the second pseudorange measurement of the second GNSS signal on the second GNSS carrier frequency, and a and b are coefficients satisfying:

$$a = \frac{f_1^2 f_3^2 - f_1^2 f_2^2}{f_1^2 f_3^2 - f_2^2 f_3^2} \text{ and}$$

$$b = 1 - a = \frac{f_1^2 f_2^2 - f_2^2 f_3^2}{f_1^2 f_3^2 - f_2^2 f_3^2},$$

wherein $f_1$ corresponds to the first GNSS carrier frequency, $f_2$ corresponds to the second GNSS carrier frequency, and $f_3$ corresponds to the third GNSS carrier frequency.

8. The method of claim 7, wherein the differential code bias correction term $\Delta DCB_{\hat{P}_{L3}}$ is based on known values of differential code biases $DCB_{P_{L1}}$, $DCB_{P_{L2}}$, and $DCB_{P_{L3}}$, for the first, second, and third GNSS carrier frequencies, respectively, and expressed as:

$$\Delta DCB_{\hat{P}_{L3}} = DCB_{P_{L3}} - (a*DCB_{P_{L1}} + b*DCB_{P_{L2}}).$$

9. The method of claim 1, wherein the method further comprises:
receiving, using the communication interface, additional correction data associated with two or more carrier phase measurements, including (1) a first carrier phase measurement of the first GNSS signal received at the reference station on the first GNSS carrier frequency and (2) a second carrier phase measurement of the second GNSS signal received at the reference station on the second GNSS carrier frequency; and
measuring the third GNSS signal received at the mobile device on the third GNSS carrier frequency different from the first GNSS carrier frequency and different from the second GNSS carrier frequency, to generate a third carrier phase measurement,
wherein the determining the position of the mobile device further comprises using (a) the third carrier phase measurement of the third GNSS signal on the third GNSS carrier frequency and (b) the additional correction data associated with the two or more carrier phase measurements, including the first carrier phase measurement of the first GNSS signal on the first GNSS carrier frequency and the second carrier phase measurement of the second GNSS signal on the second GNSS carrier frequency.

10. The method of claim 9, wherein the additional correction data comprises (1) the first carrier phase measurement and (2) the second carrier phase measurement.

11. The method of claim 10, wherein the method further comprises:
generating, at the mobile device, a virtual carrier phase measurement for the third GNSS carrier frequency.

12. The method of claim 9, wherein the additional correction data comprises a virtual carrier phase measurement generated at the reference station or a server for the third GNSS carrier frequency.

13. The method of claim 9, wherein the additional correction data includes or is used to generate a virtual carrier phase measurement for the third GNSS carrier frequency, the virtual carrier phase measurement based on a linear combination of (1) the first carrier phase measurement of the first GNSS signal on the first GNSS carrier frequency and (2) the second carrier phase measurement of the second GNSS signal on the second GNSS carrier frequency.

14. The method of claim 13, wherein the linear combination for generating the virtual carrier phase measurement for the third GNSS carrier frequency is expressed as:

$$\hat{\Phi}_{L3} = a*\Phi_{L1} + b*\Phi_{L2},$$

wherein $\hat{\Phi}_{L3}$ corresponds to the virtual carrier phase measurement for the third GNSS carrier frequency, $\Phi_{L1}$ corresponds to the first carrier phase measurement of the first GNSS signal on the first GNSS carrier frequency, $\Phi_{L2}$ corresponds to the second carrier phase measurement of the second GNSS signal on the second GNSS carrier frequency, and a and b are coefficients satisfying:

$$a = \frac{f_1^2 f_3^2 - f_1^2 f_2^2}{f_1^2 f_3^2 - f_2^2 f_3^2} \text{ and}$$

$$b = 1 - a = \frac{f_1^2 f_2^2 - f_2^2 f_3^2}{f_1^2 f_3^2 - f_2^2 f_3^2},$$

wherein $f_1$ corresponds to the first GNSS carrier frequency, $f_2$ corresponds to the second GNSS carrier frequency, and $f_3$ corresponds to the third GNSS carrier frequency.

15. The method of claim 9 wherein the determining the position of the mobile device comprises using the correction data, the additional correction data, or both the correction data and the additional correction data, to perform Real-Time Kinematic (RTK) correction on the third carrier phase measurement.

16. The method of claim 9, wherein the determining the position of the mobile device comprises using the correction data, the additional correction data, or both the correction data or the additional correction data, to perform Differential Global Navigation Satellite (DGNSS) correction on the third pseudorange measurement.

17. The method of claim 1, wherein the method further comprises:
receiving, using the communication interface, further additional correction data associated with two or more Doppler shift measurements, including (1) a first Doppler shift measurement of the first GNSS signal received at the reference station on the first GNSS carrier frequency and (2) a second Doppler shift measurement of the second GNSS signal received at the reference station on the second GNSS carrier frequency; and
measuring the third GNSS signal received at the mobile device on the third GNSS carrier frequency different from the first GNSS carrier frequency and different from the second GNSS carrier frequency, to generate a third Doppler shift measurement,
wherein the determining the position of the mobile device further comprises using (a) the third Doppler shift measurement of the third GNSS signal on the third GNSS carrier frequency and (b) the further additional correction data associated with the two or more Doppler shift measurements, including the first Doppler shift measurement of the first GNSS signal on the first GNSS carrier frequency and the second Doppler shift measurement of the second GNSS signal on the second GNSS carrier frequency.

18. A method performed at a reference station for providing correction data for Global Navigational Satellite System (GNSS) signals, the method comprising:
measuring to obtain at the reference station two or more pseudorange measurements, including (1) a first pseudorange measurement of a first GNSS signal sent from a satellite vehicle and received at the reference station on a first GNSS carrier frequency and (2) a second pseudorange measurement of a second GNSS signal sent from the satellite vehicle and received at the reference station on a second GNSS carrier frequency, the first GNSS carrier frequency being different from the second GNSS carrier frequency;

generating, at the reference station, the correction data associated with the two or more pseudorange measurements, including the first pseudorange measurement of the first GNSS signal on the first GNSS carrier frequency and the second pseudorange measurement of the second GNSS signal on the second GNSS carrier frequency; and sending, from the reference station, the correction data to a mobile device configured to obtain a third pseudorange measurement of a third GNSS signal sent from the satellite vehicle and received at the mobile device on a third GNSS carrier frequency different from the first GNSS carrier frequency and different from the second GNSS carrier frequency, wherein the correction data includes or is used to generate a virtual pseudorange measurement for the third GNSS carrier frequency, the virtual pseudorange measurement based on a linear combination of (1) the first pseudorange measurement of the first GNSS signal on the first GNSS carrier frequency and (2) the second pseudorange measurement of the second GNSS signal on the second GNSS carrier frequency, and wherein the linear combination depends on one or more coefficients based on the first GNSS carrier frequency, the second GNSS carrier frequency, and the third GNSS carrier frequency.

19. The method of claim 18, wherein the method further comprises:

measuring to obtain at the reference station two or more carrier phase measurements, including (1) a first carrier phase measurement of the first GNSS signal received at the reference station on the first GNSS carrier frequency and (2) a second carrier phase measurement of the second GNSS signal received at the reference station on the second GNSS carrier frequency;

generating, at the reference station, additional correction data associated with the two or more carrier phase measurements, including the first carrier phase measurement of the first GNSS signal on the first GNSS carrier frequency and the second carrier phase measurement of the second GNSS signal on the second GNSS carrier frequency; and sending, from the reference station, the additional correction data to the mobile device, wherein the mobile device is configured to obtain a third carrier phase measurement of the third GNSS signal received at the mobile device on the third GNSS carrier frequency different from the first GNSS carrier frequency and different from the second GNSS carrier frequency.

20. A mobile device for determining a position based on Global Navigational Satellite System (GNSS) signals, the mobile device comprising:

a communication interface configured to receive correction data associated with two or more pseudorange measurements, including (1) a first pseudorange measurement of a first GNSS signal sent from a satellite vehicle and received at a reference station on a first GNSS carrier frequency and (2) a second pseudorange measurement of a second GNSS signal sent from the satellite vehicle and received at the reference station on a second GNSS carrier frequency, the first GNSS carrier frequency being different from the second GNSS carrier frequency;

a GNSS receiver configured to measure a third GNSS signal sent from the satellite vehicle and received at the GNSS receiver on a third GNSS carrier frequency different from the first GNSS carrier frequency and different from the second GNSS carrier frequency, to generate a third pseudorange measurement;

a memory; and one or more processing units communicatively coupled with the communication interface, the GNSS receiver, and the memory, the one or more processing units configured to determine the position of the mobile device using (a) the third pseudorange measurement of the third GNSS signal on the third GNSS carrier frequency and (b) the correction data associated with the two or more pseudorange measurements, including the first pseudorange measurement of the first GNSS signal on the first GNSS carrier frequency and the second pseudorange measurement of the second GNSS signal on the second GNSS carrier frequency, wherein the correction data includes or is used to generate a virtual pseudorange measurement for the third GNSS carrier frequency, the virtual pseudorange measurement based on a linear combination of (1) the first pseudorange measurement of the first GNSS signal on the first GNSS carrier frequency and (2) the second pseudorange measurement of the second GNSS signal on the second GNSS carrier frequency, and wherein the linear combination depends on one or more coefficients based on the first GNSS carrier frequency, the second GNSS carrier frequency, and the third GNSS carrier frequency.

21. The mobile device of claim 20, wherein the correction data comprises (1) the first pseudorange measurement and (2) the second pseudorange measurement.

22. The mobile device of claim 21, wherein the one or more processing units are further configured to:

generate a virtual pseudorange measurement for the third GNSS carrier frequency.

23. The mobile device of claim 20, wherein the correction data comprises a virtual pseudorange measurement generated at the reference station or a server for the third GNSS carrier frequency.

24. The mobile device of claim 20, wherein the correction data includes or is used to generate a virtual pseudorange measurement, the virtual pseudorange measurement based on a linear combination of (1) the first pseudorange measurement of the first GNSS signal on the first GNSS carrier frequency and (2) the second pseudorange measurement of the second GNSS signal on the second GNSS carrier frequency.

25. The mobile device of claim 20, wherein:

the communication interface is further configured to receive additional correction data associated with two or more carrier phase measurements, including (1) a first carrier phase measurement of the first GNSS signal received at the reference station on the first GNSS carrier frequency different and (2) a second carrier phase measurement of the second GNSS signal received at the reference station on the second GNSS carrier frequency, the GNSS receiver is further configured to measure the third GNSS signal received at the GNSS receiver on the third GNSS carrier frequency different from the first GNSS carrier frequency and different from the second GNSS carrier frequency, to generate a third carrier phase measurement, and the one or more processing units are further configured to determine the position of the mobile device by further using (a) the third carrier phase measurement of the third GNSS signal on the third GNSS carrier frequency and (b) the additional correction data associated with the two or more carrier phase measurements, including the first carrier phase measurement of the first GNSS signal on the first GNSS carrier frequency and the second carrier phase measurement of the second GNSS signal on the second GNSS carrier frequency.

26. The mobile device of claim 25, wherein the additional correction data comprises (1) the first carrier phase measurement and (2) the second carrier phase measurement.

27. The mobile device of claim 26, wherein the one or more processing units are further configured to:
generate, at the mobile device, a virtual carrier phase measurement for the third GNSS carrier frequency.

28. The mobile device of claim 25, wherein the additional correction data comprises a virtual carrier phase measurement generated at the reference station or a server for the third GNSS carrier frequency.

29. An apparatus for determining a position of a mobile device associated with Global Navigational Satellite System (GNSS) signals, the apparatus comprising:
means for receiving correction data based on two or more pseudorange measurements, including (1) a first pseudorange measurement of a first GNSS signal sent from a satellite vehicle and received at a reference station on a first GNSS carrier frequency and (2) a second pseudorange measurement of a second GNSS signal sent from the satellite vehicle and received at the reference station on a second GNSS carrier frequency, the first GNSS carrier frequency being different from the second GNSS carrier frequency;

means for measuring a third GNSS signal sent from the satellite vehicle and received at the mobile device on a third GNSS carrier frequency different from the first GNSS carrier frequency and different from the second GNSS carrier frequency, to generate a third pseudorange measurement; and means for determining the position of the mobile device using (a) the third pseudorange measurement of the third GNSS signal on the third GNSS carrier frequency and (b) the correction data associated with the two or more pseudorange measurements, including the first pseudorange measurement of the first GNSS signal on the first GNSS carrier frequency and the second pseudorange measurement of the second GNSS signal on the second GNSS carrier frequency, wherein the correction data includes or is used to generate a virtual pseudorange measurement for the third GNSS carrier frequency, the virtual pseudorange measurement based on a linear combination of (1) the first pseudorange measurement of the first GNSS signal on the first GNSS carrier frequency and (2) the second pseudorange measurement of the second GNSS signal on the second GNSS carrier frequency, and wherein the linear combination depends on one or more coefficients based on the first GNSS carrier frequency, the second GNSS carrier frequency, and the third GNSS carrier frequency.

* * * * *